United States Patent
Cho et al.

(10) Patent No.: US 8,849,268 B2
(45) Date of Patent: Sep. 30, 2014

(54) MOBILE TERMINAL AND CONTROLLING METHOD THEREOF

(71) Applicant: LG Electronics Inc., Seoul (KR)

(72) Inventors: Yunjin Cho, Seoul (KR); Sunmi Choi, Seoul (KR); Sunjung Lee, Seoul (KR); Yusol Ha, Seoul (KR); Junghoon Chu, Seoul (KR); Jungmin Lee, Seoul (KR); Heonjae Jung, Seoul (KR); Taeyong Kim, Seoul (KR); Seongki Sohn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/652,280

(22) Filed: Oct. 15, 2012

(65) Prior Publication Data

US 2014/0018053 A1   Jan. 16, 2014

(30) Foreign Application Priority Data

Jul. 13, 2012   (KR) .......................... 10-2012-0076969

(51) Int. Cl.
*H04W 8/22* (2009.01)
*G06F 3/0488* (2013.01)
*G06Q 10/10* (2012.01)

(52) U.S. Cl.
CPC .............. *H04W 8/22* (2013.01); *G06F 3/0488* (2013.01); *G06Q 10/10* (2013.01); *G06F 3/04883* (2013.01)
USPC ......... 455/418; 455/566; 345/158; 348/14.04

(58) Field of Classification Search
USPC .......... 455/418, 566, 11.1, 95; 345/156, 157, 345/158; 348/14.01, 14.03
See application file for complete search history.

(56) References Cited

U.S. PATENT DOCUMENTS

| | | | |
|---|---|---|---|
| 7,872,574 B2 * | 1/2011 | Betts et al. ............... | 340/539.26 |
| 8,494,507 B1 * | 7/2013 | Tedesco et al. ............... | 455/418 |
| 2002/0086656 A1 | 7/2002 | Mattisson | |
| 2004/0228531 A1 | 11/2004 | Fernandez et al. | |
| 2007/0058637 A1 | 3/2007 | Lo | |
| 2009/0177981 A1 | 7/2009 | Christie et al. | |
| 2011/0044438 A1 | 2/2011 | Wang et al. | |
| 2012/0221687 A1 * | 8/2012 | Hunter et al. ................. | 709/219 |
| 2012/0327252 A1 * | 12/2012 | Nichols et al. ............. | 348/207.1 |
| 2013/0194172 A1 * | 8/2013 | Shyamalan ................... | 345/156 |

* cited by examiner

*Primary Examiner* — Cong Tran
(74) *Attorney, Agent, or Firm* — Birch, Stewart, Kolasch & Birch, LLP

(57) ABSTRACT

A mobile terminal and controlling method thereof are disclosed, by which data can be shared with a counterpart terminal in the course of a phone call. The present invention includes a touchscreen, a sensing unit configured to sense an action of a user, a communication unit configured to communicate with a counterpart terminal via at least one of a first communication network and a second communication network, and a controller, in response to a first user command inputted via at least one of the touchscreen and the sensing unit in the course of performing a voice call to the counterpart terminal via the first communication network, controlling a first data sharing screen with the counterpart terminal to be displayed on the touchscreen, the controller controlling a data sharing via the first data sharing screen to be performed together with the voice call.

30 Claims, 83 Drawing Sheets

MOBILE TERMINAL AND CONTROLLING METHOD THEREOF

Pursuant to 35 U.S.C. §119(a), This application claims the benefit of the Korean Patent Application No. 10-2012-0076969, filed on Jul. 13, 2012 which is hereby incorporated by reference as if fully set forth herein.

BACKGROUND OF THE INVENTION

1. Field of the Invention

The present invention relates to a mobile terminal, and more particularly, to a mobile terminal and controlling method thereof. Although the present invention is suitable for sharing data with a counterpart terminal in the course of a phone call.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

As functions of a mobile terminal are getting diversified, the mobile terminal tends to be widely used to share data with an external terminal. In order for a mobile terminal to share data with an external terminal, it is necessary to establish a data communication channel between the mobile terminal and the external terminal. In case of a conventional 3 G communication network, since a voice call channel and a data channel are separately operated, even if the voice call channel is established, data is not shared in direct. In particular, although a voice call with an external terminal is ongoing in a mobile terminal, if the mobile terminal is not aware of a communication address (e.g., IP address, etc.) of the external terminal, however, it is unable to establish a data channel to cause a problem that data except voice are not transmitted to a terminal of a counterpart.

Thus, even if a communication channel with a voice call counterpart is established in a conventional 3 G communication network, it is unable to share prescribed data with a call counterpart terminal unless a separate data channel is further established.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which data sharing with an external terminal can be facilitated.

In particular, an object of the present invention is to provide a mobile terminal and controlling method thereof, by which data can be shared with an external terminal with ease.

Another object of the present invention is to provide a mobile terminal and controlling method thereof, by which data can be seamlessly shared with a counterpart terminal despite that a third party terminal is involved in a call with the counterpart terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen, a sensing unit configured to sense an action of a user, a communication unit configured to communicate with a counterpart terminal via at least one of a first communication network and a second communication network, and a controller, in response to a first user command inputted via at least one of the touchscreen and the sensing unit in the course of performing a voice call to the counterpart terminal via the first communication network, controlling a first data sharing screen with the counterpart terminal to be displayed on the touchscreen, the controller controlling a data sharing via the first data sharing screen to be performed together with the voice call.

In another aspect of the present invention, a method of controlling a mobile terminal according to the present invention may include the steps of communicating with a counterpart terminal via at least one of a first communication network and a second communication network and in response to a first user command inputted via at least one of a touchscreen and a sensing unit in the course of performing a voice call to the counterpart terminal via the first communication network, controlling a first data sharing screen with the counterpart terminal to be displayed on the touchscreen.

In another aspect of the present invention, a mobile terminal according to the present invention may include a touchscreen, a memory unit configured to store data, a communication unit configured to communicate with a counterpart terminal, and a controller controlling a voice call function for a voice call to the counterpart terminal and a first data sharing function for a data sharing with the counterpart terminal to be simultaneously performed, the controller controlling to determine whether to end the first data sharing function in case of ending the voice call function depending on whether the end of the voice call function is requested by the mobile terminal or the counterpart terminal.

In a further aspect of the present invention, a method of controlling a mobile terminal according to the present invention may include the steps of communicating with a counterpart terminal, activating both a voice call function for a voice call to the counterpart terminal and a first data sharing function for a data sharing with the counterpart terminal simultaneously, and controlling to determine whether to end the first data sharing function in case of ending the voice call function depending on whether the end of the voice call function is requested by the mobile terminal or the counterpart terminal.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 10A-10H are diagrams for one example of outputs from a mobile terminal 100 and a counterpart terminal if the mobile terminal 100 and the counterpart terminal are set to share handwriting inputs in-between;

FIGS. 17A-17D are diagrams for one example of outputs from a mobile terminal 100 and a counterpart terminal if the mobile terminal 100 and the counterpart terminal are set to share a schedule with each other;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
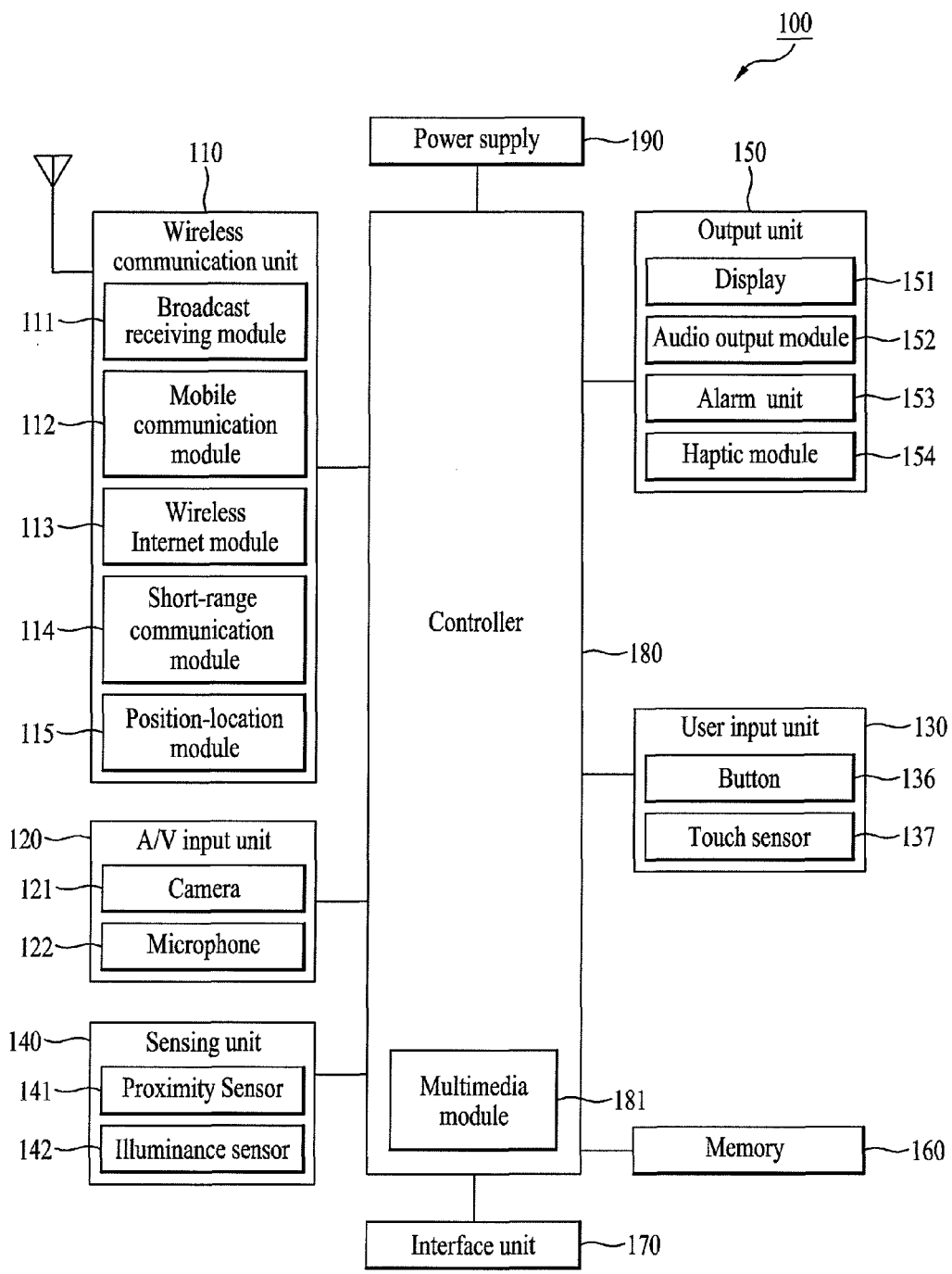
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
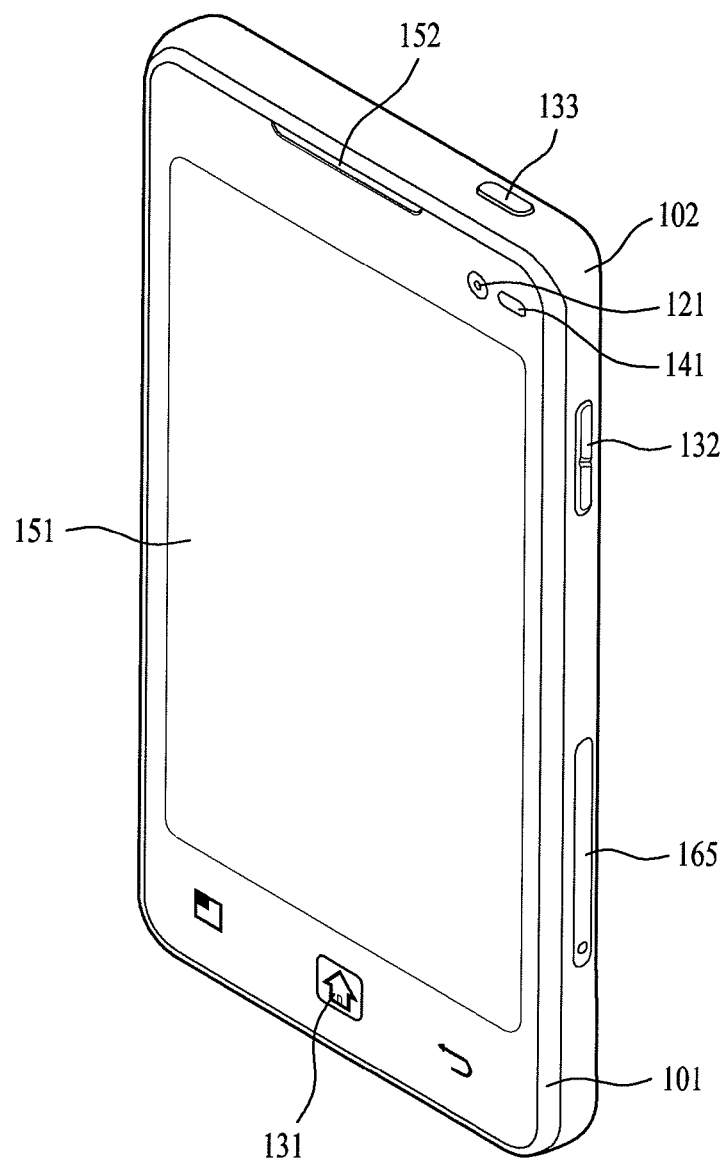
FIG. 2 is a front perspective diagram of a mobile terminal according to one embodiment of the present invention.
Figure 3:
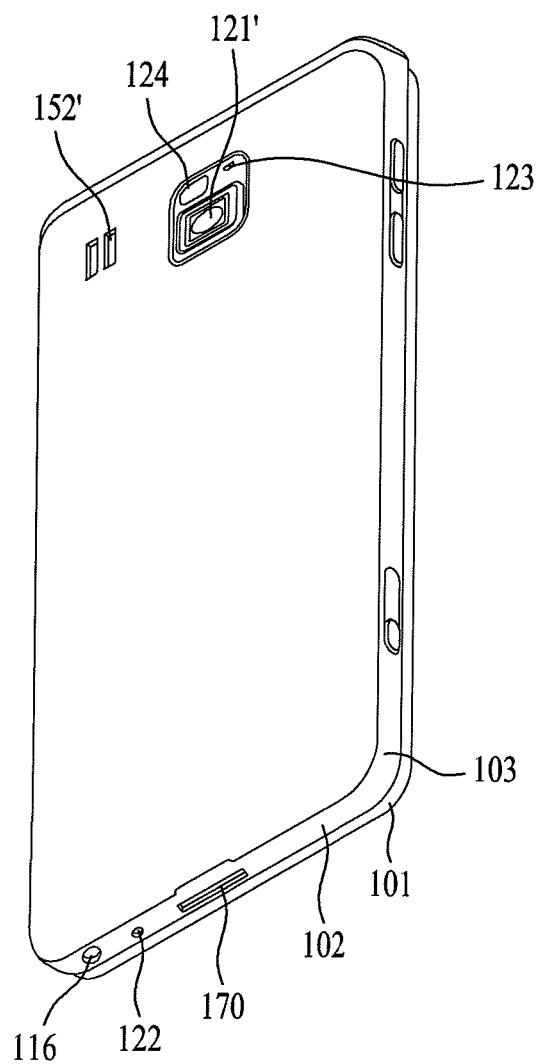
FIG. 3 is a rear perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

FIG. 2 is a perspective diagram of a backside of the terminal shown in FIG. 2.

Referring to FIG. 2, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

In the following detailed description, embodiments related to a controlling method implemented in the above-configured mobile terminal 100 are explained with reference to the accompanying drawings.

For clarity and convenience of the description, assume that a mobile terminal 100 according to the present invention may include at least one of the components described with reference to FIG. 1. In particular, the mobile terminal 100 according to the present invention may include the display unit 151, the sensing unit 140, the wireless communication unit 110, the memory 160 and the controller 180. If necessary, the mobile terminal 100 according to the present invention may further include the interface unit 170 and the audio output module 152.

Regarding the mobile terminal 100 according to the present invention, if the display module 151 includes a touchscreen, implementation of the following embodiments may be further facilitated. Therefore, the following description is made on the assumption that the display module 151 includes a touchscreen. A first communication network mentioned in a following example may be assumed as meaning VoIP or VoLTE communication network having a voice call performed by packet switching. And, a second communication network mentioned in the following description may be assumed as meaning a second or third generation communication network having a voice call performed by circuit switching.

For clarity and convenience of the following description, in case that a voice call is connected between a mobile terminal 100 and a counterpart terminal, the mobile 100 is assumed as a calling side terminal and the counterpart terminal is assumed as a called side terminal. And, one caller using the mobile terminal 100 shall be named a user and another caller using the counterpart terminal shall be named a counterpart.

Figure 4:
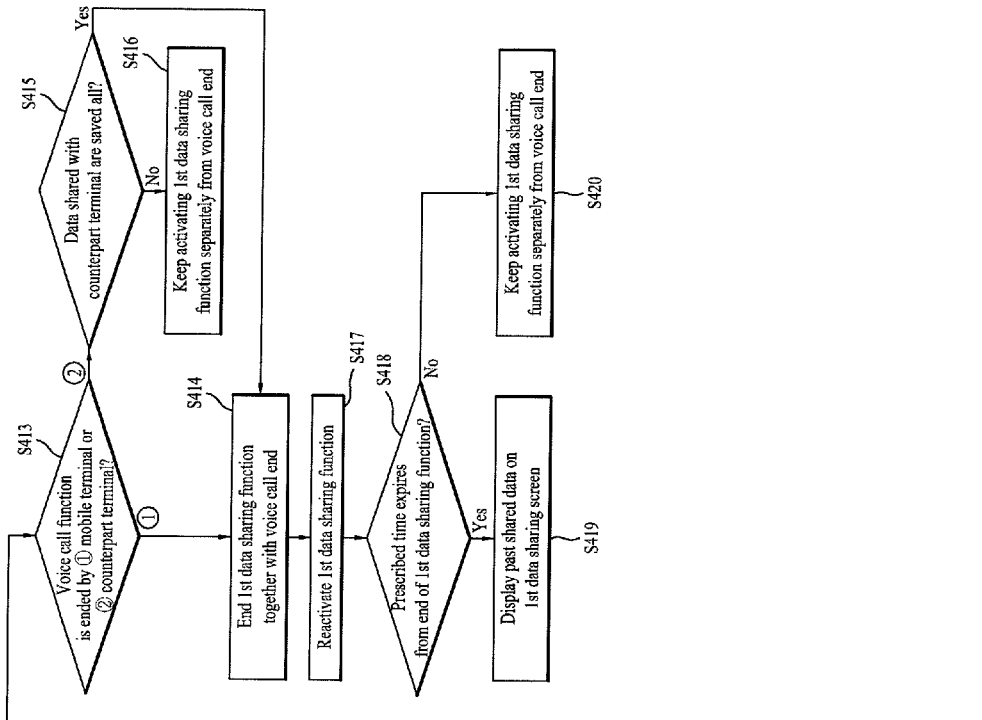
FIG. 4 is a flowchart for an operation of a mobile terminal according to the present invention.
Figure 4:
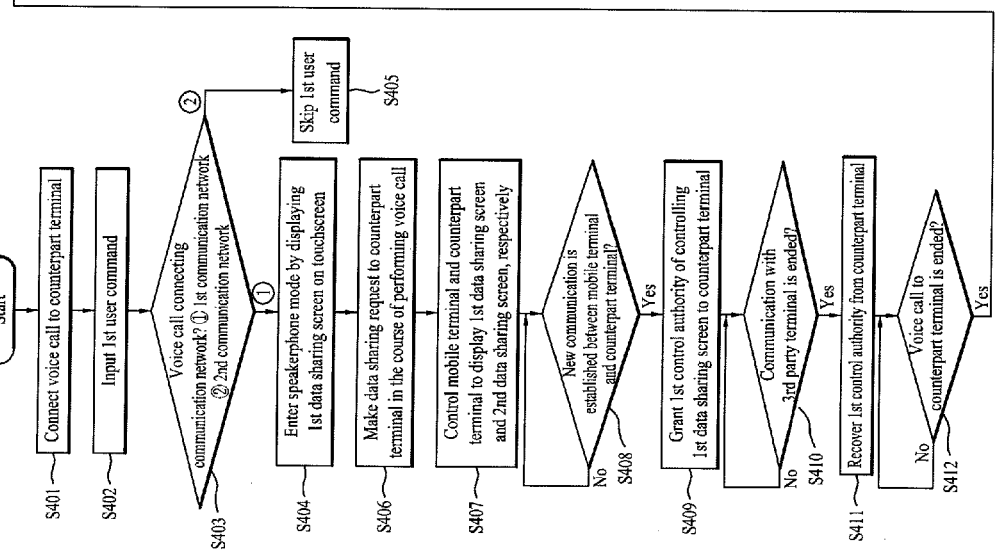
Figure 5A:
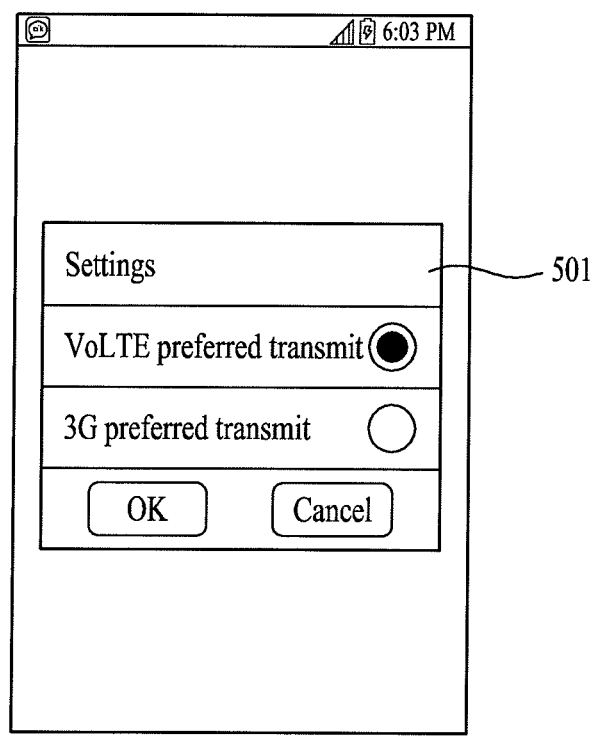
FIGS. 5A-5D are diagrams for one example of a screen provided to a user to put a priority on a first communication network or a second communication network.
Figure 5B:
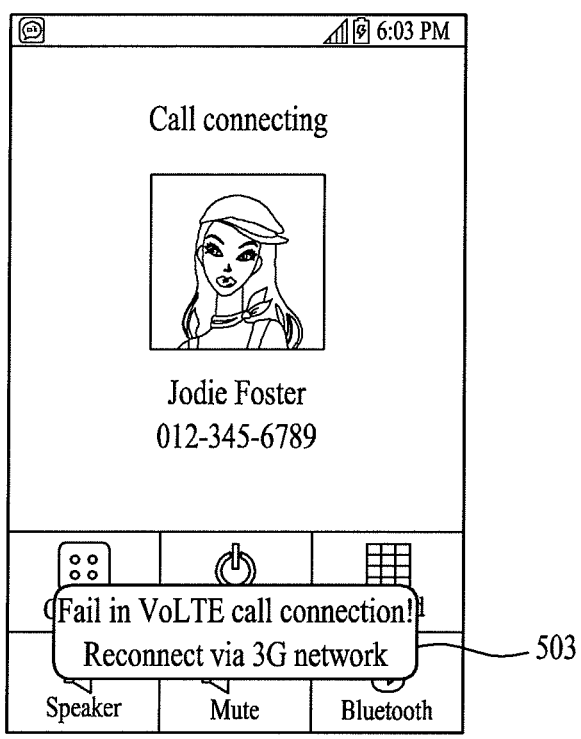
Figure 5C:
Figure 5D:
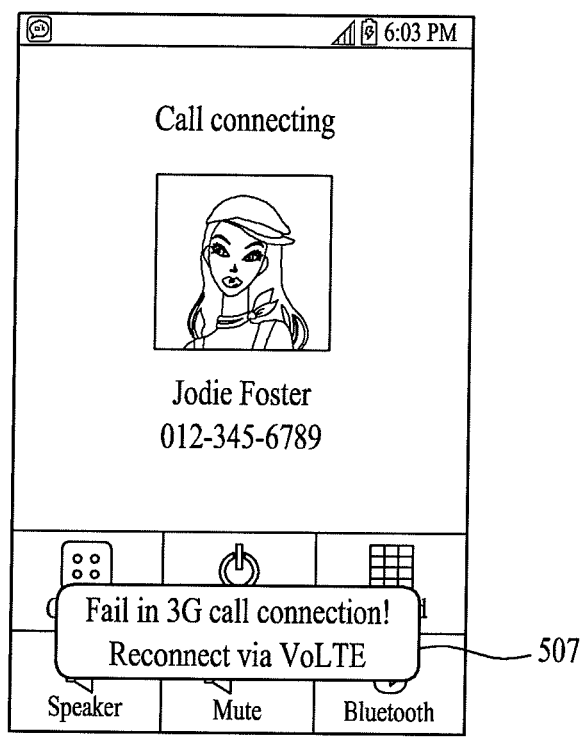

FIG. 4 is a flowchart for an operation of a mobile terminal according to the present invention.

Referring to FIG. 4, the controller 180 may be able to attempt a voice call connection to a prescribed counterpart using a first or second communication network in accordance with an external user input (S401). In particular, when the voice call connection is attempted to the prescribed counterpart, the controller 180 may be able to attempt the voice call connection via either the first communication network or the second communication network in accordance with a preset priority. For instance, if the first communication network has the priority over the second communication network, the controller 180 attempts the call connection to the prescribed counterpart using the first communication network primarily. If the voice call connection is not available via the first communication network, the controller 180 may be able to attempt the call connection to the prescribed counterpart using the second communication network secondarily. On the contrary, if the second communication network has the priority over the first communication network, the controller 180 attempts the call connection to the prescribed counterpart using the second communication network primarily. If the voice call connection is not available via the second communication network, the controller 180 may be able to attempt the call connection to the prescribed counterpart using the first communication network secondarily. This shall be described in detail with reference to FIG. 5.

FIG. 5 is a diagram for one example of a screen provided to a user to put a priority on a first communication network or a second communication network.

On a menu screen 501 shown in FIG. 5 (*a*), VoLTE may be understood as one example of a voice call using the first communication network and 3G call may be understood as one example of a voice call using the second communication network.

Referring to FIG. 5 (*a*), if the mobile terminal is set to VoLTE preferred transmitting mode, the controller 180 primarily attempts a voice call connection via the first communication network in case of a voice call connection to a prescribed counterpart. If the controller 180 fails in the voice call connection via the first communication network, the controller 180 may be able to attempt the voice call connection via the second communication network. If at least one of a condition that the prescribed counterpart uses a terminal failing to support VoLTE, a condition that the terminal of the prescribed counterpart is located in a shadow zone of VoLTE, and a condition that the mobile terminal 100 and the terminal of the prescribed counterpart subscribe in different internet service providers (ISP), respectively is met, the voice call connection via the first communication network may not be successfully performed.

If the voice call connection via the first communication network is determined as failure, referring to FIG. 5 (*b*), the controller 180 may control an indication message 503, which indicates that the voice call connection via the second communication network will be reattempted due to the failure of the voice call connection via the first communication network, to be outputted. A user of the mobile terminal 100 may be able to determine that the voice call is connected via which communication network by checking the output of the indication message 503.

Moreover, in order to discriminate the case that the voice call is connected using the first communication network and the case that the voice call is connected using the second communication network from each other, the controller 180 may be able to control an identification indicator 505 to be further displayed on a call connection screen provided after the voice call connection only if the voice call is connected using the first communication network. For instance, referring to FIG. 5C, if the voice call is connected not via the second communication network but by the first communication network, the controller 180 controls the identification indicator 505, which is represented as HD Voice, to be further displayed on the call connection screen, thereby informing the user that the call connection is completed using which communication network.

On the other hand, if the mobile terminal 100 is set to the 3G preferred transmitting mode, when a voice call connection to a prescribed counterpart is performed, the controller 180 primarily attempts the voice call connection via the second communication network. If the controller 180 fails in the voice call connection via the second communication network, the controller 180 may be able to secondarily attempt the voice call connection via the first communication network. If the voice call connection via the second communication network is determined as failure, as mentioned in the foregoing description with reference to FIG. 5 (*b*), the controller 180 may control an indication message 507, which indicates that the voice call connection via the first communication network will be reattempted due to the failure of the voice call connection via the second communication network, to be outputted (cf. FIG. 5D).

Yet, if the voice call connection via the second communication network is not successful, it is not mandatory to attempt the voice call connection via the first communication network. According to another embodiment of the present invention, if the voice call connection via the second communication network is not successful, the controller 180 may control the call connection attempt to be ended without attempting the voice call connection via the second communication network. In this case, the process described with reference to FIG. 5D may be omitted.

While the voice call with the prescribed counterpart is performed, if a first user command is inputted to the mobile terminal 100 (S402), the controller 180 may control whether to display a first data sharing screen on the touchscreen in accordance with whether the voice call is being performed using the first communication network or the second communication network (S403). In particular, if the first user command is inputted in the course of the voice call using the first communication network, the controller 180 may be able to control the first data sharing screen to be displayed on the touchscreen in response to the first user command (S404). Besides, if an earphone or headset is not connected to the interface unit 170 of the mobile terminal 100, the controller 180 may control the mobile terminal 100 to enter a speakerphone mode automatically (S404).

On the other hand, if the first user command is inputted in the course of the voice call using the second communication network, the controller 180 may not respond to the first user command (S405) or may control a screen different from the first data sharing screen to be displayed on the touchscreen.

When the voice call is connected via the first communication network, since the corresponding voice call is performed by packet switching, it may be unnecessary to further establish a separate communication channel to share data in the course of the voice call. In particular, the controller 180 may be able to control the voice call and the data sharing to be simultaneously performed using the communication channel established for the voice call.

On the other hand, if the voice call is connected using the second communication network, a separate communication channel should be established to share data in the course of the voice call. In particular, in case that the voice call is connected using the second communication network, a communication address of a counterpart terminal is confirmed and a communication channel establishing process should be further performed. In case that the second communication network is a voice dedicated communication network, it may cause a problem that data is not exchangeable between the mobile terminal 100 and the counterpart terminal.

In particular, only if determining that the mobile terminal 100 is in a situation suitable for sharing data in the course of the voice call (i.e., the voice call is connected via the first communication network), the controller 180 may control the first data sharing screen to be displayed on the touchscreen.

In the example mentioned in the above description, the first data sharing screen may include a data output screen to display a data type for selecting a data type to share with a terminal of a prescribed counterpart in the future and a data type selected from the data type menu.

A process for displaying the first data sharing screen on the touchscreen is described in detail with reference to the accompanying drawings as follows. For clarity, an output of the mobile terminal 100 and an output of a counterpart terminal in a call connected state with the mobile terminal 100 are simultaneously shown in the drawings. For clarity, the mobile terminal 100 and the counterpart terminal include a caller side terminal and a receiver side terminal, respectively.

Figure 6:
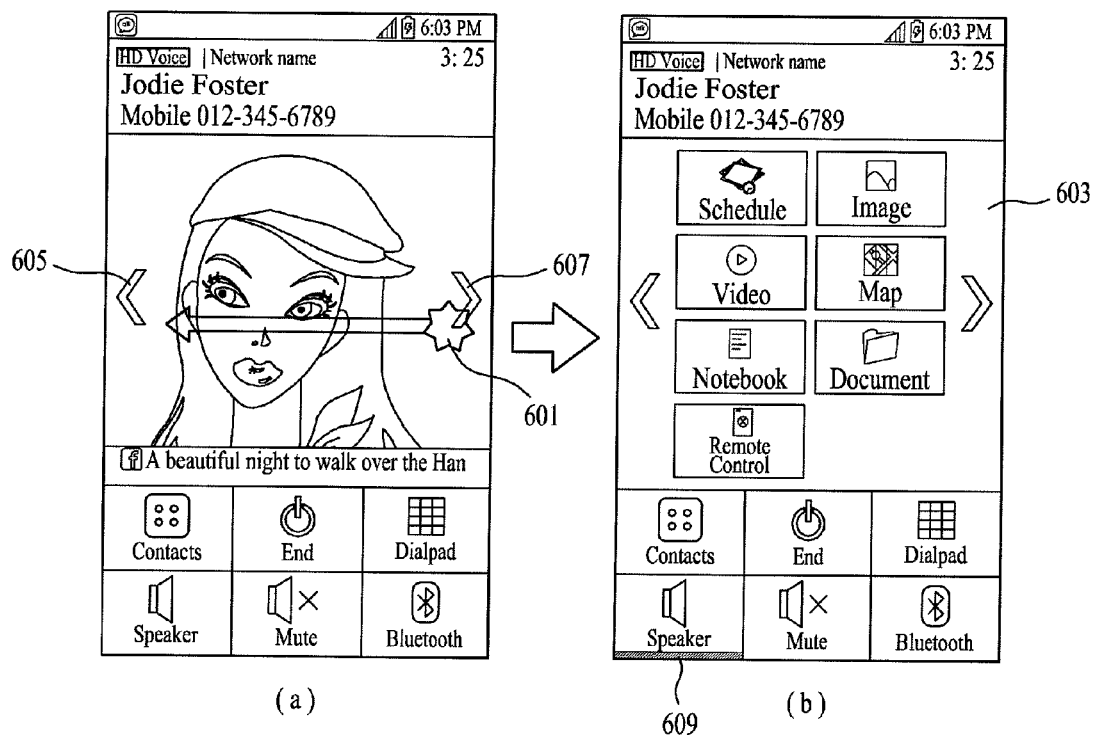
FIG. 6 is a diagram for displaying a data type menu to select a data type on a touchscreen.

FIG. 6 is a diagram for displaying a data type menu to select a data type on a touchscreen. While a voice call is performed using a first communication network, if a first user command is inputted to the mobile terminal 100 (particularly, in FIG. 6 (*a*), a flicking input 601 is applied to the touchscreen using a pointer), the controller 180, as shown in FIG. 6 (*b*), may control a data type menu 603 to be displayed to select a data type. In the example shown in FIG. 6 (*b*), the controller 180 displays the data type menu including a schedule item, an image item, a video item, a map item (particularly, item of location information), a notebook item, a document item, a remote control item and the like. An operation for the mobile terminal 100 and the counterpart terminal to share at least one of the data types shown in FIG. 6 (*b*) shall be described later.

FIG. 6 (*a*) shows one example that the flicking input 601 to the touchscreen is the first user command for clarity of the description, by which the present invention may be non-limited. For instance, the first user command may include a touch input applied to either a left shift arrow 605 or a right shift arrow 607 shown in FIG. 6 (*a*).

Moreover, the first user command may be non-limited by the touch input to the touchscreen. According to another embodiment of the present invention, the first user command may be inputted via the sensing unit 140 instead of the touchscreen. For instance, when the sensing unit 140 is configured to detect a proximity distance of a user body from the audio output module 152 for the audio output of the mobile terminal 100, the controller 180 may recognize the proximity distance, which is detected when the proximity distance detected by the sensing unit 140 becomes equal to or greater than a preset distance, as the first user command. This is attributed to the fact that a body part (e.g., an ear) of the user should be distant from the mobile terminal 100 over a predetermined distance in order for the user to view an output screen of the touchscreen in the course of the voice call. In particular, if the user in the course of the voice call leaves the mobile terminal 100 from the body part over a prescribed distance to view the output screen of the touchscreen, the controller 180 recognizes that the first user command is inputted and then controls the data type menu 603 shown in FIG. 6 (*b*) to be displayed. In order to detect a proximity distance between the audio output module 152 and the user body, an ambient light detecting sensor or the proximity sensor 141 may be provided in the vicinity of the audio output module 152.

For another instance, the controller 180 may recognize a manipulation of a power key, which is provided to switch a power saving mode of the touchscreen to a normal mode of the touchscreen, as the first user command. Generally, in case that an earphone or a headset is connected to the interface unit 170, since a user performs a voice call in a state of being spaced apart in a prescribed distance from the proximity sensor 151, it may be inappropriate to set the first user command to the proximity distance of the user body. Hence, in case that the earphone or headset is connected to the interface, the controller 180 may set the first user command to the manipulation of the power key to enable the touchscreen to enter the normal mode from the power saving mode.

In the example shown in FIG. 6 (*b*), while the data type menu 603 is displayed on the touchscreen, if the user does not select a data type to share for preset duration, the controller 180 may control the data type menu 603 to automatically disappear from the touchscreen after the expiration of the preset duration. While the data type menu 603 is displayed, if the user does not select the data type to share, it may be determined that the user has no intention to share the data with the counterpart terminal.

Hence, if the data type to share is not selected for the preset duration, the controller 180 determines that data will not be shared and may then stop displaying the data type menu 603 for guiding the selection of a data type to share.

Moreover, when the data type menu 603 is displayed on the touchscreen in response to the generation of the first user command, if the earphone or headset is not connected to the interface unit 170, the controller 180 may control the mobile terminal 100 to automatically enter the speakerphone mode (e.g., a speaker button 609 is activated in FIG. 6 (*b*)). In general, a user is unable to put the mobile terminal 100 close to an ear in the course of checking an output content of the touchscreen. Thus, the user has difficulty in performing the voice call smoothly unless the earphone or headset is connected to the mobile terminal 100 or the mobile terminal 100 is set to a speakerphone mode. Hence, once the controller 180 determines that the user intends to use the output content of the touchscreen, the controller 180 enables the user to smoothly perform the voice call by outputting the first data sharing screen and also setting the mobile terminal 100 to the speakerphone mode, simultaneously. Yet, if the earphone or headset is connected to the interface unit 170, since the voice call can be smoothly performed without setting the mobile terminal 100 to the speakerphone mode, the mobile terminal 100 may not enter the speakerphone mode.

FIG. 6 (*b*) shows one example that a whole region of the data type menu 603 is outputted in response to the first user command. According to another embodiment of the present invention, the controller 180 outputs a partial region of the data type menu 603 in response to the first user command. If a second user command linked to the first user command is inputted, the controller 180 may control the whole region of the data type menu 603 to be outputted. This shall be described in detail with reference to FIG. 7.

Figure 7:
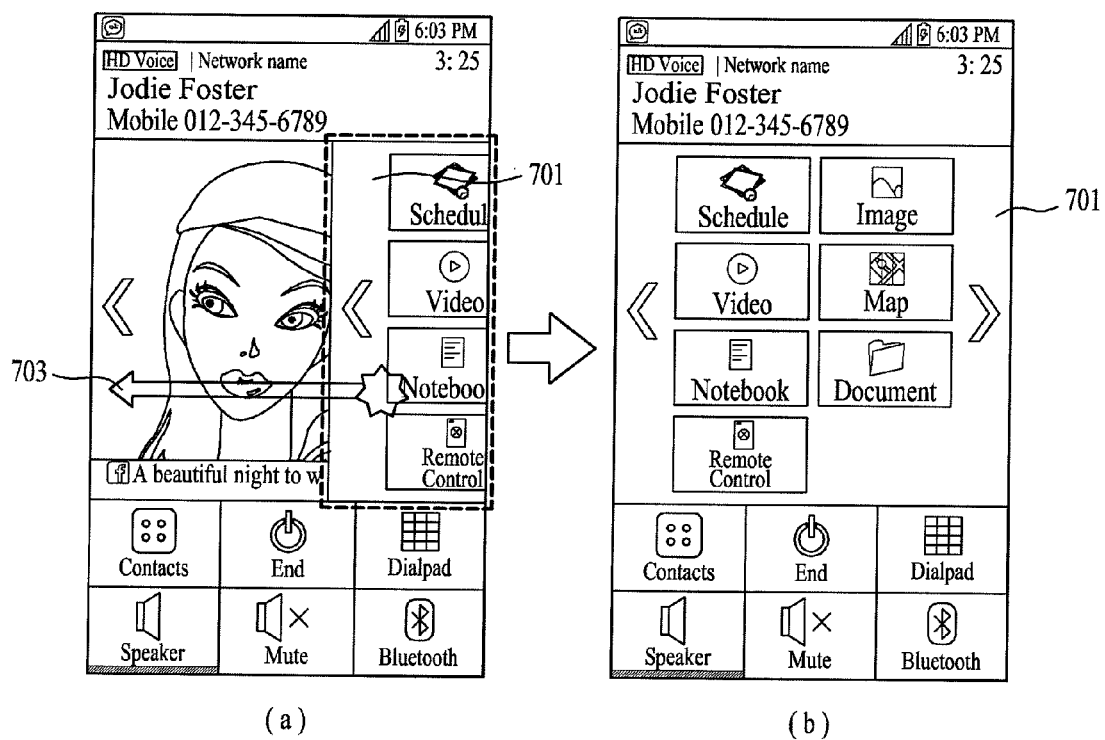
FIG. 7 is a diagram for another example of displaying a data type menu for selecting a data type on a touchscreen.

FIG. 7 is a diagram for another example of displaying a data type menu for selecting a data type on a touchscreen. For clarity of the following description with reference to FIG. 7, a first user command includes a proximity distance detected by the sensing unit 140 if a proximity distance of a user body from the audio output module 152 becomes equal to or greater than a preset distance. And, a second user command includes a flicking input applied to the touchscreen.

Referring to FIG. 7, while a voice call is performed suing a first communication network, if a first user command is generated in a manner that a user spaces the mobile terminal 100 apart from the user in a distance over a preset distance, the controller 180 may control a portion of a data type menu 701 to be displayed on the touchscreen in response to the first user command (FIG. 7 (*a*)). Subsequently, if the user inputs a second user command to the data type menu 701 (e.g., the data type menu 701 is contacted with a pointer and a flicking input 703 is then applied in a prescribed direction), the controller 180 may control a whole region of the data type menu 701 to be displayed on the touchscreen (FIG. 7 (*b*)).

In the example shown in FIG. 7 (*a*), the portion of the data type menu 701 is displayed on the touchscreen to inform a user that the data type menu 701 is hidden in a virtual region unseen from the touchscreen. The user sees the display output shown in the example shown in FIG. 7 (*a*) and may be then able to recognizes that the data type menu 701 is hidden in a right virtual region of the touchscreen In order to display the data type menu 701 hidden in the right virtual region of the touchscreen, the user may be able to generate a second user command.

After the partial region of the data type menu has been displayed on the touchscreen, if the second user command is not generated for preset duration, as mentioned in the foregoing description with reference to FIG. 6, the controller 180 may be able to control the data type menu 701 to disappear from the touchscreen automatically when the preset duration expires.

Figure 8:
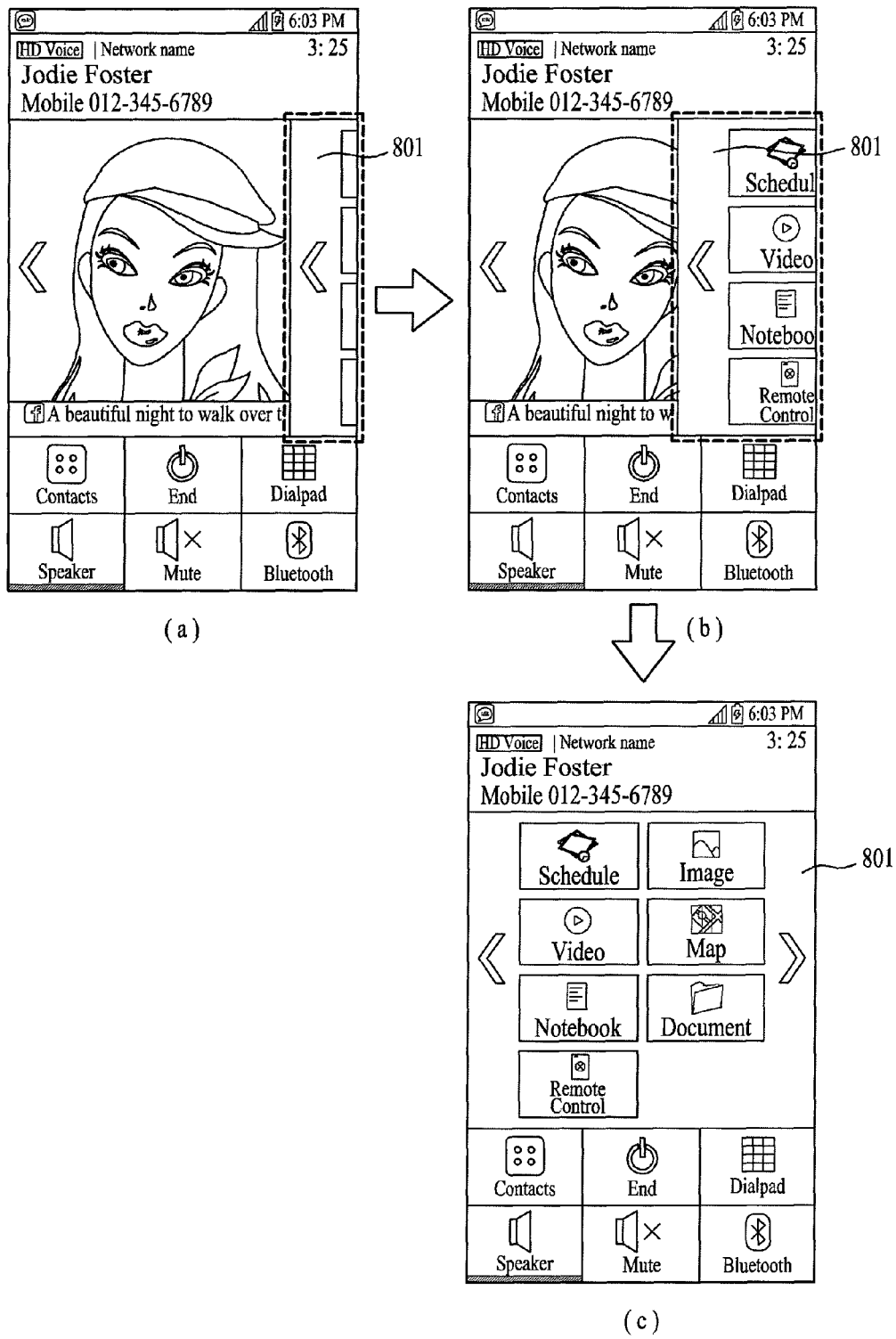
FIG. 8 is a diagram for one example of applying a side effect to a data type menu.

In the example shown in FIG. 6 or FIG. 7, if the data type menu is displayed on the touchscreen or set to disappear from the touchscreen, the controller 180 may add an animation effect that a displayed region of the data type menu increases or decreases gradually. For instance, the controller 180 may be able to apply a slide effect that the data type menu 801 slides to move in one direction of the touchscreen in a manner of changing an output of the touchscreen in order as shown in FIGS. 8 (*a*) to 8 (*c*). In case that the data type menu 801 disappears from the touchscreen, the output of the touchscreen may be changed in reverse order to the order shown in FIGS. 8 (*a*) to 8 (*c*).

From the data type menu shown in FIG. 6 or FIG. 7, if a data type to share is selected, the controller 180 may make a request for the data sharing to the counterpart terminal in the course of the voice call (S406). If the counterpart terminal accepts the data sharing, the controller 180 controls the first data sharing screen to be displayed on the touchscreen and may also control the counterpart terminal to display a second data sharing screen corresponding to the first data sharing screen (S407). In this case, the second data sharing screen may include a clone screen of the first data sharing screen. In particular, each of the first data sharing screen and the second data sharing screen may be able to display the same content and a change of the first data sharing screen may trigger a change of the second data sharing screen.

While the data sharing is in progress between the mobile terminal 100 and the counterpart terminal, a first authority may be granted to the mobile terminal 100 only. In this case, the first authority may include an input authority of a command for triggering a change of the first data sharing screen and may include one of a control authority for controlling manipulation buttons displayed on each of the first data sharing screen and the second data sharing screen, a page turning authority, a page zoom-in/out authority, a handwriting input mode enter authority and the like.

Since the first authority for controlling the first data sharing screen is granted to the mobile terminal 100 only, the user of the mobile terminal 100 may be able to control the first data sharing screen and the second data sharing screen corresponding to the clone screen of the first data sharing screen through appropriate inputs. On the other hand, since the first authority is not granted to the counterpart terminal, the counterpart may not be able to control the first data sharing screen.

Figure 17A:
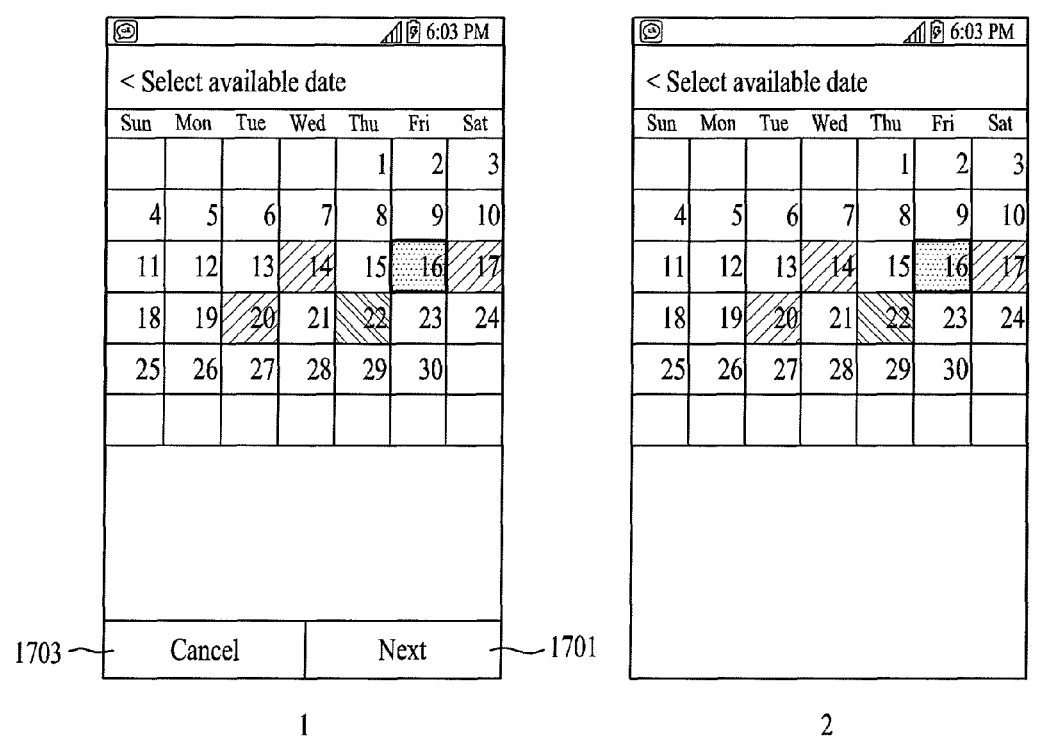

In order to clarify that the control authority of the first data sharing screen is granted to the mobile terminal 100 only, the controller 180 may control the manipulating button for controlling the first data sharing screen to be displayed on the first data sharing screen only and may also control the manipulating button not to be displayed on the second data sharing screen (cf. in FIG. 17A (1) and FIG. 17A (2), buttons Next and Cancel are displayed on the first data sharing screen only).

When the manipulating button is displayed on the second data sharing screen, even if the counterpart applies a touch input to the manipulating button displayed on the second data sharing screen, the controller 180 may be able to control the first data sharing screen not to reflect a result of the button manipulation performed on the second data sharing screen. Hence, both of the first data sharing screen and the second data sharing screen corresponding to the clone screen of the first data sharing screen may not be controlled by the manipulation performed by the counterpart.

Yet, it is not mandatory for the first authority to be granted to the mobile terminal 100 only. Occasionally, the controller 180 may control the first authority or a second authority smaller than the first authority to be granted to the counterpart terminal.

For instance, in the scheduling sharing mentioned in the following description, the controller 180 may be able to grant the second authority of selecting a date indicated in a schedule to the counterpart terminal. In one of an image, a video, a handwriting input, a document sharing and the like, the controller 180 may control the second authority to be granted to the counterpart terminal in case of a handwriting input entry command. Moreover, an authority of ending the data sharing with the mobile terminal 100 may be granted to the counterpart terminal. In case that an operation matched to the second authority occurs in the counterpart terminal having the second authority, the controller 180 may control a first data sharing image to be adjusted based on the operation occurring in the counterpart terminal. As the first data sharing image is adjusted, it may be able to adjust a second data sharing image corresponding to a clone image of the first data sharing image.

Based on the above description of the first authority and the second authority, the data sharing between the mobile terminal 100 and the counterpart terminal shall be described in detail as follows. Prior to describing the data sharing between the mobile terminal 100 and the counterpart terminal, a process for the mobile terminal 100 to make a request for the data sharing to the counterpart terminal is described in detail with reference to FIG. 9 as follows.

Figure 9:
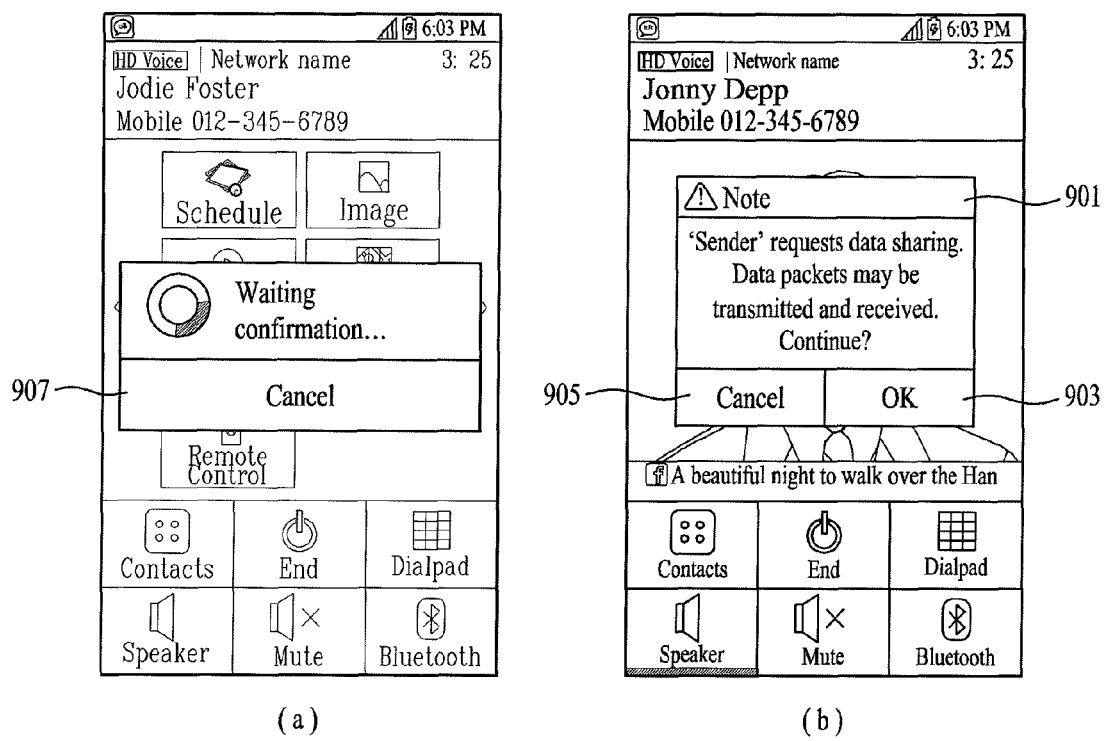
FIG. 9 is a diagram for one example for a controller 180 to make a data sharing request to a counterpart terminal.

FIG. 9 is a diagram for one example for the controller 180 to make a data sharing request to the counterpart terminal.

Assume that FIG. 9 (a) shows one example of an output screen of the mobile terminal 100 and that FIG. 9 (b) shows one example of an output screen of the counterpart terminal.

Referring to FIG. 9, if a data type a user intends to share is selected from the data type menu shown in FIG. 6 or FIG. 7, the controller 180 makes a request for a sharing of the selected data type to the counterpart terminal and may be also able to enter a standby mode for waiting for a response from the counterpart terminal (FIG. 9 (a)). Having received the request for sharing the selected data type, referring to FIG. 9 (b), the counterpart terminal may be able to display a selection menu 901 for determining whether to accept the request for sharing the selected data type from the mobile terminal 100. In case of displaying the selection menu 901, the counterpart terminal may control a warning notice, which indicates that data packet transceiving may occur for the sharing of the selected data type, to be included (e.g., FIG. 9 (b) shows that a warning notice indicating that the data packet transceiving may occur in an image sharing is displayed.). In case that the mobile terminal 100 and the counterpart terminal are set to share location information in-between, a warning notice indicating that the location information of the counterpart terminal may be possibly provided to the mobile terminal 100 may be further included (not shown in the drawing).

In the example shown in FIG. 9 (b), in case that the counterpart terminal accepts the sharing request (e.g., a confirmation button OK 903 is selected), the controller 180 may control the second data sharing screen corresponding to the first data sharing screen to be displayed via the counterpart terminal.

On the contrary, if the counterpart terminal rejects the sharing request (e.g., a cancel button 905 is selected) or a user of the mobile terminal 100 set to the standby mode cancels the sharing request (e.g., a cancel button 907 is selected), the controller 180 cancels the sharing request made to the counterpart terminal and may control the touchscreen to return to a call connected screen.

Yet, it may be unnecessary for the sharing requesting and accepting procedure to be performed at all times. If the sharing request from the counterpart terminal to the mobile terminal 100 is configured in advance, the output examples shown in FIG. 9 (a) and FIG. 9 (b) may be omitted.

In the following description, a process for the mobile terminal 100 and the counterpart terminal to display the first data sharing screen and the second data sharing screen per the data type shown in FIG. 7, respectively is explained in detail. For clarity of the following description, if necessary, an output screen of the mobile terminal 100 (e.g., a caller side terminal) and an output screen of the counterpart terminal (e.g., a receiver side terminal) are simultaneously shown. When the output screen of the mobile terminal 100 and the output screen of the counterpart terminal are simultaneously shown, an identification reference number '1' is attached to the drawing related to the output screen of the mobile terminal 100 and an identification reference number '2' is attached to the drawing related to the output screen of the counterpart terminal.

In the data types shown in FIG. 6 or FIG. 7, a case of setting the mobile terminal 100 and the counterpart terminal to share a handwriting input in-between is described in detail as follows.

First of all, if a notebook item is selected from the data type menu shown in FIG. 6 or FIG. 7, the controller 180 may be able to make a request for sharing a handwriting input with the counterpart terminal. Making the data sharing request to the counterpart terminal is already described in detail with reference to FIG. 9 and its details shall be omitted from the following description.

If the counterpart terminal accepts the handwriting sharing request from the mobile terminal 100, the controller 180 controls a first data sharing screen and a second data sharing screen, which are configured to enable handwriting inputs, to be displayed via the mobile terminal 100 and the counterpart terminal, respectively and may control each of the mobile terminal 100 and the counterpart terminal to enter a handwriting input mode. How the mobile terminal 100 and the counterpart terminal display the first data sharing screen and the second data sharing screen, respectively will be described in detail with reference to FIG. 10 as follows.

FIG. 10 is a diagram for one example of outputs from the mobile terminal 100 and the counterpart terminal if the mobile terminal 100 and the counterpart terminal are set to share handwriting inputs in-between.

Figure 10A:
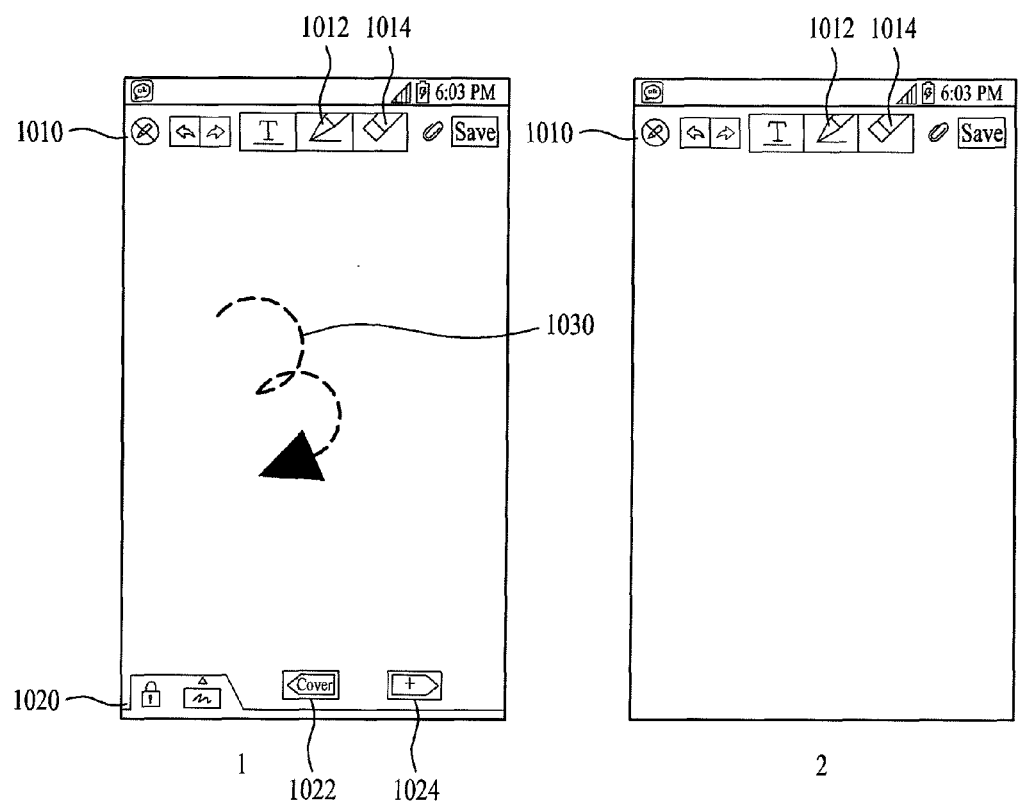

Referring to FIG. 10, if the counterpart terminal accepts the handwriting sharing request made by the mobile terminal 100, the controller 180 controls each of the mobile terminal 100 and the counterpart terminal to enter a handwriting input mode and may also control a drawing tool (e.g., FIG. 10A shows that a brush tool 1012 and an eraser tool 1004 are included) 1010 to be displayed (FIG. 10A 1 and FIG. 10A 2). Moreover, the controller 180 may be able to further control a control menu 1020 including page turning buttons 1022 and 1024 to be further displayed. The page turning buttons shown in FIG. 10A may include a previous page button and a next page button 1024. In this case, if a page currently displayed on each of the first data sharing screen and the second data sharing screen is a first page or a last page, one of the previous page button 1022 and the next page button 1024 may be changed into a page add button (e.g., FIG. 10A shows one example that the next page button 1024 is changed into the add button).

A user of the mobile terminal 100 and a counterpart of the counterpart terminal may be able to input handwriting inputs to canvas regions of the first data sharing screen and the second data sharing screen using the drawing tools 1010 displayed on the first data sharing screen and the second data sharing screen, respectively.

If each of the mobile terminal 100 and the counterpart terminal enters the handwriting input mode, the controller 180 may be able to control a first handwriting data, which is drawn on the touchscreen by the user of the mobile terminal, to be displayed on both of the first data sharing screen and the second data sharing screen. Moreover, in order for a second handwriting data, which is drawn by the user of the counterpart terminal, to be displayed on both of the second data sharing screen and the first data sharing screen, the controller 180 may be able to grant a second authority for controlling the first data sharing screen to the counterpart terminal.

Figure 10B:
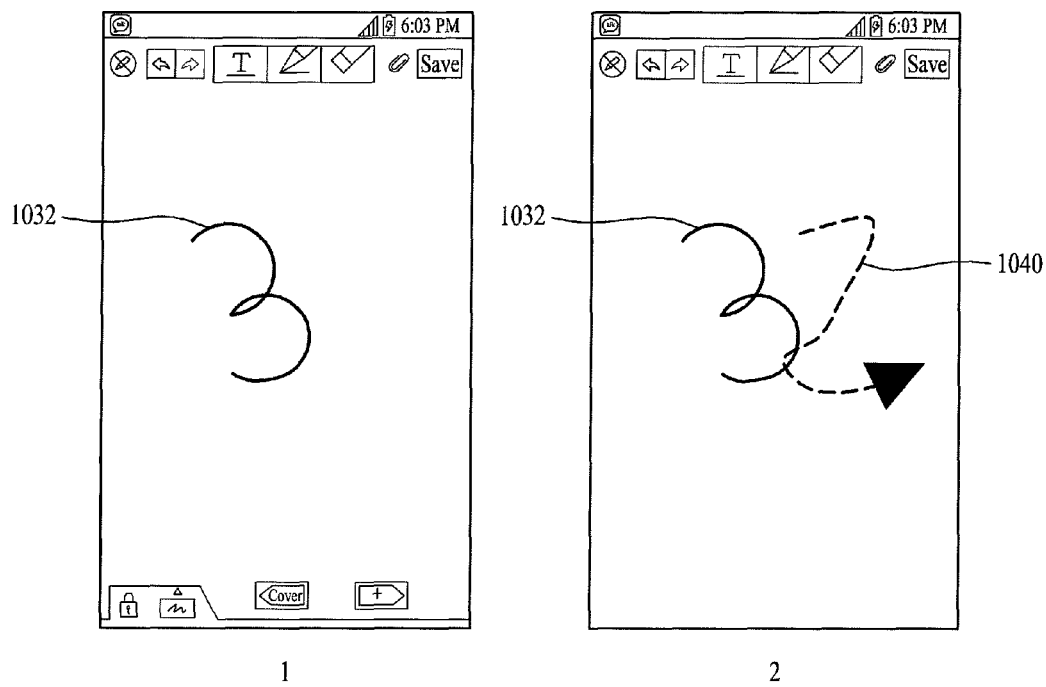

For instance, in case that the user of the mobile terminal 100 applies a touch input to the touchscreen along a first desired trace 1030 (FIG. 10A 1), the controller 180 may be able to control a first handwriting data 1032, which is drawn along the first desired trace 1030, to be displayed on both of the first data sharing screen and the second data sharing screen (FIG. 10B 1, FIG. 10B 2). In particular, in a manner of controlling the first handwriting data 1032 to be transmitted to the counterpart terminal, the controller 180 may control the first handwriting data 1032 to be displayed on the second data sharing screen of the counterpart terminal.

Figure 10C:
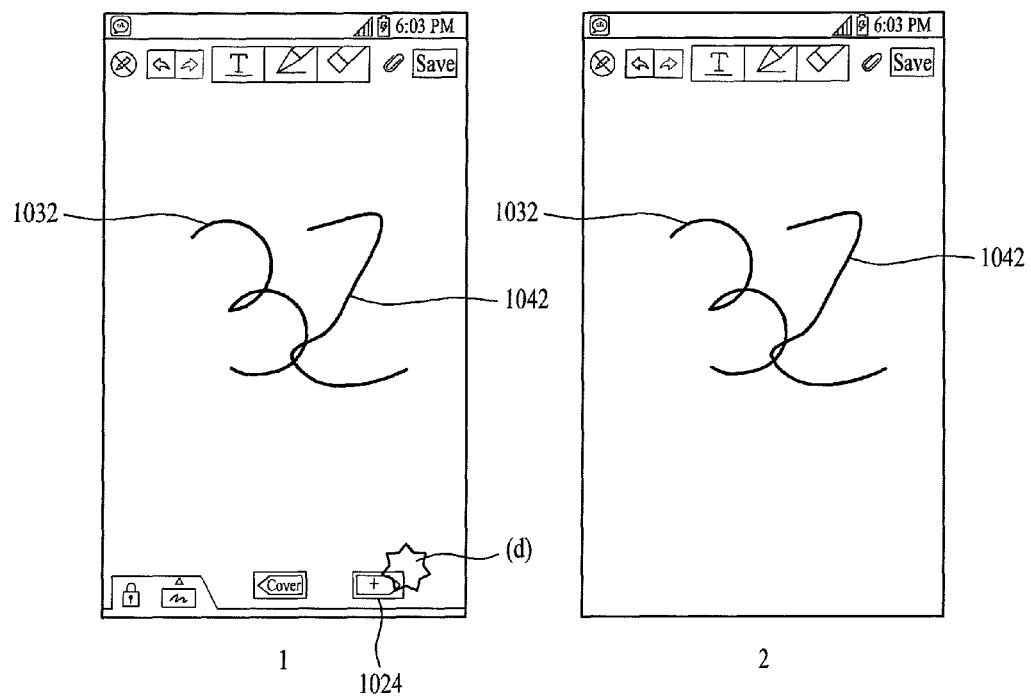

On the other hand, if the user of the counterpart terminal having the second authority granted thereto applies a touch input to the counterpart terminal along a second desired trace 1040 (FIG. 10B 2), the controller 180 may control the second handwriting data 1042, which is drawn along the second desired trace 1040, to be displayed on both of the second data sharing screen and the first data sharing screen (FIG. 10C 1, FIG. 10C 2). In particular, the controller 180 receives the second handwriting data 1042 from the counterpart terminal and may then control the second handwriting data 1042 to be displayed on the first data sharing screen. Hence, the controller 180 may control both of the first handwriting data 1032 and the second handwriting data 1042 to be simultaneously displayed on each of the first data sharing screen and the second data sharing screen.

Figure 10D:
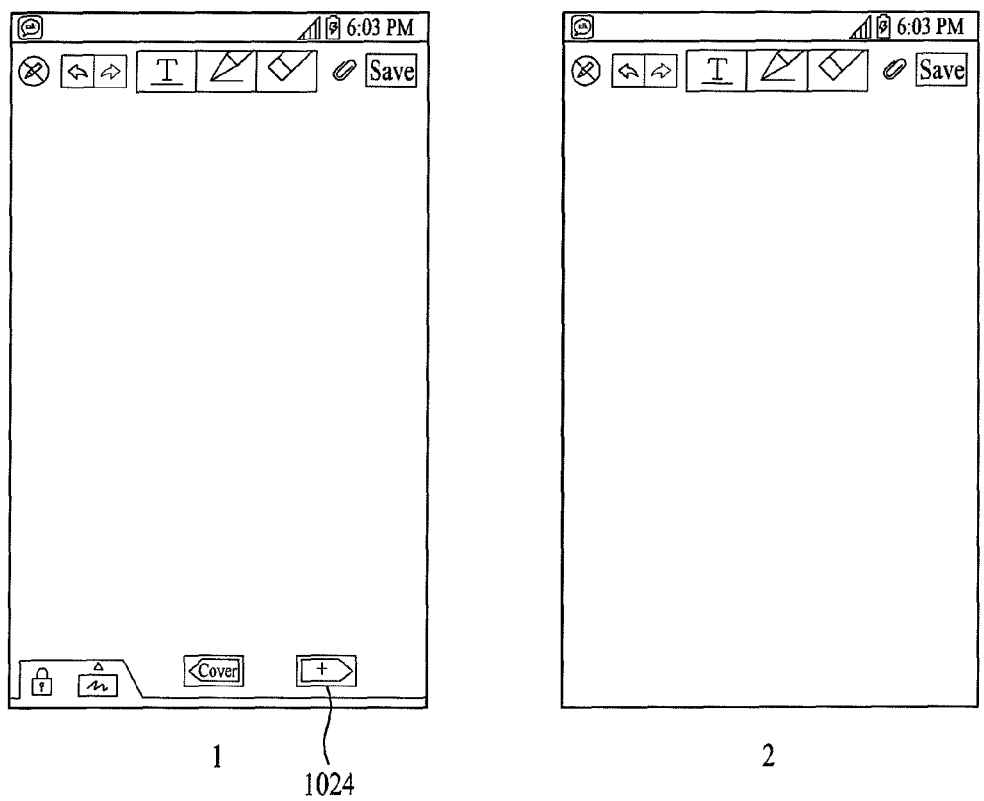

While the first handwriting data 1032 and the second handwriting data 1042 are displayed on each of the first data sharing screen and the second data sharing screen, if a new page add button 1024 is selected, the controller 180 may control the first handwriting data 1032 and the second handwriting data 1042 to disappear from the first data sharing screen and may also control a new canvas to be displayed on the first data sharing screen (FIG. 10D 1). When the first handwriting data 1032 and the second handwriting data 1042 disappear from the first data sharing screen, the controller 180 may control the first handwriting data 1032 and the second handwriting data 1042 to disappear from the second data sharing screen and may also control a new canvas to be displayed on the second data sharing screen (FIG. 10D 2).

Despite that the first handwriting data 1032 and the second handwriting data 1042 disappear from each of the first data sharing screen and the second data sharing screen in accordance with the selection of the new page add button 1024, if the previous button 1022 is selected, it is apparent that the previously inputted first and second handwriting data 1032 and 1042 can be checked.

When the user of the mobile terminal 100 manipulates the page turning buttons 1022 and 1024 (FIG. 10E 1), if a third handwriting data 1052 is being inputted to the counterpart terminal (FIG. 10E 2), the controller 180 may control a page turning command given by the user not to be processed. In particular, while the counterpart is inputting the third handwriting data 1052, if the page turning command is processed, the third handwriting data 1052 of the counterpart should be stopped at that moment.

If a signal indicating that the third handwriting data 1052 is being inputted to the second data sharing screen is received from the counterpart terminal, the controller 180 may control the first handwriting data 1032 and the second handwriting data 1042 not to disappear from each of the first data sharing screen and the second data sharing screen despite that the page turning command is inputted.

Figure 10E:
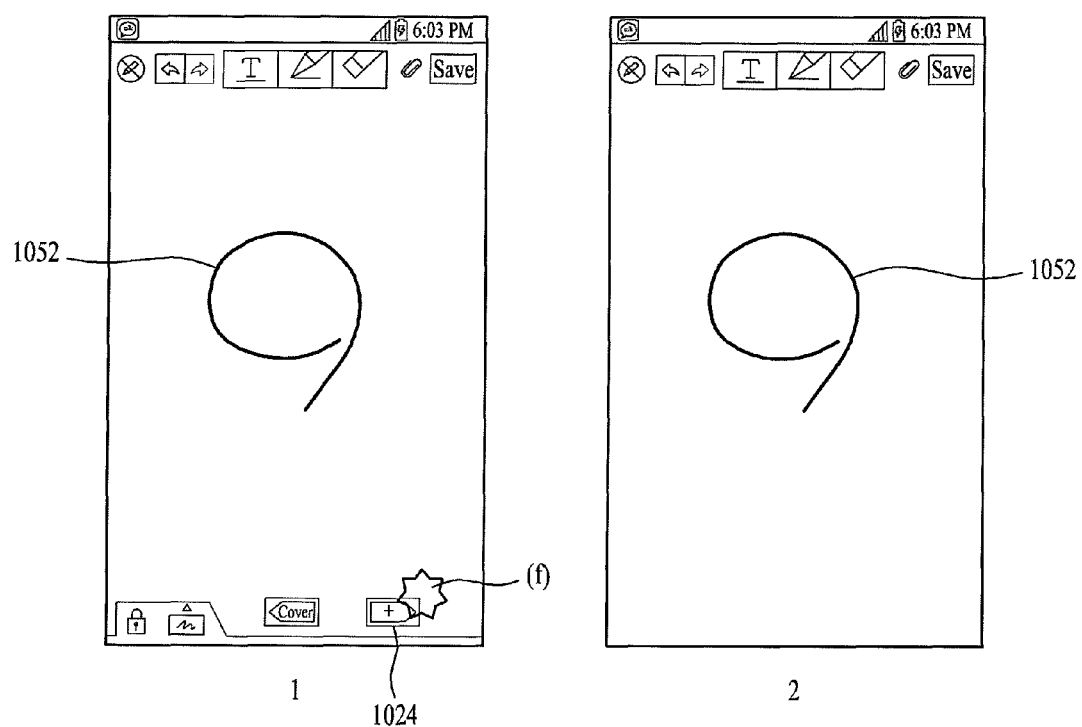
Figure 10F:
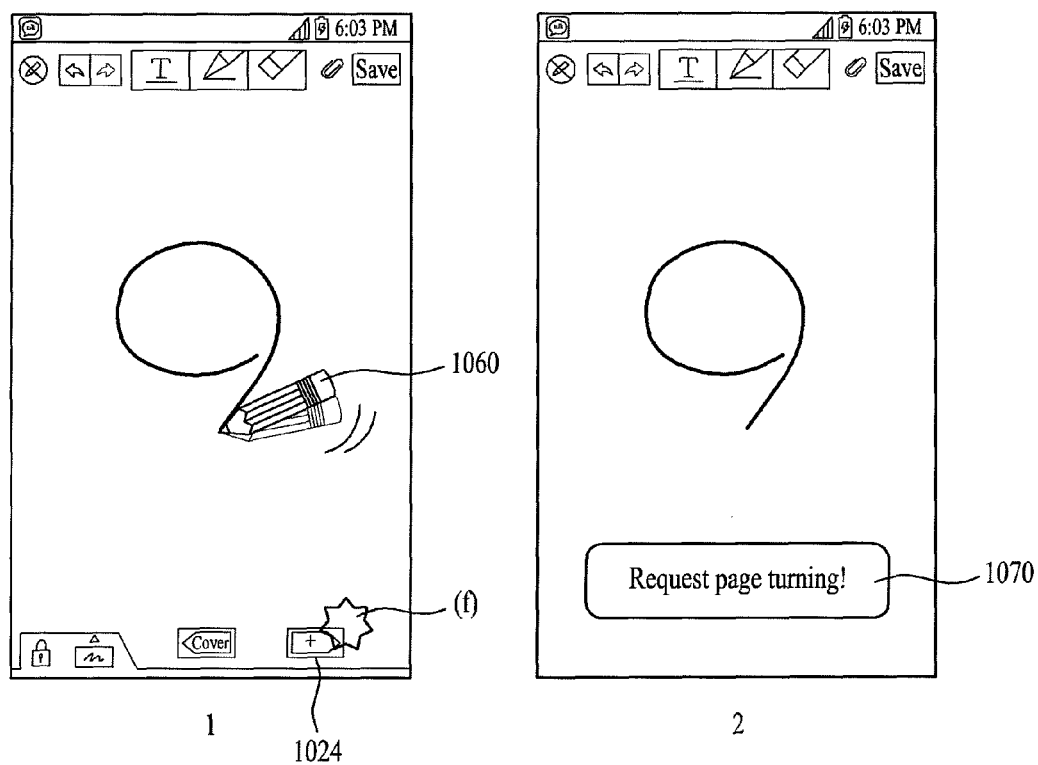

Moreover, in response to the signal indicating the input of the third handwriting data 1052, referring to FIG. 10F 1, the controller 180 may be able to provide the first data sharing screen with a first alarm 1060 indicating that the counterpart is inputting the third handwriting data 1052 (e.g., FIG. 10F 1 shows that a moving pencil animation is provided as the alarm). In particular, the controller 180 may control the first alarm 1060 to be provided only if the page turning command is inputted in the course of inputting the third handwriting data 1052 to the counterpart terminal.

Furthermore, the controller 180 may control a second alarm 1070, which indicates that the page turning command is inputted to the mobile terminal 100, to be displayed on the counterpart terminal (FIG. 10F 2).

Referring to FIG. 10F, if the page turning command is inputted to the mobile terminal 100 in the course of inputting the third handwriting data 1052 to the counterpart terminal, the first alarm 1060 and the second alarm 1070 are displayed for example. Yet, the page turning command exemplarily shown in FIG. 10E is just exemplary, by which the present invention may be non-limited. According to another embodiment of the present invention, while the third handwriting data 1052 is inputted to the counterpart terminal, if a canvas zoom-in/out command is inputted to the mobile terminal 100 or a command for ending the handwriting input sharing on inputting the third handwriting data 1052 is inputted, the controller 180 may control the first alarm 1060 and the second alarm 1070 to be displayed.

Figure 10G:
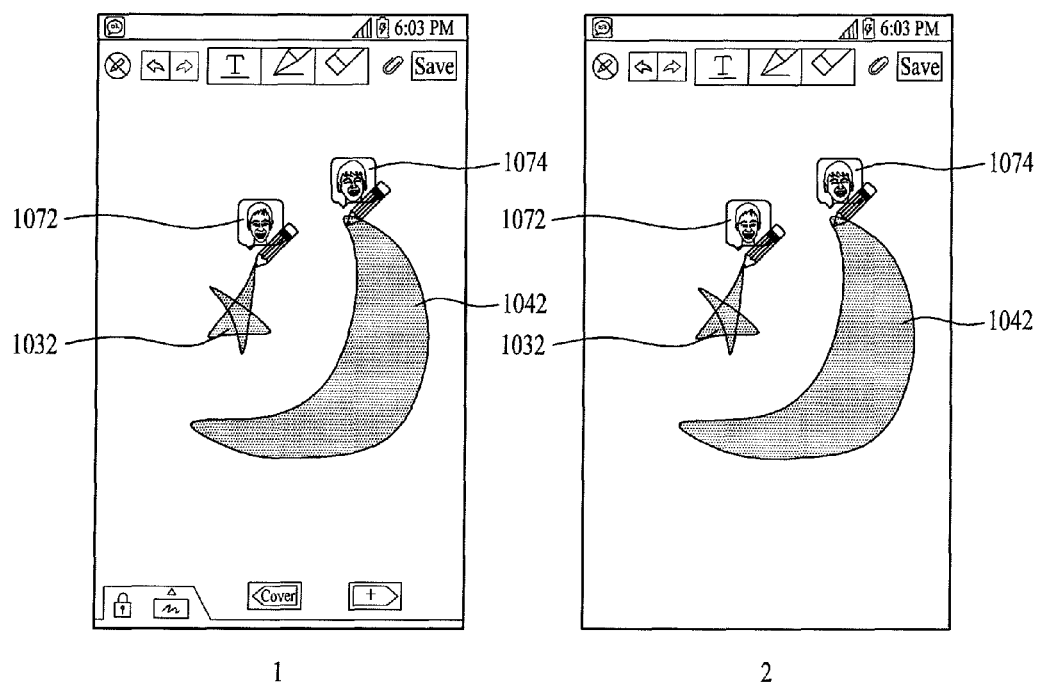

In case that both of the first handwriting data 1032 and the second handwriting data 1042 are simultaneously displayed on each of the first data sharing screen and the second data sharing screen, the controller 180 may control the first handwriting data 1032 and the second handwriting data 1042 to be visually discriminated from each other. For instance, referring to FIG. 10G 1 and FIG. 10G 2, the controller 190 controls the first handwriting data 1032 and the second handwriting data 1042 on the first data sharing screen and the second data sharing screen to be linked to photos 1072 and 1074 of the subjects having drawn the first handwriting data 1032 and the second handwriting data 1042, respectively, thereby controlling the first handwriting data 1032 and the second handwriting data 1042 to be identifiable from each other. The controller 180 enables the first handwriting data 1032 and the second handwriting data 1042 to be identifiable from each other in a manner of controlling the photo 1072 of the user to be displayed on the first handwriting data 1032 inputted by the user of the mobile terminal 100 and controlling the photo 1074 of the counterpart to be displayed on the second handwriting data 1042 inputted by the counterpart. FIG. 10G shows one example that the first handwriting data 1032 and the second handwriting data 1042 are discriminated from each other in a manner that the user photo and the counterpart photo are linked to the first handwriting data 1032 and the second handwriting data 1042, respectively, by which the present invention may be non-limited. Alternatively, the mobile terminal 100 according to the present invention may control the first handwriting data 1032 and the second handwriting data 1042 to be configured in different colors. Alternatively, the mobile terminal 100 according to the present invention may control a name of the user and a name of the counterpart to be displayed on the first handwriting data 1032 and the second handwriting data 1042, respectively.

In the following description, explained in detail is a case that the mobile terminal 100 and the counterpart terminal are configured to share images with each other.

If an image item is selected from the data type menu shown in FIG. 6 or FIG. 7, prior to making an image sharing request to the counterpart terminal, the controller 180 may be able to control a screen, which is provided to select an image file to share with the counterpart terminal, to be displayed. This is described with reference to FIG. 11 as follows.

Figure 11:
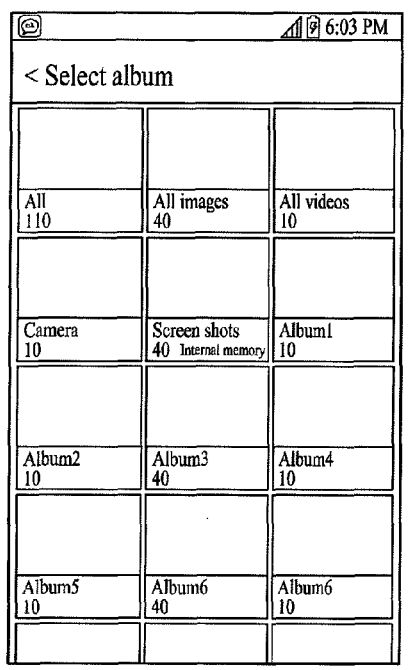
FIG. 11 is a diagram for one example of a screen provided to a touchscreen to select an image file to share with a counterpart terminal.
Figure 11:
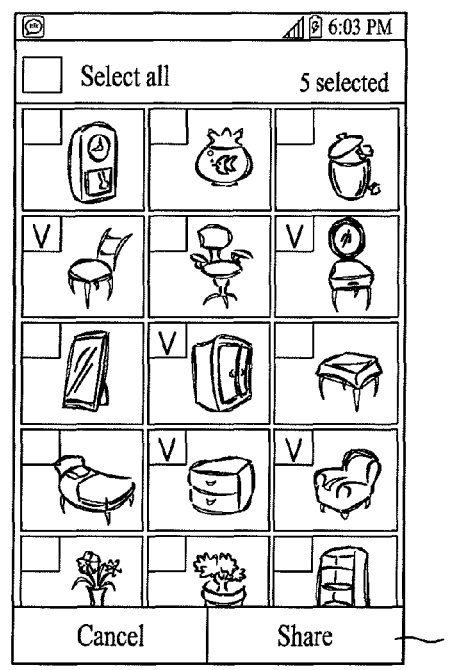

FIG. 11 is a diagram for one example of a screen provided to a touchscreen to select an image file to share with a counterpart terminal. In case that an image is set to be shared in the data type menu shown in FIG. 6 or FIG. 7, referring to FIG. 11A, the controller 180 may control a gallery to be displayed in a manner of being sorted as an album view. If a prescribed album is selected (FIG. 11 (*a*)), the controller may be able to display image files included in the selected album together with thumbnails (FIG. 11 (*b*)). Regarding the screen shown in FIG. 11B, if the user selects the image to share with the counterpart and then selects a share button 1101, the controller 180 may be able to make an image sharing request to the counterpart terminal. As the data sharing request made to the counterpart terminal is already described in detail with reference to FIG. 9, details of the image sharing request shall be omitted from the following description for clarity.

If the counterpart terminal accepts the image sharing request made by the mobile terminal, the controller 180 may be able to transmit an image file set to share to the counterpart terminal. If the transmission of at least one portion of the image file to share is completed, the controller 180 may control the first data sharing screen and the second data sharing screen to be displayed on the mobile terminal 100 and the counterpart terminal, respectively. How the mobile terminal 100 and the counterpart terminal display the first data sharing screen and the second data sharing screen, respectively is described in detail with reference to FIG. 12 as follows.

FIG. 12 is a diagram for one example of outputs from the mobile terminal 100 and the counterpart terminal if the mobile terminal 100 and the counterpart terminal are set to share images with each other.

Referring to FIG. 12, in case that an image is set to be shared between the mobile terminal 100 and the counterpart terminal, the controller 180 controls the first data sharing screen, on which the image set to share is displayed, to be displayed on the touchscreen and may also control the second data sharing screen, which corresponds to the clone screen of the first data sharing screen, to be displayed on the counterpart terminal. In particular, referring to FIG. 12A 1 and FIG. 12A 2, the controller 180 may be able to control the mobile terminal 100 and the counterpart terminal to display the same image file. Moreover, the controller 180 may control a total number 1203 of the image files set to share with the counterpart terminal and a sequence number of a currently outputted image file to be further displayed.

Figure 12A:
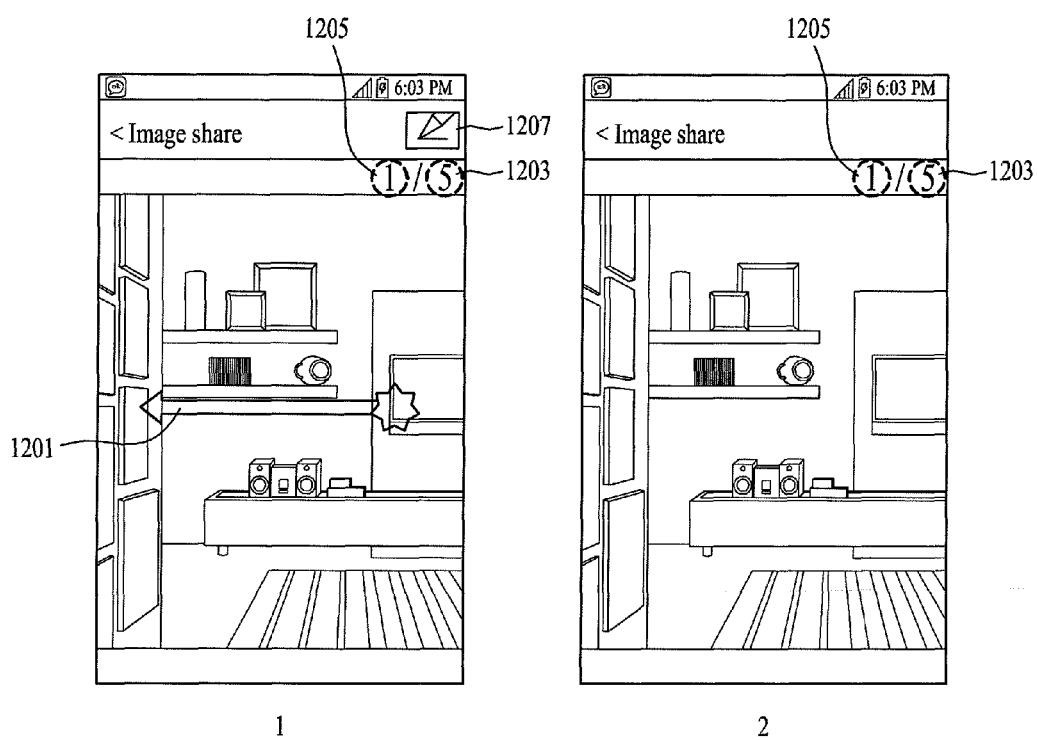
FIGS. 12A-12D are diagrams for one example of outputs from a mobile terminal 100 and a counterpart terminal if the mobile terminal 100 and the counterpart terminal are set to share images with each other.
Figure 12B:
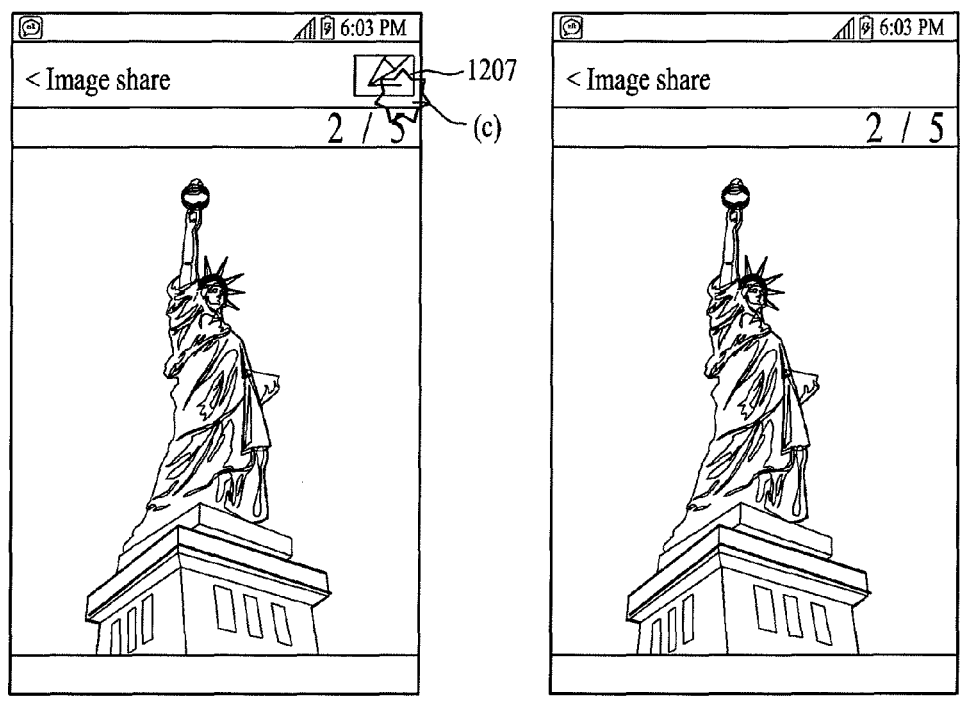

In case that a plurality of the image files set to share with the counterpart terminal exist, the controller 180 may control the image file, which will be displayed on each of the first data sharing screen and the second data sharing screen, to be adjusted in accordance with a user command 1201. For instance, if a user inputs a page turning command (e.g., a flicking input 1201 is applied to the touchscreen in the example shown in FIG. 12A) (FIG. 12A), the controller 180 may control an image file of a next sequence number to be displayed on the first data sharing screen (FIG. 12B 1). Moreover, the controller 180 provides a user command to the counterpart terminal and the controls the image file of the next sequence number to be displayed on the counterpart terminal as well (FIG. 12B 2).

While the mobile terminal 100 and the counterpart terminal are sharing the image file with each other, if a handwriting input enter command is inputted to the mobile terminal 100 by a user manipulation, the controller 180 may control each of the mobile terminal 100 and the counterpart terminal to enter a handwriting input mode. FIG. 12B 1 shows one example that each of the mobile terminal 100 and the counterpart terminal enters the handwriting input mode if a handwriting input activate button 1207 displayed on the touchscreen is touched. Yet, it is not mandatory for the entry into the handwriting input mode to be performed via an icon displayed on the touchscreen. According to another embodiment of the present invention, each of the mobile terminal 100 and the counterpart terminal may enter the handwriting input mode by a manipulation of an external key, a voice command or the like.

Figure 12C:
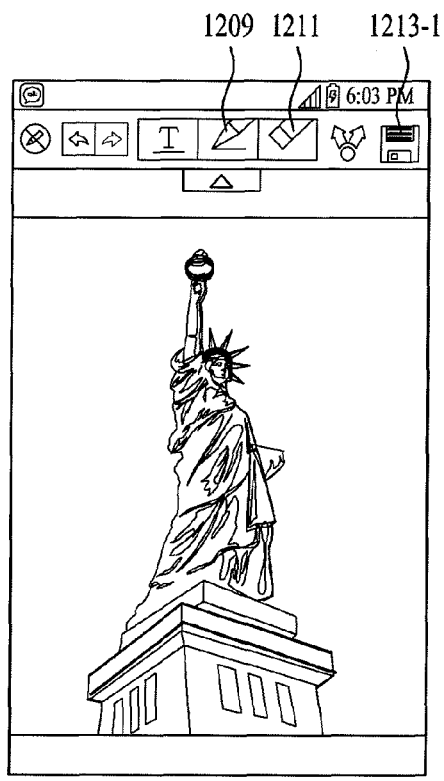
Figure 12C:
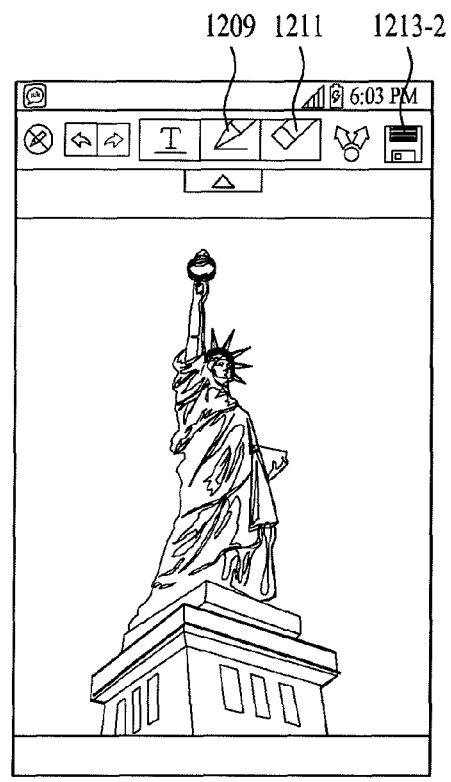

Once each of the mobile terminal 100 and the counterpart terminal enters the handwriting input mode, the controller 180 may control drawing tools (e.g., brush tool 1209 and eraser tool 1211) available for the handwriting inputs to be displayed on the first data sharing screen and the second data sharing screen, respectively (FIG. 12C 1, FIG. 12C 2).

The user of the mobile terminal 100 and the counterpart may be able to input handwriting inputs using the drawing tools displayed on the first data sharing screen and the second data sharing screen, respectively. How to input the handwriting input to the touchscreen using the drawing tool is already described with reference to FIG. 10 and its details shall be omitted from the following description.

While each of the mobile terminal 100 and the counterpart terminal stays in the handwriting input mode, the first handwriting data inputted by the user of the mobile terminal 100 may be reflected not only by the first data sharing screen but also by the second data sharing screen. In order to apply the second handwriting data performed by the user of the counterpart terminal not only to the second data sharing screen but also to the first data sharing screen, the controller 180 may be able to grant a second authority of controlling the first data sharing screen to the counterpart terminal. Hence, the handwriting input inputted by the counterpart to the second data sharing screen may be reflected not only by the second data sharing screen but by the first data sharing screen. This is already described with reference to FIG. 10 and its details shall be omitted from the following description.

Subsequently, if a save command is inputted via the mobile terminal 100 or the counterpart terminal, the controller 180 controls the first handwriting data and the second handwriting data to be saved and also controls the handwriting input mode to be ended in each of the mobile terminal 100 and the counterpart terminal.

In case that the save command is inputted in a manner of selecting the save button 1213-1 displayed on the first data sharing screen of the mobile terminal 100, the controller 180 may control the handwriting input mode of each of the mobile terminal 100 and the counterpart terminal to be ended after capturing and saving the output image of the touchscreen containing the handwriting data inputted by each of the user and the counterpart. On the other hand, in case that the save command is inputted in a manner of selecting the save button 1213-2 displayed on the second data sharing screen of the counterpart terminal, the controller 180 may control the handwriting input mode of each of the mobile terminal 100 and the counterpart terminal to be ended without capturing the output image of the touchscreen (yet, the counterpart terminal is able to capture and save the out image of its own).

In the above-described example, the save command for saving the output image depends on the subject having inputted the save command. Yet, it may be unnecessary for the output image saving command to depend on the subject having inputted the save command. According to another embodiment of the present invention, the controller 180 may control the save command inputted to the mobile terminal 100 or the save command inputted to the counterpart terminal to have effect on both of the mobile terminal 100 and the counterpart terminal. For instance, if the save command is performed in the counterpart terminal, the counterpart terminal captures and saves the output image of its own and the controller 180 of the mobile terminal 100 may control the handwriting input mode to be ended by capturing and saving the output image of the touchscreen.

Figure 12D:
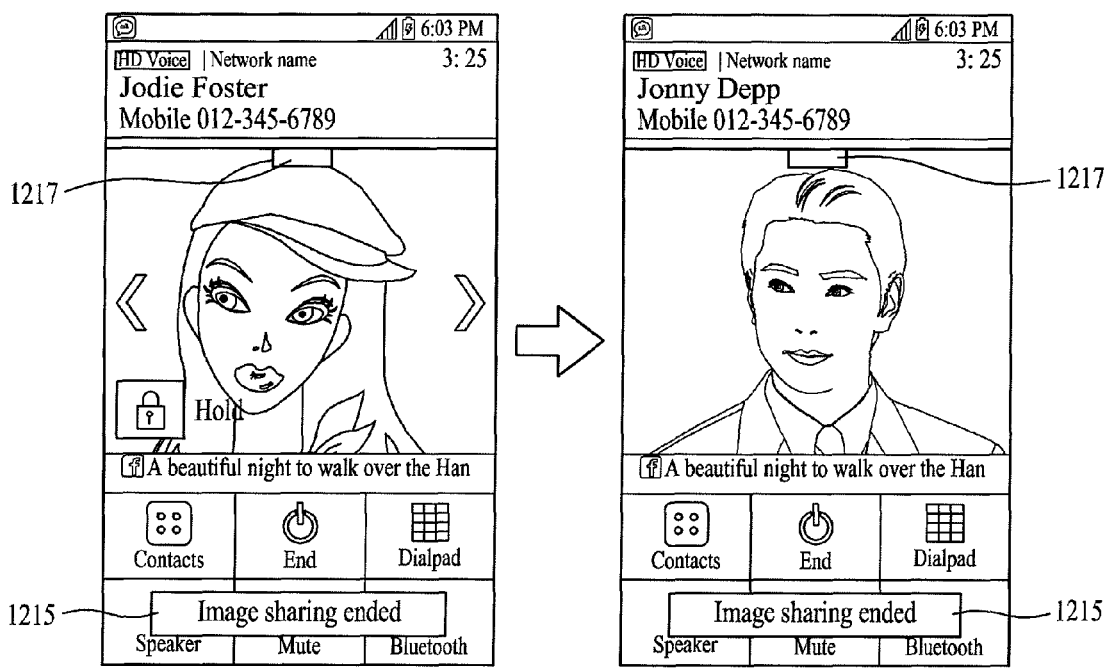

If the appreciation of the image file shared between the mobile terminal 100 and the counterpart terminal is completed, the controller 180 may control the image sharing with the counterpart to be ended. For instance, while an image file of a last sequence number is displayed via the first data sharing image and the second data sharing image, if a next image display command is inputted, the controller 180 determines that the image file appreciation has been completed and may control the image sharing with the counterpart terminal to be ended. Once the image sharing with the counterpart terminal is ended, the controller 180 controls an indication message 1215, which indicates that each image sharing is ended, to be outputted from each of the mobile terminal 100 and the counterpart terminal, controls a share log, which is provided to record operations in the course of outputting the first data sharing screen and the second data sharing screen, to be created, and controls a history view bar 1217, which is provided to display the share log, to be displayed (FIG. 12D 1, FIG. 12D 2).

In the following description, explained in detail is a case that the mobile terminal 100 and the counterpart terminal are configured to share video with each other.

First of all, in case that a video item is selected from the data type menu shown in FIG. 6 or FIG. 7, prior to make a request for a video sharing to the counterpart terminal, the controller 180 may be able to control a screen, which is provided to select a video file to share with the counterpart terminal, to be outputted. This is described with reference to FIG. 13 as follows.

Figure 13:
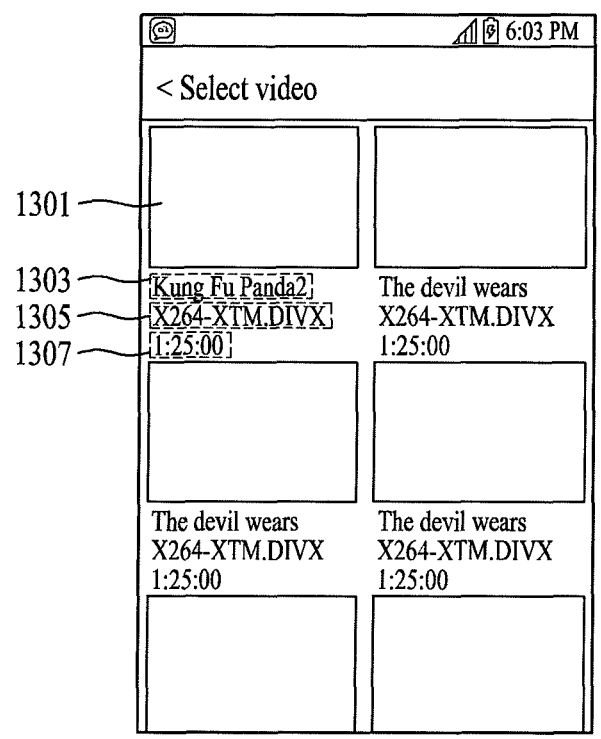
FIG. 13 is a diagram for one example of an output of a touchscreen to guide a selection of a video file to share with a counterpart terminal.

FIG. 13 is a diagram for one example of an output of a touchscreen to guide a selection of a video file to share with a counterpart terminal. If a video is set to be shared in the data type menu shown in FIG. 6 or FIG. 7, referring to FIG. 13, the controller 180 may be able to control a video file list saved in the memory 160 to be displayed. In displaying the video file list, referring to FIG. 13, the controller 180 may control a video thumbnail and a video summary information, which contains a file name 1303, a compression codec 1305, a video file running time 1307 and the like, to be displayed together. In the diagram for the example shown in FIG. 13, if a user selects a video to share with a counterpart, the controller 180 may be able to make a video sharing request to the mobile terminal 100. How to make a data sharing request to the counterpart terminal is already described with reference to FIG. 9 and its details shall be omitted from the following description.

If the counterpart terminal accepts the video sharing request made by the mobile terminal 100, the controller 180 may control the first data sharing screen and the second data sharing screen to be displayed via the mobile terminal 100 and the counterpart terminal, respectively. How the mobile terminal 100 and the counterpart terminal display the first data sharing screen and the second data sharing screen, respectively is described in detail with reference to FIG. 14 as follows.

FIG. 14 is a diagram for one example of outputs from a mobile terminal 100 and a counterpart terminal if the mobile terminal 100 and the counterpart terminal are configured to share video with each other.

Figure 14A:
FIGS. 14A-14C are diagrams for one example of outputs from a mobile terminal 100 and a counterpart terminal if the mobile terminal 100 and the counterpart terminal are configured to share video with each other.
Figure 14A:

Referring to FIG. 14, if a video is set to be shared between the mobile terminal 100 and the counterpart terminal, the controller 180 controls a first data sharing screen including a video play screen to be displayed via the mobile terminal 100 (FIG. 14A 1) and may also control a second data sharing screen, which is a clone screen of the first data sharing screen, to be displayed on the counterpart terminal (FIG. 14A 2). In order for a video play screen to be included in the second data sharing screen like the first data sharing screen, the controller 180 may control the counterpart terminal to play the video by streaming.

While the video is played via the first data sharing screen and the second data sharing screen, if a handwriting input mode enter command is inputted to the mobile terminal 100 (e.g., a handwriting input mode enter button 1401 is touched), the controller 180 stops playing the first data sharing screen and the second data sharing screen and may enter a handwriting input mode having a background of a capture image at the moment of inputting the handwriting input enter command.

Figure 14B:
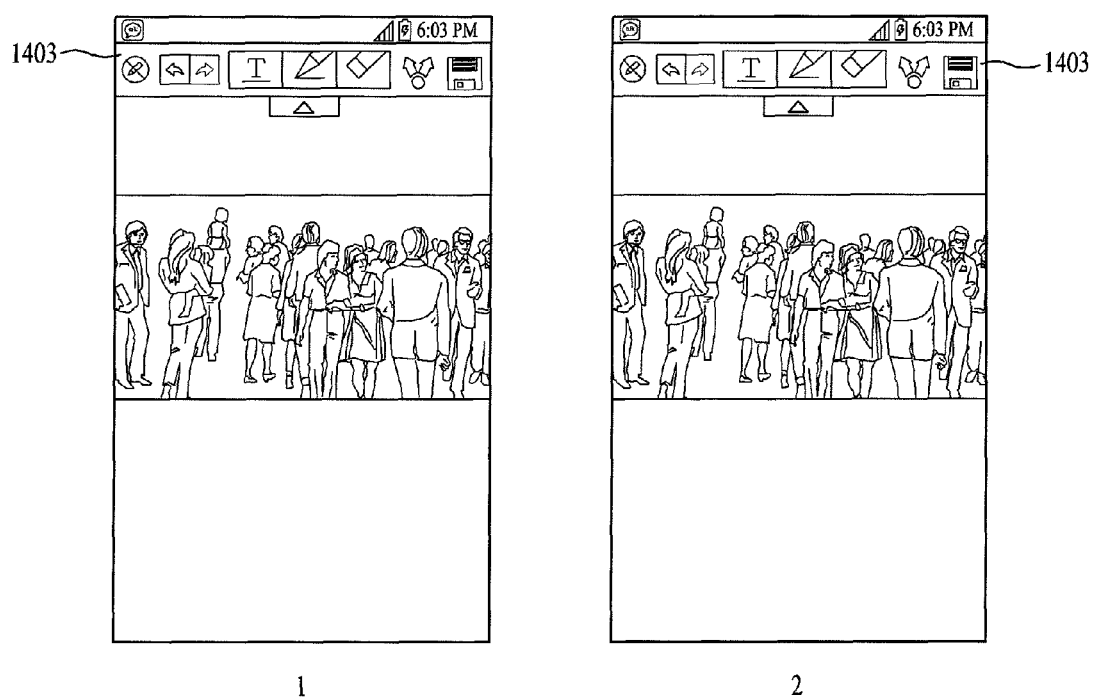

Once the handwriting input mode is entered, as mentioned in the foregoing description with reference to FIG. 12C, the controller 180 may control a drawing tool 1403, which is available for a handwriting input, to be displayed on each of the first data sharing screen and the second data sharing screen (FIG. 14B 1, FIG. 14B 2). How to end the handwriting input sharing between the mobile terminal 100 and the counterpart terminal and the handwriting input mode is as good as described with reference to FIG. 10, details shall be omitted from the following description.

Once the handwriting input mode is ended, the controller 180 may control the video to be resumed from the timing point of the step via each of the first data sharing screen and the second data sharing screen.

In the above-described example, if the handwriting input mode enter command is inputted to the mobile terminal 100, the play of the video is stopped. Yet, it may be unnecessary for the video play to be stopped. According to another embodiment of the present invention, when a handwriting input mode having a capture image at the moment of inputting the handwriting input enter command as a background is entered, the controller 180 may control a video to continue being played on a background without interruption. In doing so, if the handwriting input mode stops, the controller 180 may control each of the first data sharing screen and the second data sharing screen to return to the video play screen by switching the video in progress to a foreground state from a background state.

If each of the mobile terminal 100 and the counterpart terminal is set to the handwriting input mode, the controller 180 may control a bookmark to be formed at the timing point of entering the handwriting input mode. In particular, the controller 180 may control a bookmark create command to be contained in the command for entering the handwriting input mode. Hence, even if the video play continues in the course of the handwriting input mode, it may be able to control the video to be played from the timing point of entering the handwriting input mode using the bookmark.

Figure 14C:
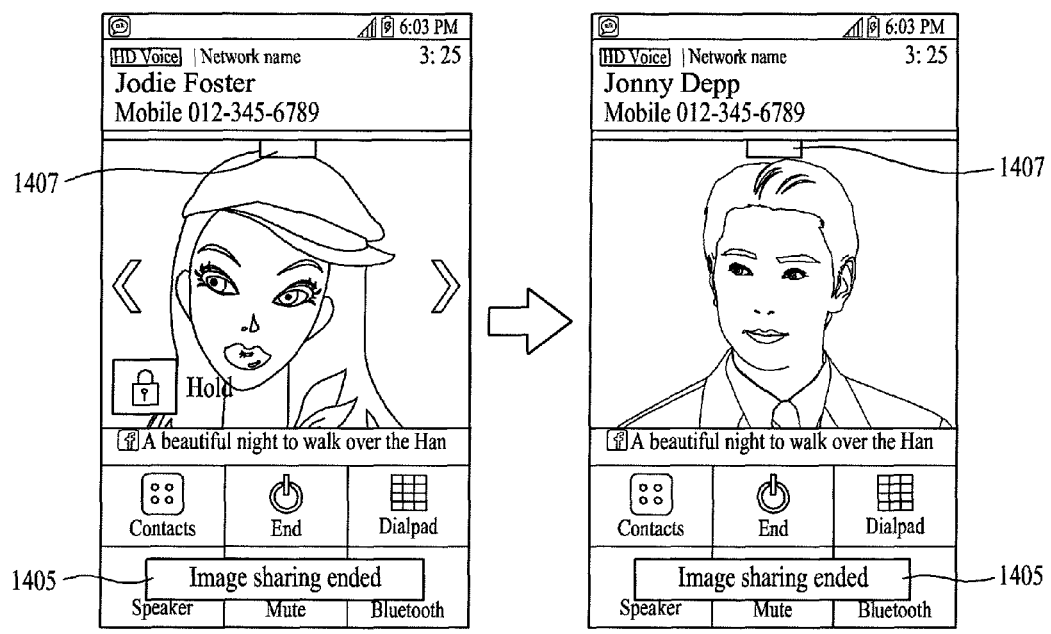

Once the play of the video file shared between the mobile terminal 100 and the counterpart terminal is completed, the controller 180 may control the video sharing with the counterpart terminal to be ended. Once the video sharing with the counterpart terminal is ended, the controller 180 controls an indication message 1405, which indicates the image sharing has been ended, to be outputted from each of the mobile terminal 100 and the counterpart terminal, controls a share log, which is provided to record operations in the course of outputting the first data sharing screen and the second data sharing screen, to be created, and controls a history view bar 1407, which is provided to display the share log, to be displayed (FIG. 14C 1, FIG. 14C 2).

In the following description, explained in detail is a case that the mobile terminal 100 and the counterpart terminal are configured to share locations with each other.

If a map item is selected from the data type menu shown in FIG. 6 or FIG. 7, prior to making a request for sharing location information with the counterpart terminal, the controller 180 may control a screen, which is provided to select a location to share, to be outputted. This is described with reference to FIG. 15 as follows.

Figure 15:
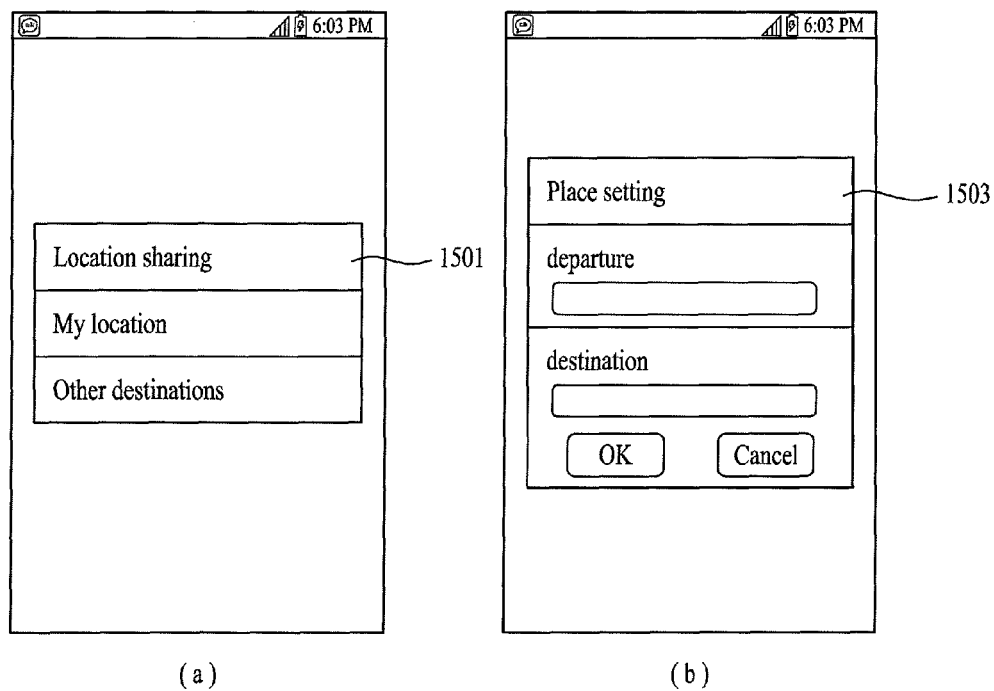
FIG. 15 is a diagram for one example of an output of a touchscreen to guide a selection of a location to share with a counterpart.

FIG. 15 is a diagram for one example of an output of a touchscreen to guide a selection of a location to share with a counterpart. If a map item is selected from the data type menu shown in FIG. 6 or FIG. 7, referring to FIG. 15 (*a*), the controller 180 may be able to control a selection menu 1501, which is provided to select location information to share, to be outputted. In the selection menu 1501 shown in FIG. 15

(a), an item 'My location' may be provided to share a current location of the mobile terminal 100 and a current location of the counterpart terminal in-between and an item 'Other destinations' may be provided to share a location randomly designated by a user of the mobile terminal 100 in-between. If the item 'My location' is selected from the selection menu shown in FIG. 15 (a), the controller 180 may be able to activate the position location module 115 automatically to obtain the current location of the mobile terminal 100. On the other hand, if the item 'Other destinations' is selected from the selection menu shown in FIG. 15 (a), the controller 180 may control a place setting screen 1503, which is provided to guide inputs of departure and destination places to share in-between, to be displayed as shown in FIG. 15 (b).

Once the location information to share with the counterpart terminal is determined through the example shown I FIG. 15 (a) and FIG. 15 (b), the controller 180 may be able to make a request for a location sharing with the counterpart terminal. How to make the data sharing request to the counterpart terminal is already described in detail with reference to FIG. 9 and its details shall be omitted from the following description.

In case that the counterpart terminal accepts the location sharing request made by the mobile terminal 100, the controller 180 may control the first data sharing screen and the second data sharing screen to be displayed via the mobile terminal 100 and the counterpart terminal, respectively. How the mobile terminal 100 and the counterpart terminal display the first data sharing screen and the second data sharing screen, respectively is described in detail with reference to FIG. 16 as follows.

Figure 16A:
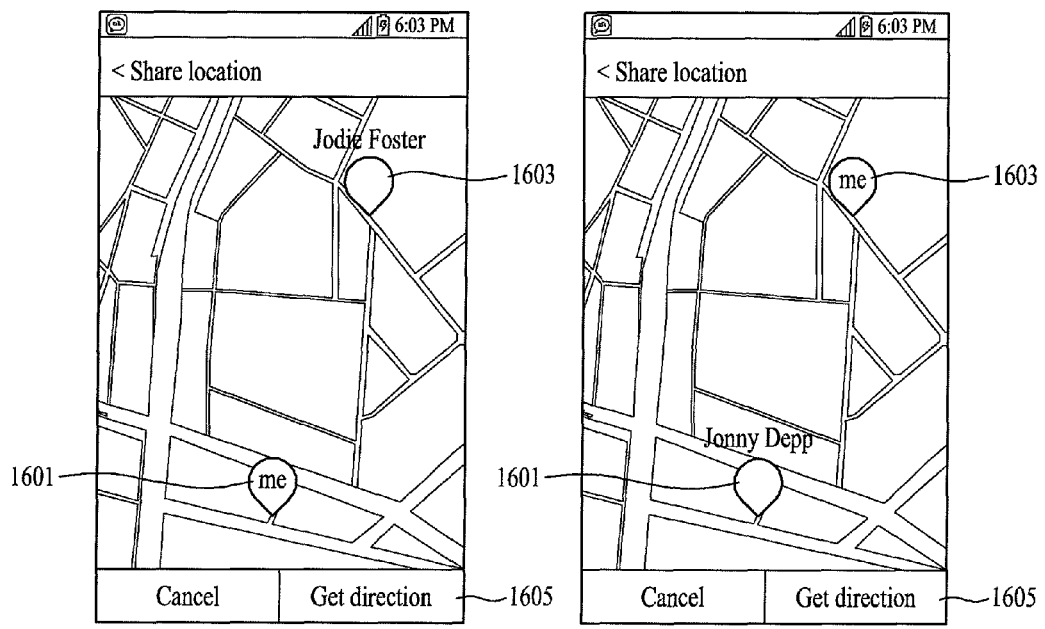
FIGS. 16A-16B are diagrams for one example of outputs from a mobile terminal 100 and a counterpart terminal if the mobile terminal 100 and the counterpart terminal are configured to share location information with each other.
Figure 16B:
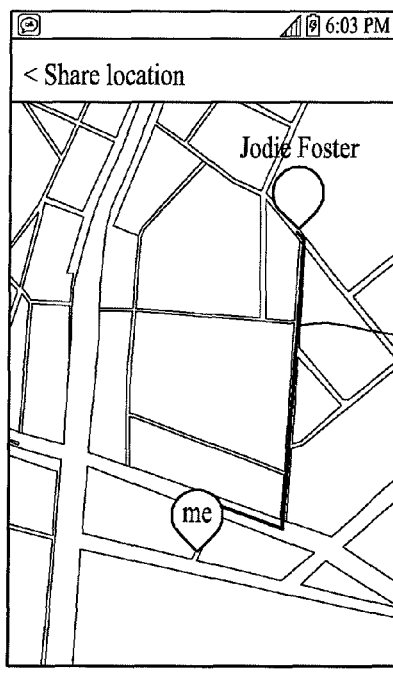
Figure 16B:
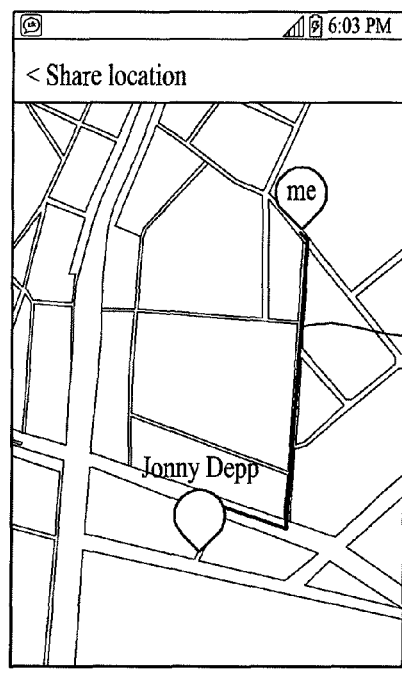

FIG. 16 is a diagram for one example of outputs from a mobile terminal 100 and a counterpart terminal if the mobile terminal 100 and the counterpart terminal are configured to share location information with each other. For clarity of the following description, assume that the item 'My location' is selected from the selection menu shown in FIG. 15 and that current locations of the mobile terminal 100 and the counterpart terminal are set to be shared.

If the mobile terminal 100 and the counterpart terminal are set to share location informations with each other, the controller 180 may transmit its location information (hereinafter named a first location information) to the counterpart terminal and receive a location information (hereinafter named a second location information) of the counterpart terminal from the counterpart terminal. Thereafter, the controller 180 configures a first data sharing screen with a map, on which both of the first location information and the second location information are simultaneously displayed, and may then display the first data sharing screen on the touchscreen (FIG. 16A 1).

Having received the first location information from the mobile terminal 100, the counterpart terminal configures a second data sharing screen with a map, on which both of the first location information and the second location information are simultaneously displayed, and may then output the second data sharing screen (FIG. 16A 2).

In FIG. 16A 1, a marker 1601 represented as 'me' on the first data sharing screen may correspond to a location information (i.e., the first location information) of the mobile terminal 100 and a marker 1603 represented as 'Jodie Foster' may correspond to a location information (i.e., the second location information) of a counterpart. On the other hand, in FIG. 16A 2, a marker 1603 represented as 'me' on the second data sharing screen may correspond to a location information (i.e., the second location information) of the counterpart terminal and a marker 1601 represented as 'Jonny Depp' may correspond to a location information (i.e., the first location information) of the mobile terminal 100.

If a navigation button 'Get direction' 1605 is selected in the example shown in FIG. 16A 1, the controller 180 may control a route 1607, which is provided to arrive at a second location of the counterpart terminal from a first location of the mobile terminal 100, to be displayed on the map (FIG. 16B 1, FIG. 16B 2).

Even if a navigation button 'Get direction' 1605 is selected via the counterpart terminal instead of the mobile terminal 100, the controller 180 may control a route between the first location and the second location to be displayed.

In the following description, explained in detail is a case that the mobile terminal 100 and the counterpart terminal are set to share a schedule in-between.

FIG. 17 is a diagram for one example of outputs from a mobile terminal 100 and a counterpart terminal if the mobile terminal 100 and the counterpart terminal are set to share a schedule with each other.

Referring to FIG. 17, if the mobile terminal 100 and the counterpart terminal are set to share a schedule with each other, the controller 180 controls a first data sharing screen to be displayed via the mobile terminal 100 and may also control a second data sharing screen to be displayed on the counterpart terminal. In FIG. 17A 1 and FIG. 17A 2, each of the first data sharing screen and the second data sharing screen shows a schedule of a user of the mobile terminal 100 for example. In the schedule shown in FIG. 17A 1 or FIG. 17A 2, a bar marked on a specific date (e.g., $9^{th}$, $14^{th}$, $15^{th}$, $19^{th}$ and $30^{th}$) may indicate that a preset schedule is present on the corresponding date.

If the mobile terminal 100 and the counterpart terminal are set to share a schedule with each other, the controller 1809 may be able to grant a second authority of selecting a date indicated on the schedule to the counterpart terminal. Hence, a user or counterpart of the mobile terminal 100 may be able to select a date represented on the schedule by sharing the schedule.

In case that the user or counterpart of the mobile terminal 100 selects a date represented on the schedule, the controller 180 may control the user-selected date and the counterpart-selected date to be discriminated from each other via the touchscreen and the counterpart terminal. Moreover, the controller 180 may control the date, which is commonly selected by each of the user and the counterpart, to become visually identifiable.

For instance, if the dates selected by the user include $14^{th}$, $16^{th}$, $17^{th}$ and $20^{th}$ of November and the dates selected by the counterpart include $16^{th}$ and 2 second of November, referring to FIG. 17A 1 and FIG. 17A 2, the controller 180 may control the dates (i.e., $14^{th}$, $17^{th}$ and $20^{th}$ of November) only selected by the user, the date (i.e., 2 second of November) only selected by the counterpart and the date (i.e., $16^{th}$ of November) commonly selected by both of the user and the counterpart to be displayed in a manner of being discriminated with one another.

Figure 17B:
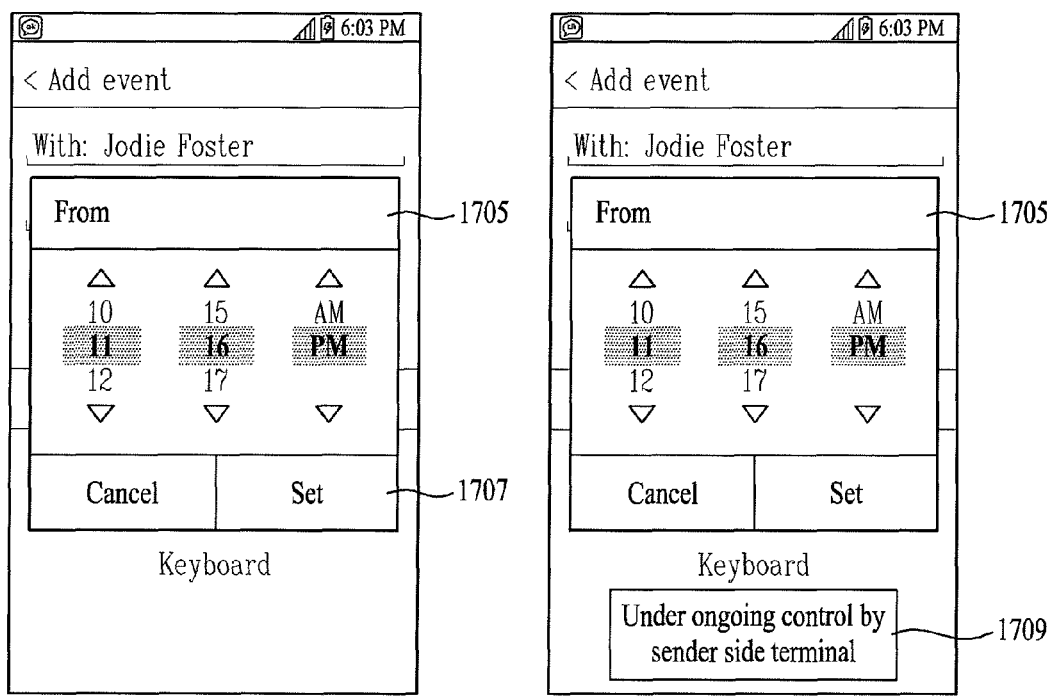

Referring now to FIG. 17A 1, the user of the mobile terminal 100 makes a request for a page turning (e.g., a next button 1701 is selected). If so, referring to FIG. 17B 1 and FIG. 17B 2, the controller 180 may control a sub-setting menu 1705, which is provided to add an event to the schedule, to be displayed via the touchscreen and the counterpart terminal. If the user applies a touch input to the sub-setting menu 1705, the controller 180 may control an alarm 1709, which indicates that the user is controlling the sub-setting menu 1705, to be outputted via the counterpart terminal. Hence, a control authority of the sub-setting menu 1705 displayed on the first data sharing screen may be granted not to the counterpart but to the mobile terminal 100 only.

Figure 17C:
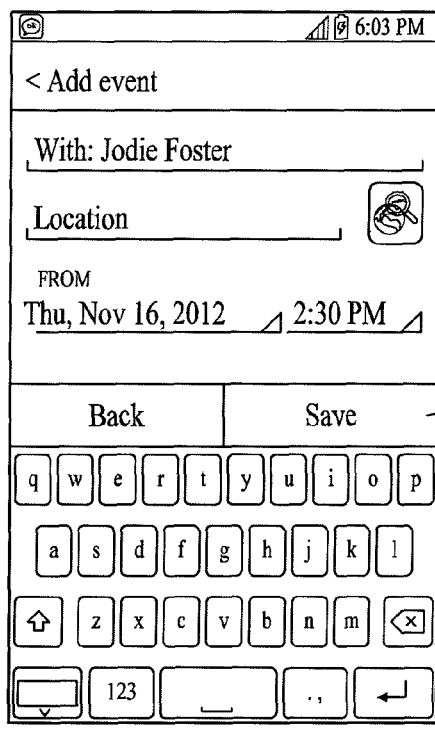
Figure 17C:
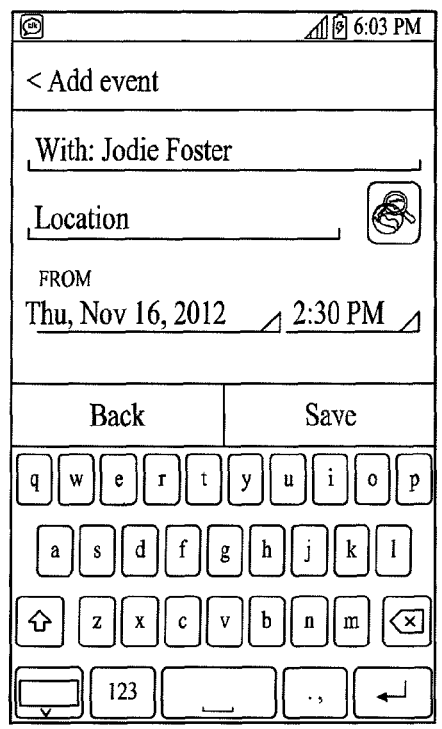

Once the schedule setting according to the sub-setting menu 1705 is completed (e.g., a button 'Set' 1707 shown in FIG. 17B 1 is touched), referring to FIG. 17C 1 and FIG. 17C 2, the controller 180 may control a schedule check menu, which is provided to check the set schedule, to be displayed on the touchscreen and the counterpart terminal.

Figure 17D:
Figure 17D:
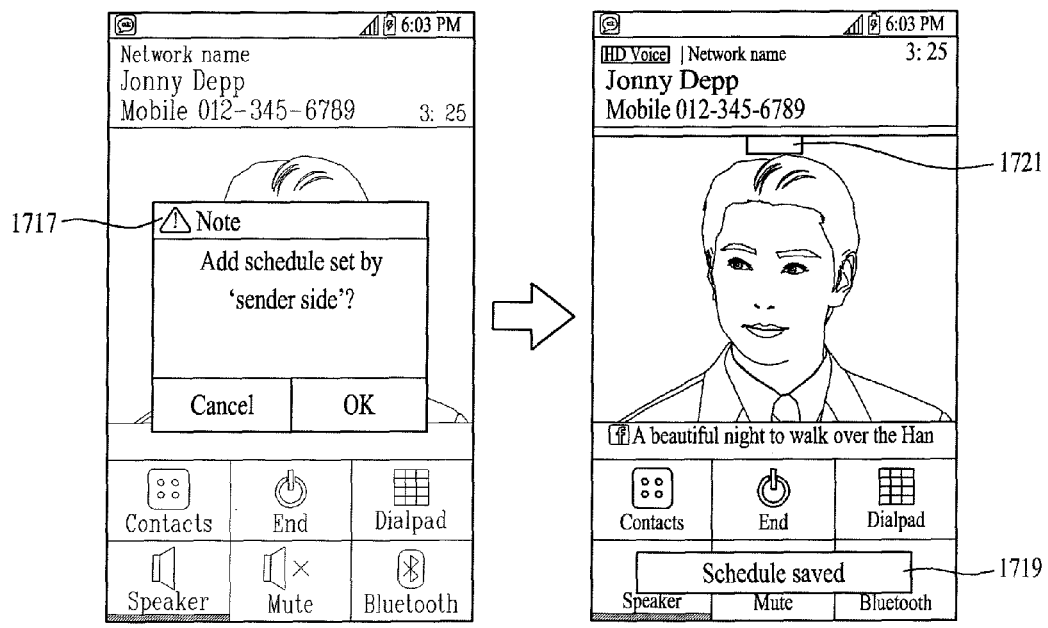

If the user selects a save button 1711 in the schedule check menu displayed on the touchscreen, the controller adds the set event to the schedule and may control the schedule sharing with the counterpart terminal to be ended. Once the schedule sharing is ended, the controller 180 controls the touchscreen to return to the call screen and may control an indication message 1713, which indicates that the set event is added to the schedule of the mobile terminal 100, to be displayed. Moreover, the controller 180 may control a share log, which is provided to record operations in the course of outputting the first data sharing screen and the second data sharing screen, to be created and may also control a history view bar 1217, which is provided to display the share log, to be displayed (FIG. 17D 1).

Once the schedule sharing with the mobile terminal 100 is ended, the counterpart terminal returns to the call connected screen and may be able to display a selection menu 1717 for selecting whether to add the event set by the mobile terminal 100 to the schedule of the counterpart. The counterpart is able to add the intact event set by the mobile terminal 100 to the schedule of its own via the selection menu 1717, whereby the schedules can be conveniently shared between the user and the counterpart.

If the schedule sharing is completed, the counterpart terminal may output an indication message 1719 indicating that the event has been added, may create a share log, which is provided to record operations in the course of outputting the first data sharing screen and the second data sharing screen, and may then display a history view bar 1721 provided to display the share log.

In describing the schedule sharing between the mobile terminal 100 and the counterpart terminal according to the present invention, FIG. 17A shows one example that the schedule saved in the mobile terminal 100 is outputted via both of the mobile terminal 100 and the counterpart terminal. Yet, it may be unnecessary for the schedule saved in the mobile terminal 100 to be outputted via the mobile terminal 100 and the counterpart terminal only. Occasionally, the schedule saved in the counterpart terminal may be outputted via the mobile terminal 100 and the counterpart terminal. And, a result of combining the schedules of the mobile terminal 100 and the counterpart terminal with each other may be outputted via the mobile terminal 100 and the counterpart terminal.

In the following description, explained in detail is a case that the mobile terminal 100 and the counterpart terminal are set to share documents with each other.

If a document item is selected from the data type menu shown in FIG. 6 or FIG. 7, prior to making a request for sharing documents to the counterpart terminal, the controller 180 may control a screen, which is provided to select a document to share with the counterpart terminal, to be outputted. This is described with reference to FIG. 18 as follows.

Figure 18:
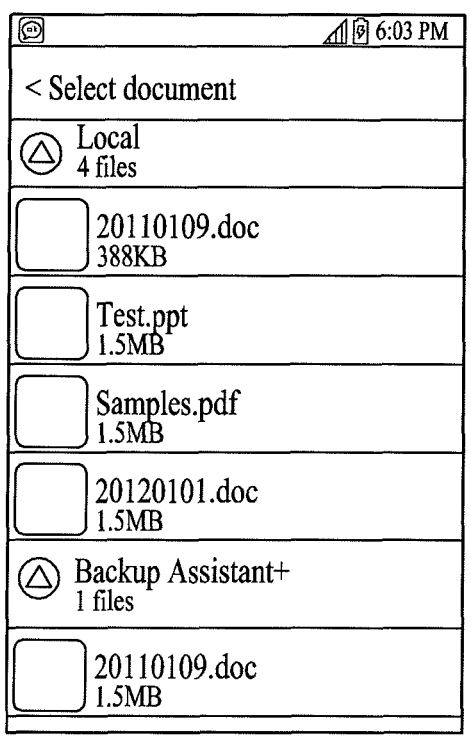
FIG. 18 is a diagram for one example of an output of a touchscreen to guide a selection of a document to share with a counterpart.

FIG. 18 is a diagram for one example of an output of a touchscreen to guide a selection of a document to share with a counterpart. If a document is set to be shared in the data type menu shown in FIG. 6 or FIG. 7, referring to FIG. 18, the controller 180 may be able to control a document file list saved in the memory to be displayed. If a document file to share with a counterpart is selected in FIG. 18, the controller 180 may be able to make a request for sharing documents to the counterpart terminal. How to make the document sharing request to the counterpart terminal is already described in detail with reference to FIG. 9 and its details shall be omitted from the following description for clarity.

If the counterpart accepts the document sharing request made by the mobile terminal 100, the controller 180 may be able to transmit the document file set to share to the counterpart terminal. If a transmission of at least one portion of the document file to share is completed, the controller 180 may control a first data sharing screen and a second data sharing screen, which show the same document file, to be displayed via the mobile terminal 100 and the counterpart terminal, respectively. How the mobile terminal 100 and the counterpart terminal display the first data sharing screen and the second data sharing screen is described in detail with reference to FIG. 19 as follows.

Figure 19:
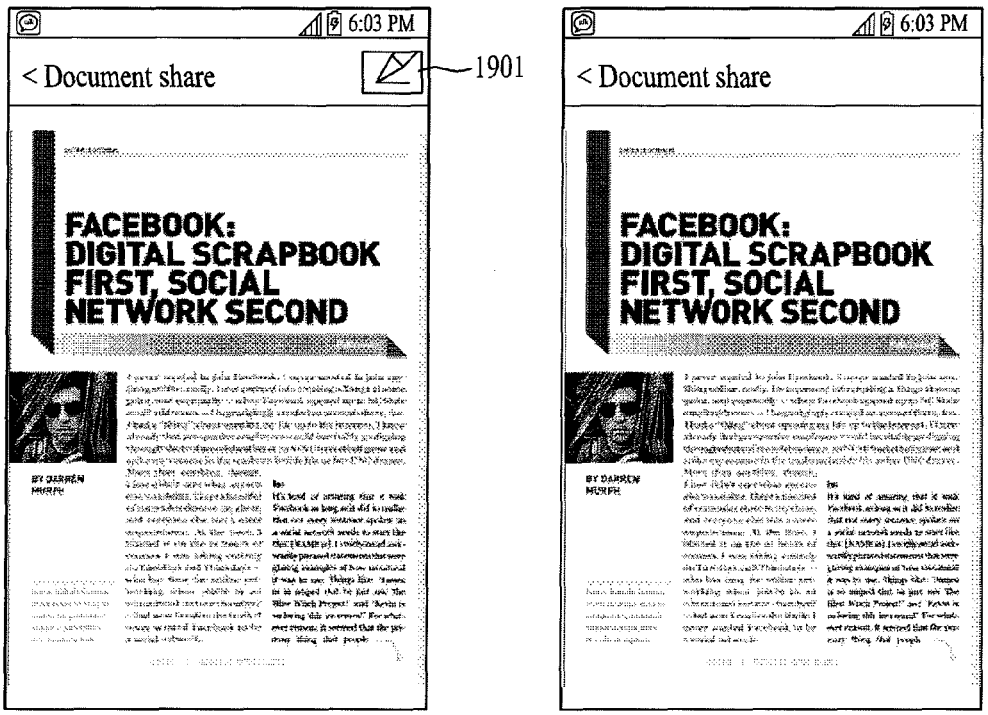
FIG. 19 is a diagram for one example of outputs from a mobile terminal 100 and a counterpart terminal if the mobile terminal 100 and the counterpart terminal are configured to share documents with each other.

FIG. 19 is a diagram for one example of outputs from a mobile terminal 100 and a counterpart terminal if the mobile terminal 100 and the counterpart terminal are configured to share documents with each other.

Referring to FIG. 19, if documents are set to be shared between the mobile terminal 100 and the counterpart terminal, the controller 180 controls a first data sharing screen, which displays at least one portion of a document file to share, to be displayed and may also control a second data sharing screen, which is a clone screen of the first data sharing screen, to be displayed via the counterpart terminal. In particular, referring to FIG. 19 1 and FIG. 19 2, the controller 180 may be able to control each of the mobile terminal 100 and the counterpart terminal to display the same part of the same document file.

While the mobile terminal 100 and the counterpart terminal share the document file with each other, if a handwriting input enter mode command is inputted (e.g., a handwriting input activate button 1901 is selected), the controller 180 controls each of the mobile terminal 100 and the counterpart terminal to enter a handwriting input mode and may be able to grant a second authority of controlling the first data sharing screen to the counterpart terminal. Hence, as mentioned in the foregoing description with reference to FIG. 10, both of the first handwriting data inputted by the user of the mobile terminal 100 and the second handwriting data inputted by the counterpart may be reflected by each of the first data sharing screen and the second data sharing screen.

While each of the mobile terminal 100 and the counterpart terminal stays in the handwriting input mode, the first handwriting data inputted by the user of the mobile terminal 100 may be reflected not only by the first data sharing screen but also by the second data sharing screen. In order to apply the second handwriting data, which is inputted by the user of the counterpart terminal, to the first data sharing screen as well the second data sharing screen, the controller 180 may be able to grant the second authority of controlling the first data sharing screen to the counterpart terminal. Hence, the handwriting input applied to the second data sharing screen by the counterpart may be reflected not only by the second data sharing screen but also by the first data sharing screen.

According to another embodiment of the present invention, the controller 180 may be able to grant an editing authority of editing a currently shared document file to the counterpart terminal based on a user's manipulation. If a document content of a document file currently outputted via the second data sharing screen, which is currently displayed on the counterpart terminal having the editing authority granted thereto, is amended, the controller 180 receives an amended content from the counterpart terminal and may then control the amended document content to be displayed on the first data sharing screen.

In the following description, a case that the mobile terminal 100 is configured to remotely control the counterpart terminal is explained in detail with reference to FIG. 20.

Figure 20:
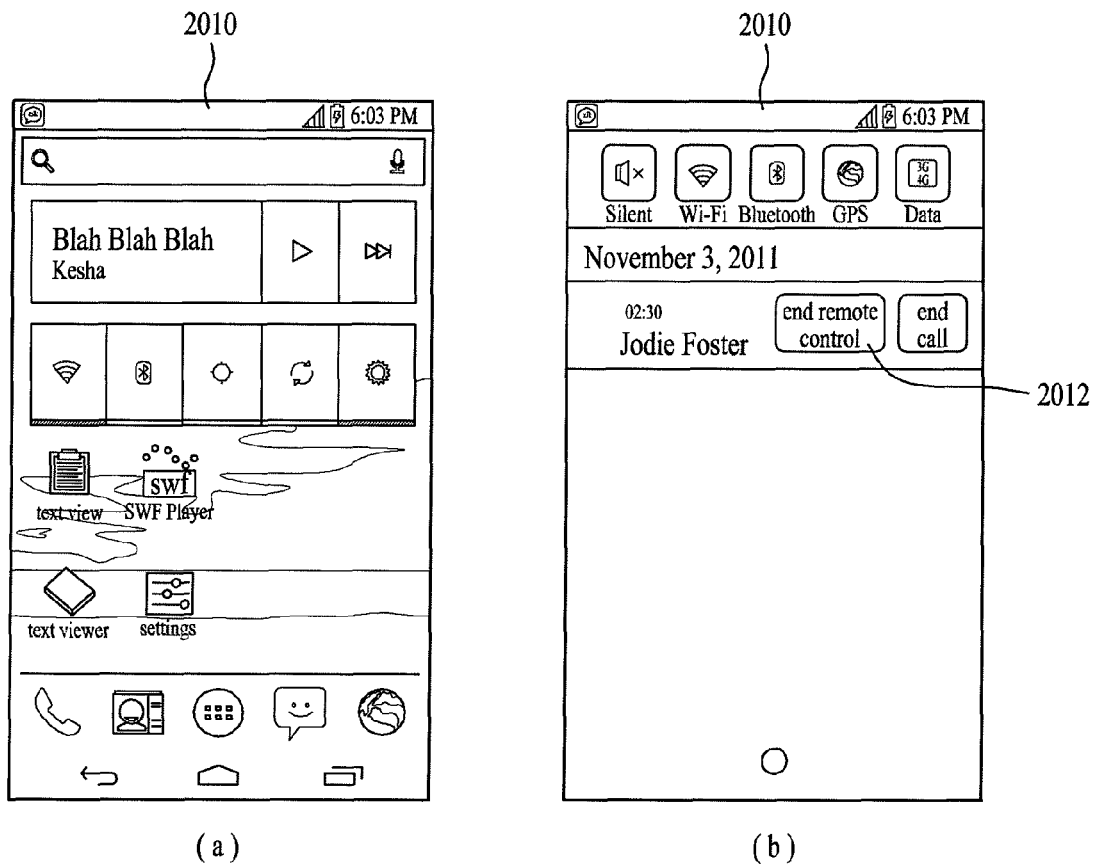
FIG. 20 is a diagram for one example of outputs from a mobile terminal 100 and a counterpart terminal if the mobile terminal 100 is configured to control operations of the counterpart terminal.

FIG. 20 is a diagram for one example of outputs from a mobile terminal 100 and a counterpart terminal if the mobile terminal 100 is configured to control operations of the counterpart terminal.

Referring to FIG. 20, if the counterpart terminal accepts a remote control request made by the mobile terminal 100, the controller 180 may control first and second data sharing screens configured with a home screen of the counterpart terminal to be displayed via the touchscreen and the mobile terminal 100. For instance, the home screen of the counterpart terminal shown in FIG. 20 (*a*) may be simultaneously displayed on the mobile terminal 100 and the counterpart terminal.

Hence, the user of the mobile terminal 100 may be able to control operations of the counterpart terminal remotely in a manner of manipulating the first data sharing screen. Since a control authority of controlling the first data sharing screen is initially granted to the mobile terminal only 100, even if a touch input is applied to the second data sharing screen of the counterpart terminal becoming a target of the remote control, it may be unable to control the operations of the counterpart terminal. In particular, while the mobile terminal 100 is remotely controlling the counterpart terminal, the operations of the counterpart terminal can be controlled by the mobile terminal 100.

Yet, in case of remotely controlling the counterpart terminal using the mobile terminal 100, since hardware/software resources of the counterpart terminal are used instead of hardware/software resources of the mobile terminal 100, if the counterpart intends to end the remote control, this counterpart's intention should be taken into consideration. Hence, the controller 180 may grant an authority of ending the remote control to a user of the counterpart terminal.

The user or counterpart, who intends to end the remote control of the counterpart terminal, may input a remote control end command to the mobile terminal 100 or the counterpart terminal. For instance, referring to FIG. 20 (*b*), if the user of the mobile terminal 100 touches a remote control end button 2012 provided through a status bar 2010 displayed on the first data sharing screen, the controller 180 ends the remote control of the counterpart terminal and may then control to return to the call connected screen. In case that the above operation occurs in the counterpart terminal, the remote control of the mobile terminal 100 may be ended.

Figure 10H:
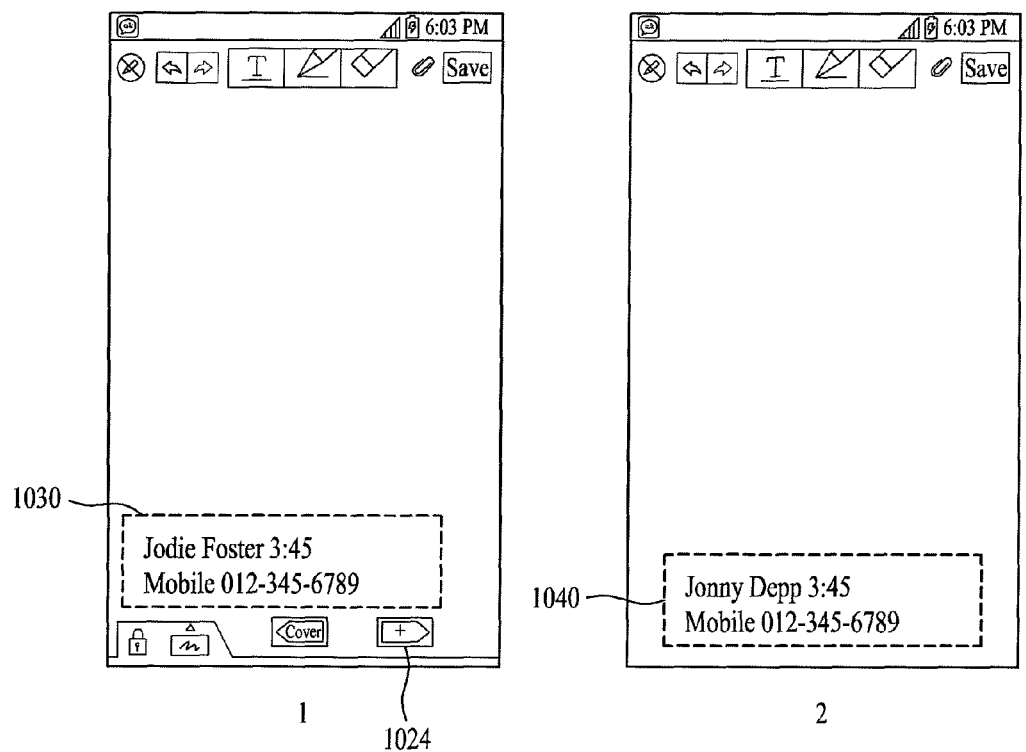

Regarding the data sharing between the mobile terminal 100 and the counterpart terminal, in the corresponding descriptions with reference to the accompanying drawings, while data are being shared between the mobile terminal 100 and the counterpart terminal, information on the call counterpart is not displayed on the touchscreen or the counterpart terminal. Yet, while the data are being shared between the mobile terminal 100 and the counterpart terminal, it may not be mandatory for the information on the call counterpart to be stopped. According to another embodiment of the present invention, as mentioned in the description of the example shown in FIG. 10H, the controller 180 may control the informations 1030 and 1040 on the call counterpart (e.g., counterpart name, counterpart phone number, call duration, etc.) to be displayed on each of the first data sharing screen and the second data sharing screen. FIG. 10H shows that case of sharing the handwriting input, by which the present invention may be non-limited. For instance, it is a matter of course that the information on the call counterpart may be displayed in case of the image sharing, the video sharing, the schedule sharing, the location information sharing or the like, as shown in FIG. 10H.

In the following description, explained in detail is the share log displayed on the touchscreen after the end of the data sharing between the mobile terminal 100 and the counterpart terminal.

Figure 21:
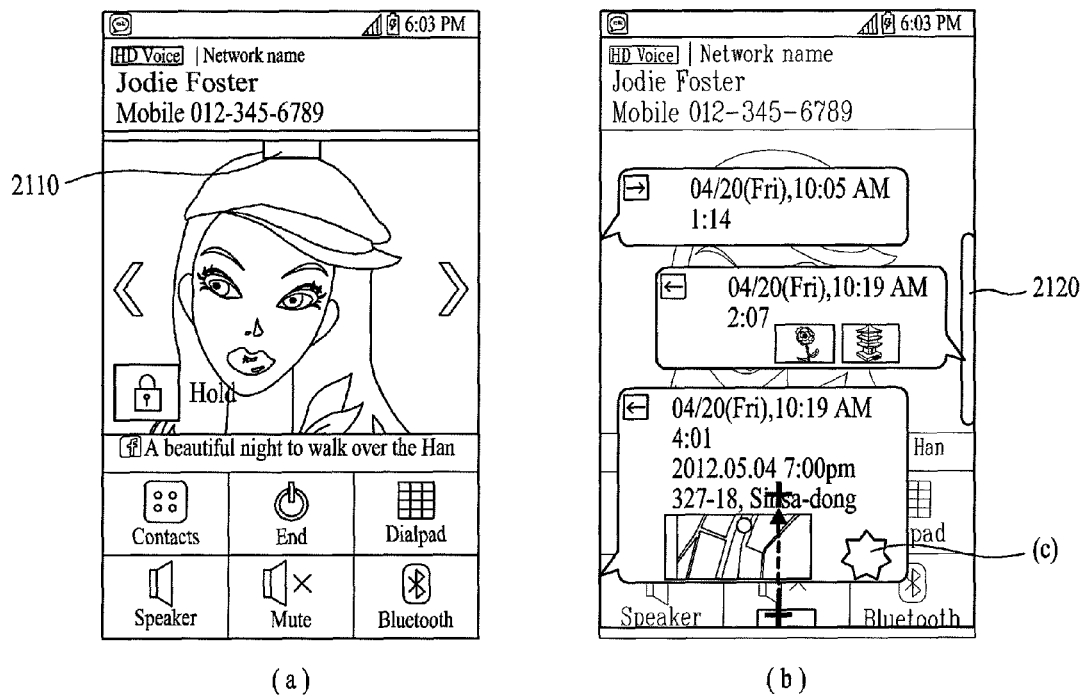
FIG. 21 is a diagram for one example of an output of a touchscreen to describe a share log.
Figure 21:
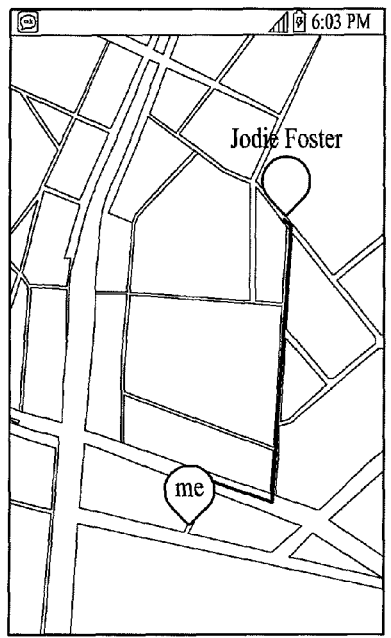

FIG. 21 is a diagram for one example of an output of a touchscreen to describe a share log.

Referring to FIG. 21, once the data sharing between the mobile terminal 100 and the counterpart terminal is ended, referring to FIG. 21 (*a*), the controller 180 may control a history viewer bar 2110 to be created from a caller display region of a call connected screen. If a user applies a prescribed touch input to the history viewer bar (e.g., the history viewer bar is scrolled in bottom direction), the controller 180 may control a data share log, which represents data exchanged with a counterpart in case of the data sharing, to be displayed (FIG. 21 (*b*)). Together with the data transceived with the counterpart terminal, the controller 180 may control a thumbnail of a first data sharing screen at the moment of the data transceiving to be displayed. In case that data transceiving records are recorded in the share log, the controller 180 may control the data transmitted by the mobile terminal 100 and the data received by the mobile terminal 100 to be discriminated from each other together with the data transceived times in the same manner of displaying call records. In case that the data transceiving records become longer than an output size of the touchscreen, a scroll bar 2120 may be automatically generated.

In the example shown in FIG. 21 (*b*), if the user selects one of the data transceiving records, the controller 180 reconfigures the first data sharing screen at the time of transmitting or receiving the selected data and may be able to display the reconfigured first data sharing screen on the touchscreen (FIG. 21 (*c*)). In particular, the controller 180 activates an application having been activated at the timing point of transmitting or receiving the selected data and may then adjust the application to enable the selected data to have the same output of an output screen at the timing point of transmitting or receiving the selected data.

In particular, if the mobile terminal 100 and the counterpart terminal are configured to share data in-between, the user checks the transceived data history through the share log and may be then able to page the past first data sharing screen at any time. Once the voice call with the counterpart terminal is ended, the controller 180 combines the call records with the counterpart terminal and the share log with the counterpart terminal together and may then save the combined result as a call history. Hence, the user may be able to check the data share records per counterpart terminal.

Figure 22:
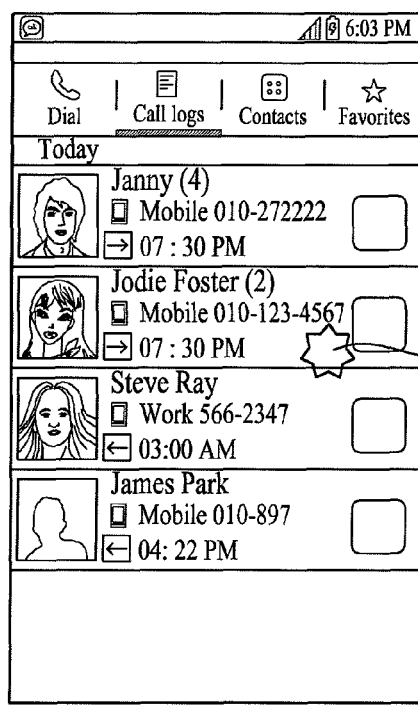
FIG. 22 is a diagram for one example to describe a process for saving a call record and a share log by linking the call record and the share log to each other.
Figure 22:
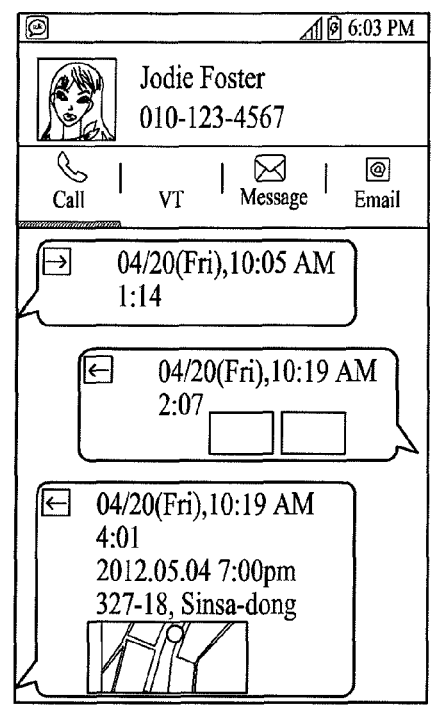

FIG. 22 is a diagram for one example to describe a process for saving a call record and a share log by linking the call record and the share log to each other.

Referring to FIG. 22, if a specific counterpart is selected from the call records shown in FIG. 22 (*a*), the controller 180 may control a share log, which contains records of data transceivings with the selected counterpart, to be displayed (FIG. 22 (*b*)). As mentioned in the foregoing description with reference to FIG. 21, if one of the data transceiving records in the share log is selected, the controller 180 reconfigures a first data sharing screen at the moment of transceiving or receiving the selected data and may then display the reconfigured first data sharing screen on the touchscreen.

In the above description, the share log creation in the mobile terminal 100 is explained with reference to FIG. 21 and FIG. 22. Yet, it is a matter of course that a share log can be also created in the counterpart terminal sharing data with the mobile terminal 100. Hence, a counterpart checks the pas data transceiving history using the share log and may be then able to check the past first or second data sharing screen at any time.

In the foregoing description with reference to FIGS. 10 to 20, sharing data of various types between the mobile terminal 100 and the counterpart terminal is explained. As mentioned in the foregoing description prior to the description with reference to FIGS. 10 to 20, while the mobile terminal 100 and the counterpart terminal are outputting the first data sharing screen and the second data sharing screen, respectively, the first authority of controlling the first data sharing screen is initially granted to the mobile terminal 100 only. Occasionally, such a second authority having a scope smaller than that of the first authority as a date selection from a schedule, a handwriting input and the like may be granted to the counterpart terminal for example. Yet, in most cases, it may be necessary for the first data sharing screen to be controlled in a manner of manipulating the mobile terminal 100.

Exceptionally, an authority of ending the data sharing (i.e., an authority of stopping an output of the first data sharing screen) may be granted not only to the mobile terminal 100 but also to the counterpart terminal. In case that the mobile terminal 100 and the counterpart terminal share data with each other, each of the mobile terminal 100 and the counterpart terminal may be placed in a position of a content provider or receiver that transmits/receives data to/from an opposed terminal. In particular, since a resource allocated by a mobile communication network is used for the data sharing not only by the mobile terminal but also by the counterpart terminal, it may be unable to avoid a billing corresponding to a size of used data. Hence, if a user of the counterpart does not want the data sharing, it may be necessary for the user to control the data sharing to be ended.

How to end the data sharing between the mobile terminal 100 and the counterpart terminal in response to an input to the counterpart terminal is described in detail with reference to FIG. 23 as follows. For clarity of the following description with reference to FIG. 23, assume that the mobile terminal 100 and the counterpart terminal are configured to share images.

FIG. 23 is a diagram for one example of ending a data sharing between a mobile terminal 100 and a counterpart terminal in response to an input to the counterpart terminal.

Figure 23A:
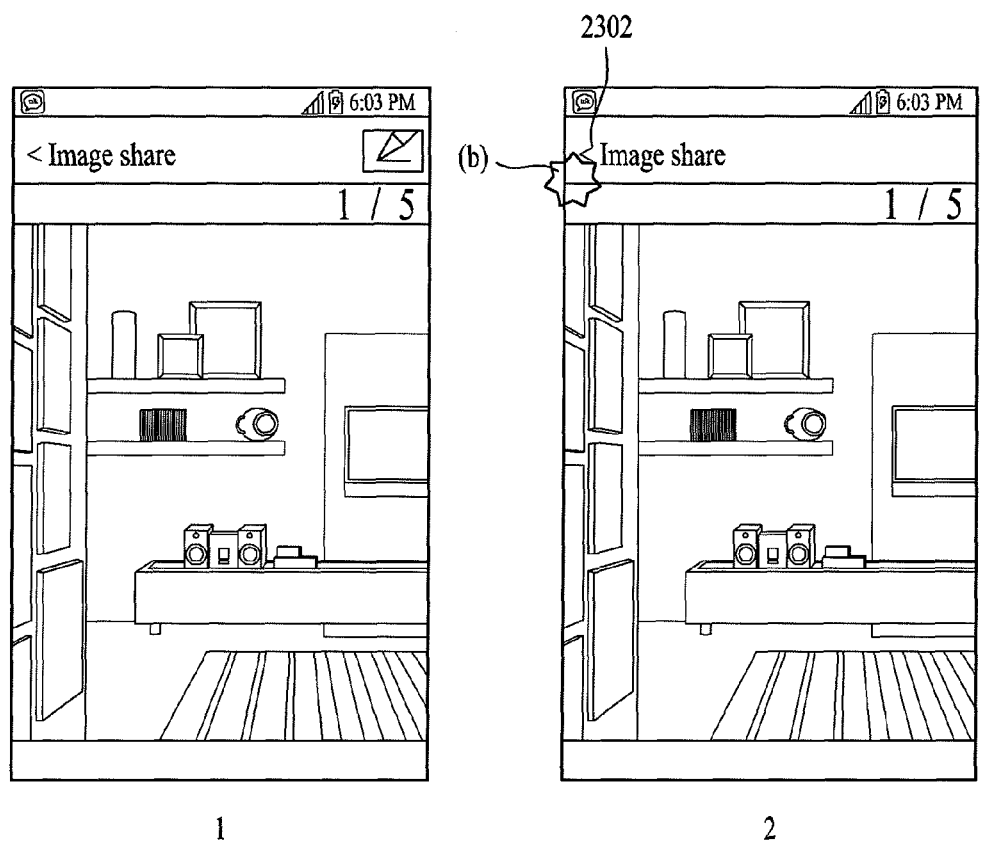
FIGS. 23A-23C are diagrams for one example of ending a data sharing between a mobile terminal 100 and a counterpart terminal in response to an input to the counterpart terminal.
Figure 23B:
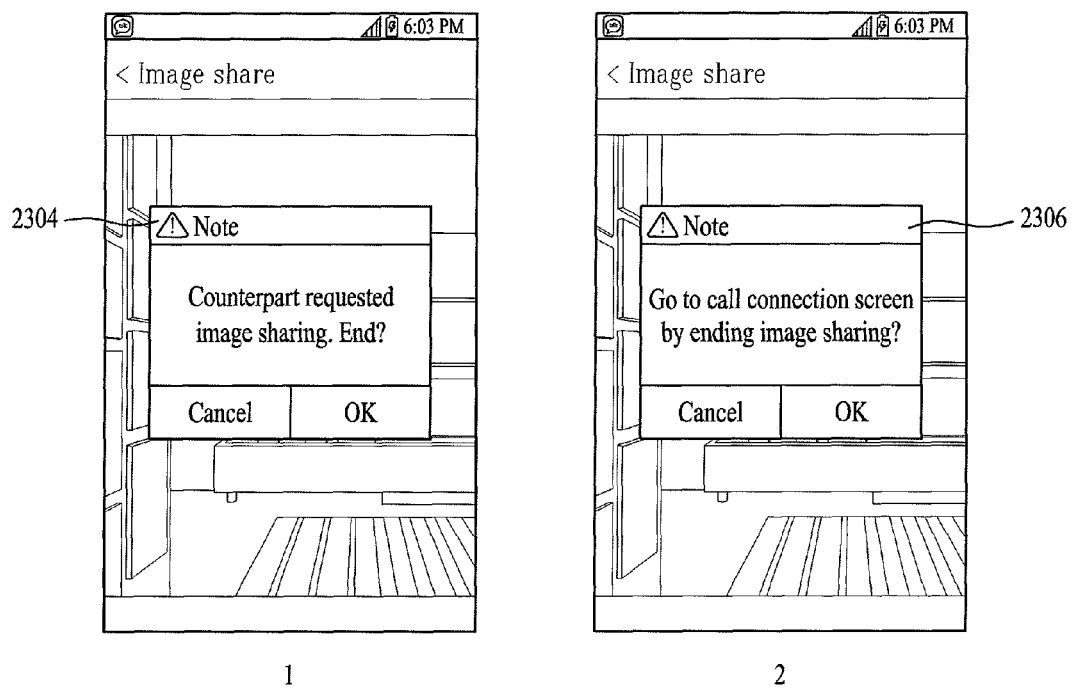
Figure 23C:
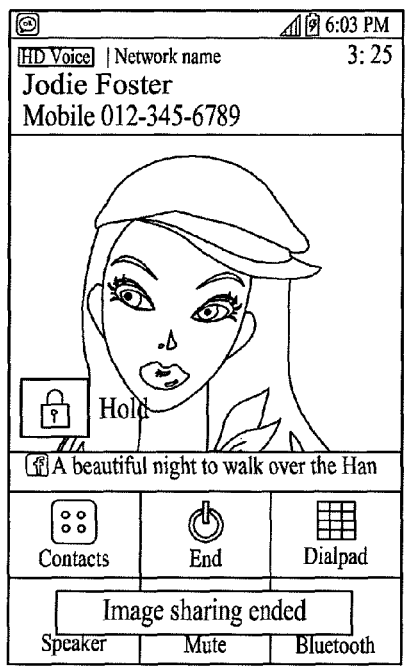
Figure 23C:
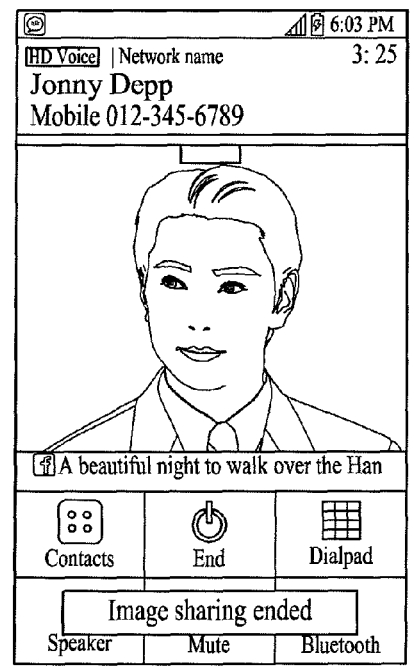

Referring to FIG. 23, while the first data sharing screen and the second data sharing screen are being outputted via the mobile terminal 100 and the counterpart terminal, respectively (FIG. 23A 1 and FIG. 23A 2), if a counterpart selects a backward button 2302 displayed on the second data sharing screen, the controller 180 may control menu screens 2304 and 2306, each of which queries whether to stop the image sharing, to be displayed on the first data sharing screen and the second data sharing screen, respectively (FIG. 23B 1 and FIG. 23B 2). If an image sharing stop command is inputted to at least one of the mobile terminal 100 and the counterpart terminal, the controller 180 ends the image sharing and may then control each of the mobile terminal 100 and the counterpart terminal to return to a call connected screen (FIG. 23C 1 and FIG. 23C 2).

In particular, referring to FIG. 23, while data are shared between the mobile terminal 100 and the counterpart terminal, if the data sharing end command is inputted to the counterpart terminal, the controller 180 may be able to control the data sharing to be ended at any time. FIG. 23B shows that the menu screen for setting whether to stop the image sharing is displayed on each of the first data sharing screen and the second data sharing screen, by which the present invention may be non-limited. For instance, the menu screen may be displayed on the second data sharing screen only.

Moreover, the data sharing end command may be inputted using the backward button 2302 via the mobile terminal 110 as well as a user terminal.

According to the example mentioned in the above description, the first authority is granted to the mobile terminal 100 and the second authority having a scope smaller than that of the first authority is granted to the counterpart terminal, for example. Yet, it is not mandatory for the first authority to depend on the mobile terminal 100 only. Alternatively, a first authority greater than the second authority may be granted to the counterpart terminal in case that a prescribed event occurs in the mobile terminal 100 or the counterpart terminal. This is described in detail with reference to FIG. 4.

Referring now to FIG. 4, while the mobile terminal 100 and the counterpart terminal are communicating with each other, if a new communication is initiated between the mobile terminal 100 and a third party terminal (S408), the controller 180 may control a first control authority greater than a second control authority to be granted to the counterpart terminal (S409). This shall be described in detail with reference to FIG. 24 and FIG. 25 as follows.

Figure 24:
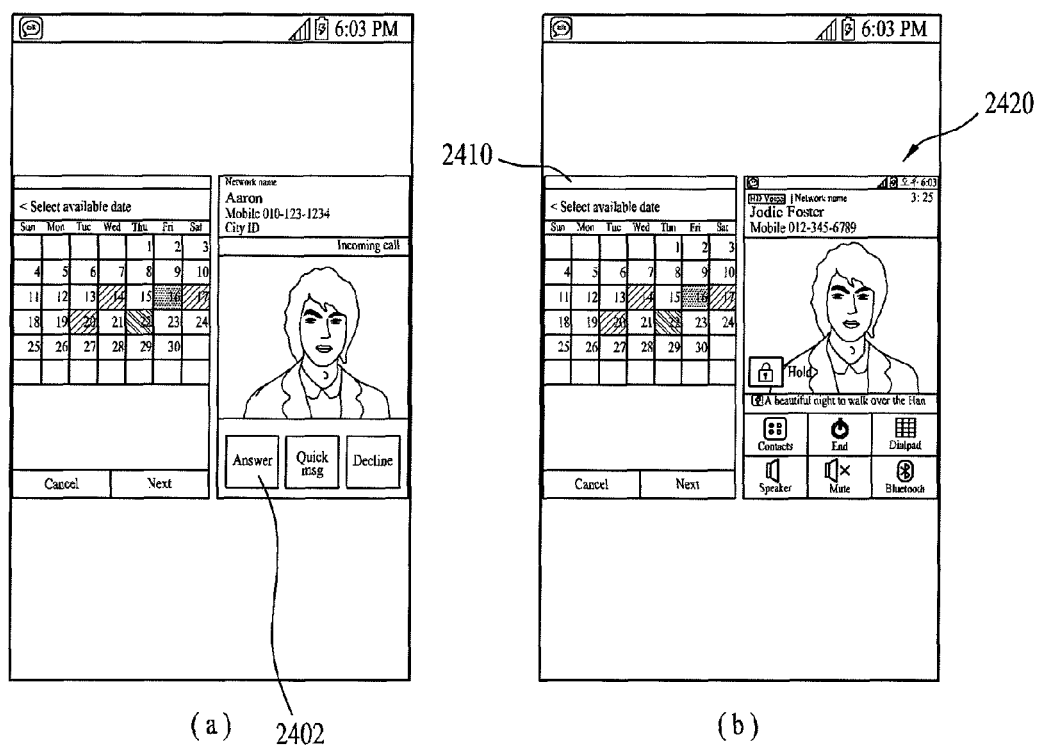
FIG. 24 is a diagram for one example of an output of a mobile terminal 100 in case that a new communication is initiated between the mobile terminal 100 and a third party terminal in the course of an ongoing communication between the mobile terminal 100 and a counterpart terminal.

FIG. 24 is a diagram for one example of an output of a mobile terminal 100 in case that a new communication is initiated between the mobile terminal 100 and a third party terminal in the course of an ongoing communication between the mobile terminal 100 and a counterpart terminal. For clarity, assume that the mobile terminal 100 and the counterpart terminal are sharing schedules with each other.

Referring to FIG. 24, while the mobile terminal 100 and the counterpart terminal are communicating with each other, if a call connection to the third party terminal is requested to the mobile terminal 100 having the first control authority, the controller 180 may control a call request screen, which displays that a call connection is requested from the third party terminal, to be displayed as shown in the example shown in FIG. 24 (*a*). If a call connect button 2402 is selected from the call request screen, the controller 180 initiates the communication with the third party terminal and may control the first control authority greater than the second control authority to be granted to the counterpart terminal. Hence, a counterpart may be able to control the first data sharing screen and the second data sharing screen corresponding to a cl0ne screen of the first data sharing screen using the first control authority.

If a call is connected between the mobile terminal 100 and the third party terminal, a voice call between the mobile terminal 100 and the counterpart terminal may be temporarily stopped. In order to solve the shared data display stopping problem that may be caused from the interruption of the voice call with the mobile terminal 100, the controller 180 grants the first control authority to the counterpart terminal, thereby enabling the counterpart terminal to appreciate the shared data on its own despite not being guided by the mobile terminal 100.

Once the call is connected between the mobile terminal 100 and the third party terminal, referring to FIG. 24 (*b*), the controller 180 may control both a first data sharing screen 2410 and a third party terminal call connected screen 2420 to be simultaneously displayed. By displaying the first data sharing screen 2410 continuously, the continuity of the data sharing can be maintained and an extent of checking shared data of the counterpart terminal can be confirmed.

Figure 25:
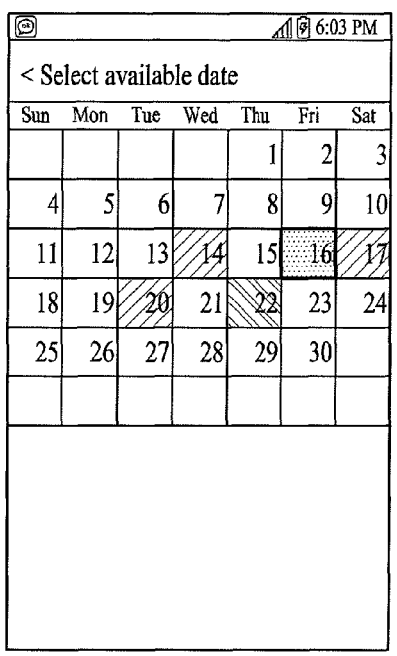
FIG. 25 is a diagram for one example of an output change of a counterpart terminal before or after initiating a new communication between a mobile terminal 100 and a third party terminal in the course of an ongoing communication between the mobile terminal 100 and a counterpart terminal.
Figure 25:
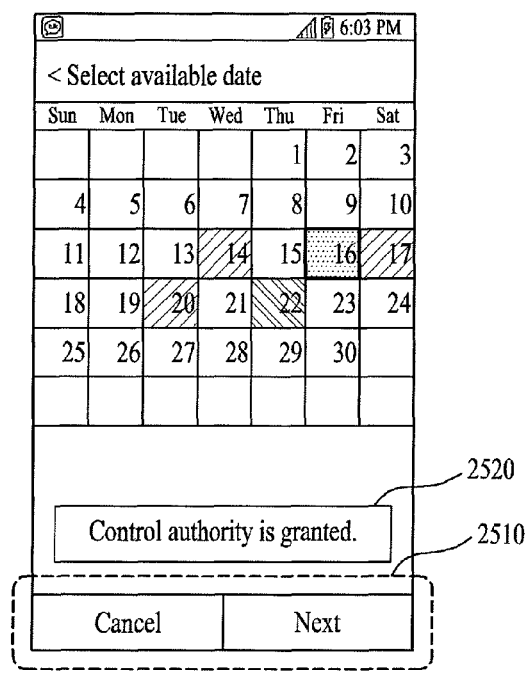

FIG. 25 is a diagram for one example of an output change of a counterpart terminal before or after initiating a new communication between a mobile terminal 100 and a third party terminal in the course of an ongoing communication between the mobile terminal 100 and a counterpart terminal. Like FIG. 24, for clarity, assume that the mobile terminal 100 and the counterpart terminal are sharing schedules with each other.

Referring to FIG. 25 (a), before a new communication is initiated between the mobile terminal 100 and the third party terminal, a display of a control button 2510 for adjusting the first data sharing screen and the second data sharing screen may be omitted from the second data sharing screen failing in having the first authority granted thereto unlike the former first data sharing screen shown in FIG. 24 (a).

After the new communication has been initiated between the mobile terminal 100 and the third party terminal, if the first authority is granted to the counterpart terminal, referring to FIG. 25 (b), the controller 180 may control a control button 2510, which is provided to adjust the first data sharing screen, to be included in the second data sharing screen as well. If the counterpart terminal manipulates the control button 2510 of the second data sharing screen, the controller 180 may be able to adjust the first data sharing screen by receiving a manipulation signal from the counterpart terminal. Since the adjustment of the second data sharing screen corresponding to the clone screen of the first data sharing screen will be accompanied by the adjustment of the first data sharing screen, the counterpart may be able to control the first data sharing screen and the second data sharing screen using a control button 2510 displayed on the second data sharing screen. Moreover, the controller 180 may control an alarm, which indicates that the first authority is granted to the counterpart terminal, to be outputted. For instance, although an alarm message 2520 of the touchscreen is shown as one example of the alarm, the alarm may be outputted using a vibration output from the counterpart terminal, a beep sound output from the counterpart terminal or the like.

Thereafter, if the communication between the mobile terminal 100 and the third party terminal is ended (S410), the controller 180 may be able to automatically end the first control authority granted to the counterpart terminal (S411). When the first control authority is granted to the counterpart terminal, if the counterpart terminal retains the second control authority, the controller 180 terminates the grant of the first control authority and may then provide the second control authority to the counterpart terminal. If the first control authority grant to the counterpart terminal is terminated, as mentioned in the foregoing description with reference to FIG. 25 (b), the controller 180 may control the alarm, which indicates that the grant of the first control authority has been terminated, to be outputted via the counterpart terminal (not shown in the drawing).

While the voice call and the data sharing are simultaneously ongoing between the mobile terminal 100 and the counterpart terminal, even if the voice call between the mobile terminal 100 and the counterpart terminal is ended (S412), it may be unnecessary for the data sharing between the mobile terminal 100 and the counterpart terminal to be stopped. While the voice call and the data sharing are simultaneously performed via a first communication network, even if the voice call is ended, a data channel is not directly interrupted. If the communication channel keeps being established between the mobile terminal 100 and the counterpart terminal despite that the voice call is ended, the data sharing between the mobile terminal 100 and the counterpart terminal may continue after the end of the voice call.

The controller 180 may be able to determine whether to end the data sharing function together with the end of the voice call function depending on which terminal has requested the end of the voice call. For clarity, after the end of the voice call function has been requested, a function performed for the data sharing by the mobile terminal 100 shall be named a first data sharing function and a function performed for the data sharing by the counterpart terminal shall be named a second data sharing function. For instance, whether to end each of the first data sharing function and the second data sharing function may be related to a presence or non-presence of an end of an application used for the data sharing between the mobile terminal 100 and the counterpart terminal, a presence or non-presence of an end of a handwriting input mode, or the like. For instance, for the location sharing between the mobile terminal 100 and the counterpart terminal, if a map application is activated in each of the mobile terminal 100 and the counterpart terminal, the first data sharing function may mean the map application in the mobile terminal 100 and the second data sharing function may mean the map application in the counterpart terminal.

For another instance, if a handwriting input is set to be shared between the mobile terminal 100 and the counterpart terminal, the first data sharing function may mean the handwriting input mode in the mobile terminal 100 and the second data sharing function may mean the handwriting input mode in the counterpart terminal.

If the first data sharing function and the second data sharing function are set to be immediately ended as soon as the voice call is ended, the first handwriting data performed on the mobile terminal 100 or the second handwriting data performed on the counterpart terminal may disappear from the screen as well. This may be against user's intention to persistently maintain the data shared between the mobile terminal 100 and the counterpart terminal. Hence, the controller 180 may control the first data sharing function to be ended only if the user intends to end the first data sharing function as well.

In other words, if the user and the counterpart has no intention to end the first data sharing function and the second data sharing function, even if the voice call between the mobile terminal 100 and the counterpart terminal is ended, the controller 180 may control the first data sharing function to be active in the mobile terminal 100 and may control the second data sharing function corresponding to the first data sharing function to be active in the counterpart terminal. In particular, after the end of the voice call, the first data sharing screen corresponding to the first data sharing function may continue being displayed on the mobile terminal 100 and the second data sharing screen corresponding to the second data sharing function may continue being displayed on the counterpart terminal.

Referring now to FIG. 4, according to the present invention, if the end of the voice call is requested by the mobile terminal 100 (S413), the controller 180 may control the first data sharing function to be automatically ended together with the end of the voice call function (S414).

On the other hand, instead of automatically ending the first data sharing function in case of the voice call end, the controller 180 may be able to determine whether to end the first data sharing function in response to a selection made by a user. In particular, if the user makes a request for ending the first data sharing function together with the end of the voice call function, the controller 180 may control the first data sharing function to be ended together with the voice call end. Instead, if the user makes a request for the end of the voice call function only, the controller 180 may control the first data sharing function to be continuously active despite the end of the voice call function.

When the user makes the request for the voice call end, a process for ending the first data sharing function together with the end of the voice call function is described in detail with reference to FIG. 26 as follows. For clarity of the following description, assume that the mobile terminal 100 and the counterpart terminal are configured to share a handwriting input before the end of the voice call function.

FIG. 26 is a diagram for one example of a screen provided to determine whether to end a first data sharing function as well when an end of a voice call function is requested.

Figure 26A:
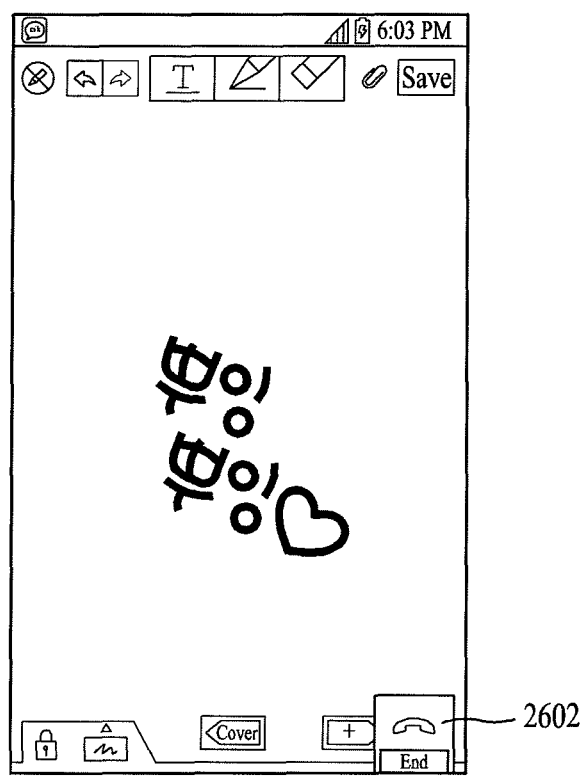
FIGS. 26A-26E are diagrams for one example of a screen provided to determine whether to end a first data sharing function as well when an end of a voice call function is requested.
Figure 26B:
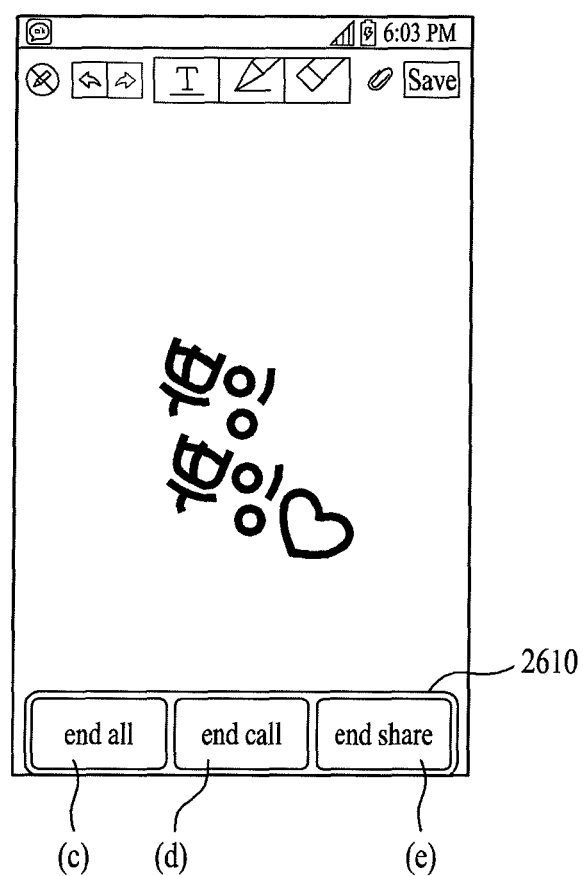
Figure 26C:
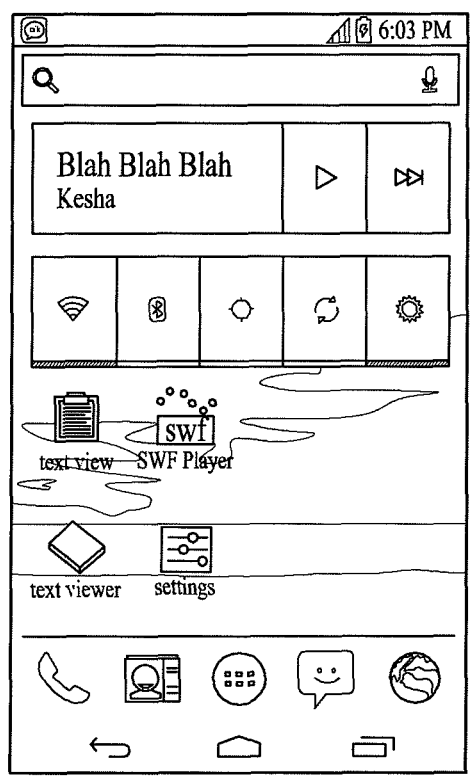

Referring to FIG. 26, while a first data sharing screen for sharing a handwriting input with the counterpart terminal is displayed on the touchscreen, if an end button 2602 is selected by a user (FIG. 26A), the controller 180 may control a selection menu 2610, which is provided to select a function of end, to be displayed (FIG. 26B).

In the example of the selection menu 2610 shown in FIG. 26B, an item 'end all' may be understood to end both a voice call function and a first data sharing function. And, an item 'end call' may be understood to end the voice call function only except the first data sharing function. Moreover, an item 'end share' may be understood to end a data sharing between the mobile terminal 100 and the counterpart terminal.

Figure 26D:
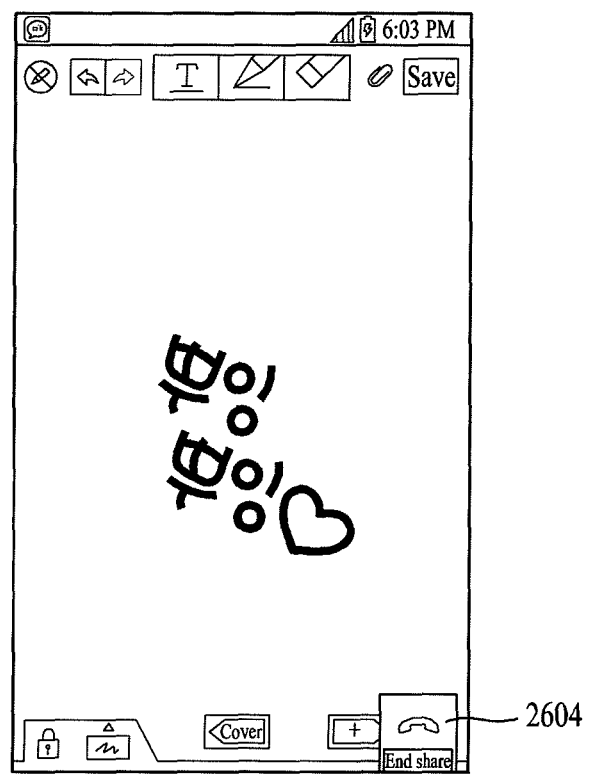

If the item 'end all' is selected in the example shown in FIG. 26B, the controller 180 may control both of the voice call function and the first data sharing function to be ended (FIG. 26C) (e.g., both of the voice call function and the first data sharing function are ended and a home screen image is outputted from the touchscreen). In the example shown in FIG. 26B, if the item 'end call' is selected, the controller controls the voice call function to be ended and controls the first data sharing function to be continuously active. Hence, referring to FIG. 26D, the controller 180 may control the first data sharing screen corresponding to the first data sharing function to be continuously displayed on the touchscreen. In doing so, the end button shown in FIG. 26A may be changed into a button 2604 for commanding an end of the data sharing with the counterpart terminal (FIG. 26D).

Figure 26E:
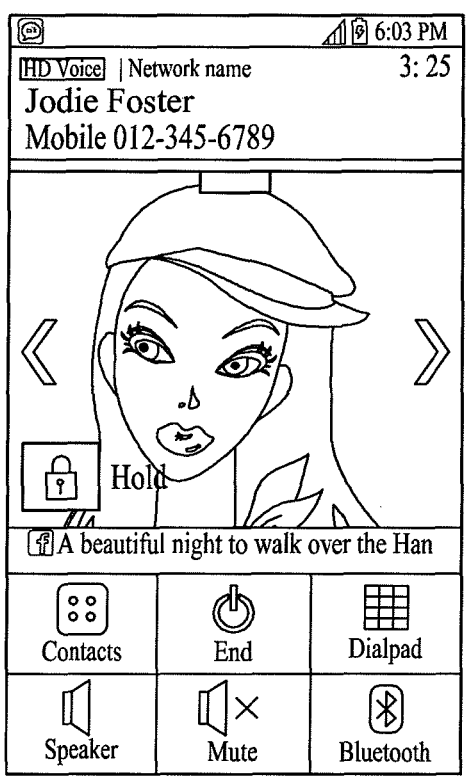

Finally, if the item 'end share' is selected in the example shown in FIG. 26B, the controller 180 ends the data sharing between the mobile terminal 100 and the counterpart terminal and may control the touchscreen to return to the call connected screen (FIG. 26E).

In the example shown in FIG. 26, only if the first data sharing function is set to be ended simultaneously with an end of the voice call, the controller 180 may set both of the voice call function and the first data sharing function to be simultaneously ended.

Yet, the end of the first data sharing function by the controller 180 has nothing to do with the end of the second data sharing function in the counterpart terminal. Irrespective of a presence or non-presence of the end of the first data sharing function, the controller 180 may control the counterpart to determine whether to end the second data sharing function.

In particular, even if the first data sharing function is ended in the mobile terminal 100, the second data sharing function may be active in the counterpart terminal. On the contrary, even if the second data sharing function is ended in the counterpart terminal, the first data sharing function may be active in the mobile terminal 100. Moreover, the first data sharing function and the second data sharing function may be continuously active in the mobile terminal 100 and the counterpart terminal, respectively.

If the first data sharing function and the second data sharing function are continuously active in the mobile terminal 100 and the counterpart terminal after the end of the voice call, respectively. The controller 180 may control the mobile terminal 100 and the counterpart terminal to continuously display the first data sharing screen corresponding to the first data sharing function and the second data sharing screen corresponding to the second data sharing function, respectively.

In doing so, if a first handwriting data is inputted to the first data sharing screen, the controller 180 transmits the first handwriting data to the counterpart terminal and may control the first handwriting data to be displayed on the second data sharing screen. Moreover, if a second handwriting data is inputted to the second data sharing screen, the controller 180 receives the second handwriting data and may control both of the first handwriting data and the second handwriting data to be simultaneously displayed on the first data sharing screen.

In particular, if the first data sharing function and the second data sharing function are continuously active in the mobile terminal 100 and the counterpart terminal after the end of the voice call, respectively, the embodiment for the data sharing between the mobile terminal 100 and the counterpart terminal in the course of the voice call may be applicable as it is.

In the following description, if the end of the voice call is requested by the counterpart terminal, operations of the mobile terminal 100 are explained in detail with reference to FIG. 4 as follows.

First of all, if the end of the voice call is requested by the counterpart terminal (S413), the controller 180 may be able to determine whether to end the first data sharing function depending on whether the data shared with the counterpart terminal at the moment of requesting the end of the voice call are saved all. If the data shared with the counterpart terminal at the moment of requesting the end of the voice call from the counterpart terminal are saved all (S415), the controller 180 may control the first data sharing function to be ended together with the voice call (S414). Otherwise, if determining that at least one portion of the data shared with the counterpart terminal at the moment of requesting the end of the voice call from the counterpart terminal is not saved (S415), the controller 180 may control the first data sharing function not to be ended despite the end of the voice call (S416).

According to another embodiment of the present invention, if the controller 180 continuously activates the first data sharing function, the controller 180 may be able to determine whether to end the first data sharing function by awaiting a user selection. In particular, after the voice call function has been ended in response to a request made by the counterpart terminal, although at least one portion of the data shared with the counterpart terminal is not saved, if the user makes a request for an end of the first data sharing function, the first data sharing function may be ended together with the end of the voice call function. On the other hand, if the user does not want the end of the first data sharing function, it may be able to control the voice call function to be ended only by enabling the first data sharing function to be continuously active.

If the counterpart terminal makes a request for an end of a voice call, whether to end the first data sharing function shall be described in detail with reference to FIG. 27. For clarity of the following description, as mentioned in the foregoing description with reference to FIG. 26, assume that the mobile terminal 100 and the counterpart terminal are configured to share a handwriting input before the end of the voice call function.

Figure 27:
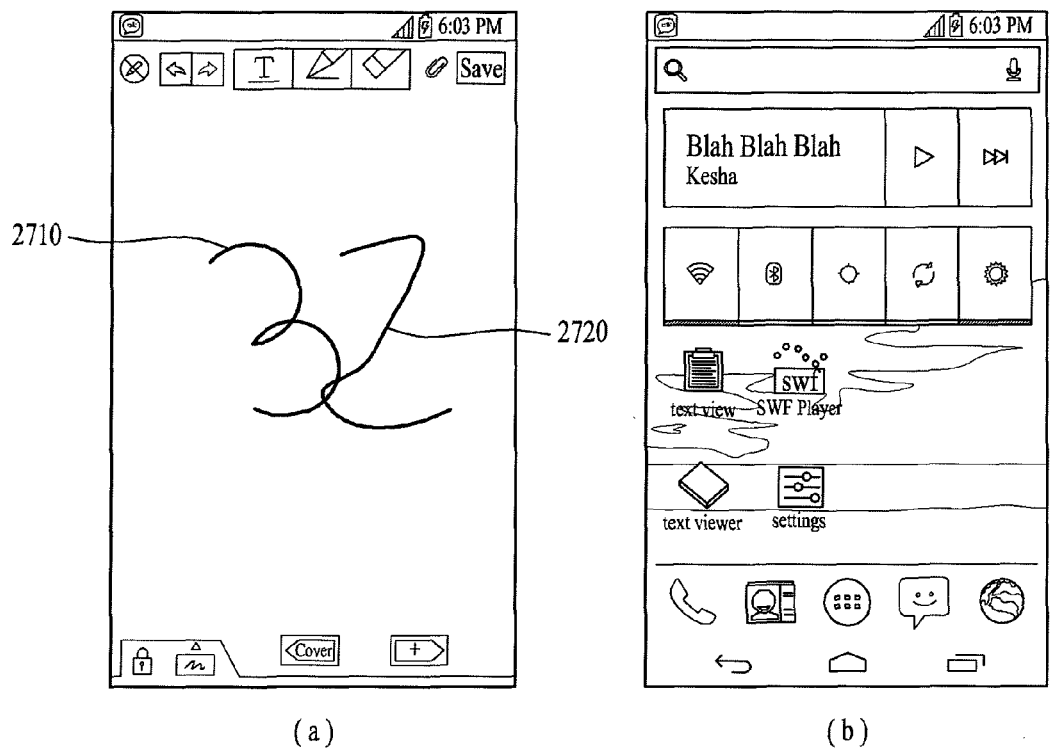
FIG. 27 is a diagram for one example of a screen provided to determine whether to end a first data sharing function as well when an end of a voice call function is requested.
Figure 27:
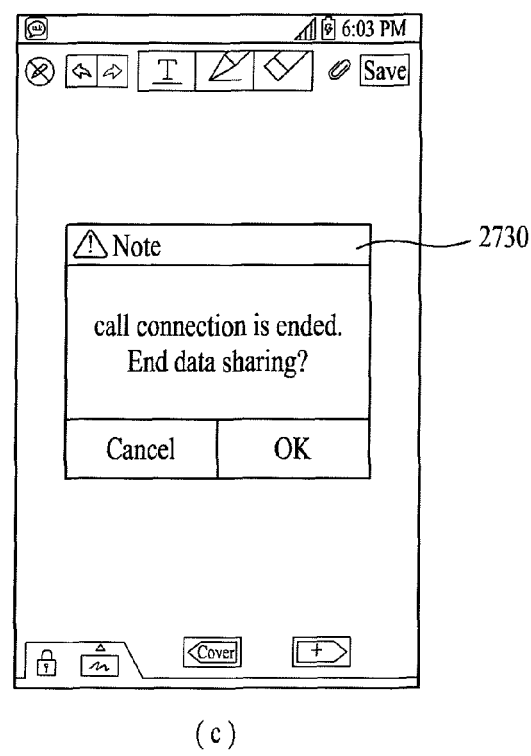

FIG. 27 is a diagram for one example of a screen provided to determine whether to end a first data sharing function as well when an end of a voice call function is requested. For clarity of the following description, when an end of a voice call function is requested, assume that a first handwriting data 2701 inputted by a user of the mobile terminal 100 and a second handwriting data 2720 inputted by a counterpart are simultaneously displayed on the touchscreen (FIG. 27 (a)). When an end of the voice call function is requested by the counterpart terminal, if an output screen containing the first handwriting data 2710 and the second handwriting data 2720 are already saved as an image file, the controller 180 may control a first data sharing function to be ended together with an end of the voice call (e.g., FIG. 27 (b) shows one example that both of the voice call function and the first data sharing function are ended and that the touchscreen outputs a home screen image). On the other hand, when an end of the voice call function is requested by the counterpart terminal, if an image file for saving an output screen containing both the first handwriting data 2710 and the second handwriting data 2720 are not created yet, the controller 180 may control a popup menu 2730, which is provided to select whether to end the first data sharing function, to be displayed (FIG. 27 (c)). If the user sets the first data sharing function to be ended together with the end of the voce call function in the popup menu 2730 shown in FIG. 27 (c) (e.g., a button 'OK' is selected from the popup menu), the controller 180 may control the first data sharing function to be ended together with the voice call function. On the other hand, if the user sets the first data sharing function to be continuously active (e.g., a button 'Cancel' of the popup menu is selected), the controller 180 may control the first data sharing function to be continuously active despite the end of the voice call function.

After the voice call function has been ended, if the first data sharing function is set to be continuously active, the controller 180 may control the data (e.g., the first handwriting data 2710 and the second handwriting data 2720 in FIG. 26 and FIG. 27) shared with the counterpart terminal to be saved in a call history. Thus, by saving the data shared with the counterpart terminal in the call history, it may be able to prevent data loss caused in the course of the data sharing with the counterpart terminal.

Moreover, after additional data shared with the counterpart terminal is generated after the end of the voice call function, if the first data sharing function is ended, the controller 180 may control the previously generated shared data and the additional shared data to be automatically saved in the memory 160.

For instance, after the voice call function has been ended in the course of displaying the first handwriting data 2710 and the second handwriting data 2720 on the first data sharing screen, if a third handwriting data is inputted to the first data sharing screen, the controller 180 may control the first to third handwriting data to be automatically saved in a photo album when the first data sharing screen is ended. In particular, in case that a data shared with the counterpart terminal is newly generated after ending the voice call, additional data may be set to be automatically saved in the memory 160 in order to prevent the loss of the newly added shared data.

Referring now to FIG. 4, after the first data sharing function has been ended in the mobile terminal (S414), if the first data sharing function is reactivated (S417), the controller 180 may control at least one portion of the data, which was displayed on the first data sharing screen at the moment of ending the first data sharing function, to be displayed on the first data sharing screen. In particular, after the first data sharing function has been ended, if the first data sharing function is reactivated within a prescribed time (S418), the controller 180 may control at least one portion of the data previously shared with the counterpart terminal to be displayed on the first data sharing screen (S419). On the other hand, if the first data sharing function is reactivated after expiration of a prescribed time from a timing point of ending the first data sharing function (S418), the controller 180 may control the first data sharing screen to be configured without displaying the previously shared data (S420).

Referring to the example shown in FIG. 27, after the first data sharing function has been ended, if the first data sharing function is reactivated within a prescribed time, the controller 180 may control the first data sharing screen, which displays at least one of the first and second handwriting data previously shared with the counterpart terminal, to be displayed on the touchscreen. On the other hand, after expiration of a prescribed time since the end of the first data sharing function, if the first data sharing function is reactivated, the controller 180 may configure the first data sharing screen without displaying the first and second handwriting data previously shared with the counterpart terminal.

According to one embodiment of the present invention, while the mobile terminal 100 and the counterpart terminal share data with each other using a first communication network, if the wireless communication unit makes a handover into a second communication network from the first communication network, the controller 180 may be able to determine whether to end the first data sharing function depending on whether the data previously shared with the counterpart terminal at the moment of making the handover is fully saved. If the handover is performed from the first communication network to the second communication network, it means that the mobile terminal 100 deviates from the first communication network irrespective of the user of the mobile terminal 100. Hence, the controller 180 may be able to determine whether to end the first data sharing function depending on whether the data shared with the counterpart terminal is saved like the former case that the counterpart makes a request for ending the voice call. In particular, if all the data shared with the counterpart terminal are saved, the controller 180 may control the first data sharing function to be ended. Yet, in case of determining that at least one portion of the shared data is not saved, the controller 180 waits for a selection made by the user and may be then able to adjust whether to end the first data sharing function despite the handover.

In this case, if the second communication network is a communication network supportive of data transmission and reception, the controller 180 may be able to establish a new data communication channel. Instead, if the second communication network is a voice dedicated communication network, the first data sharing function may be continuously active in off-line state.

The above-described operations of the mobile terminal 100 may be performed to enable an additional data sharing with the counterpart terminal that performs 1:1 voice call. Yet, the above-mentioned operations are not applicable only if the mobile terminal 100 according to the present invention performs the 1:1 voice call. And, it is a matter of course that the above-mentioned data sharing operation may be performed in the course of performing multi-user voice call instead of the 1:1 voice call.

In the example shown in FIG. 4, while the mobile terminal 100 and the counterpart terminal perform the voice call using the first communication network, the data sharing between the mobile terminal 100 and the counterpart terminal may be performed. As mentioned in the foregoing description, since the first communication network includes the data packet communication network and a transmission path of the voice data is equal to that of data, data can be transmitted to the counterpart terminal while attempting a call connection.

Hence, unlike FIG. 4, the mobile terminal 100 may be able to transmit the data to share with the counterpart terminal as soon as requesting the call connection using the first communication network despite that the voice call is not connected between the mobile terminal 100 and the counterpart terminal yet. A process for the mobile terminal 100 to transmit data to share to the counterpart terminal on requesting a call connection is described in detail with reference to FIG. 28 and FIG. 29 as follows.

FIG. 28 is a diagram for one example of an output of a mobile terminal 100 to describe a process for making a request for a call connection to a counterpart terminal by attaching data to share with the counterpart terminal.

Figure 28A:
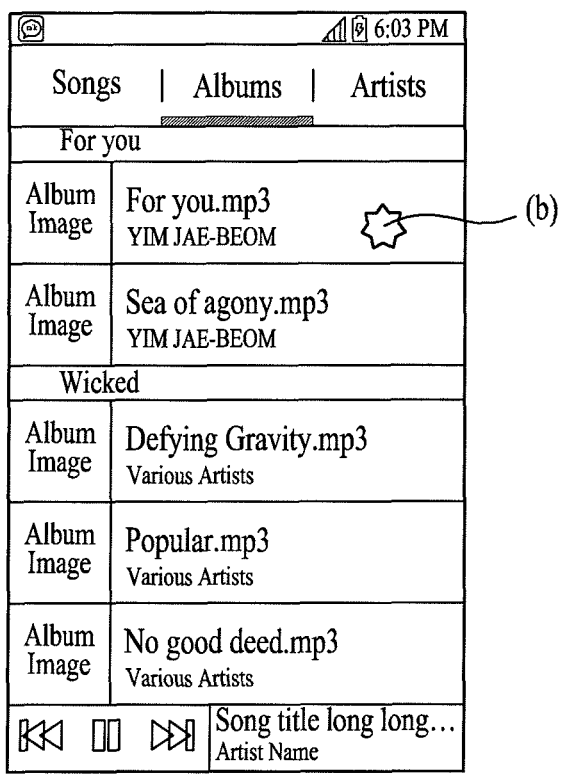
FIGS. 28A-28F are diagrams for one example of an output of a mobile terminal 100 to describe a process for making a request for a call connection to a counterpart terminal by attaching data to share with the counterpart terminal.
Figure 28B:
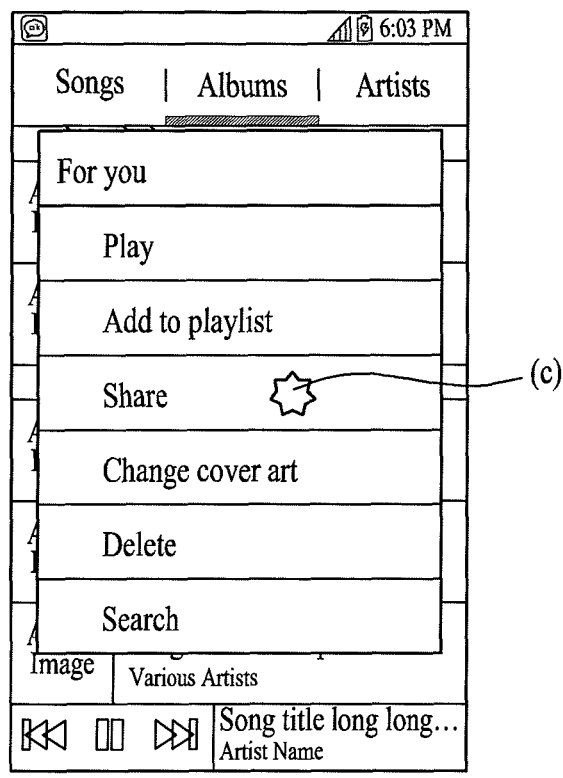
Figure 28C:
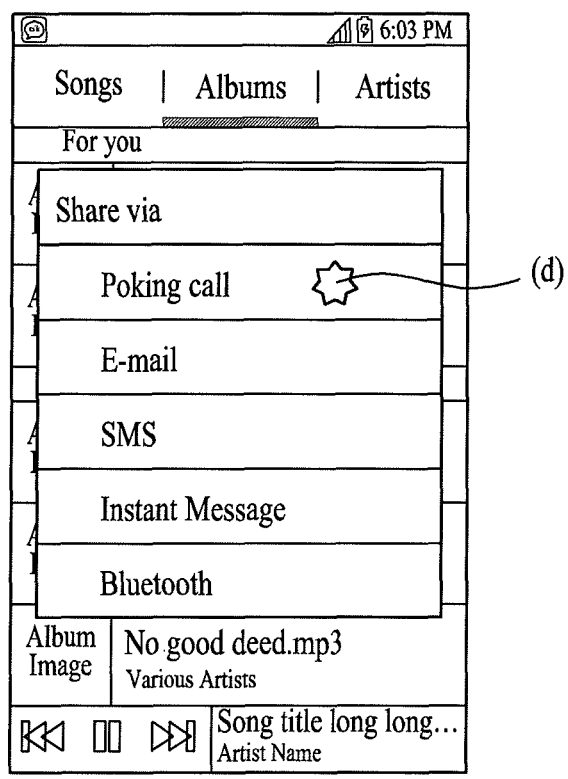
Figure 28D:
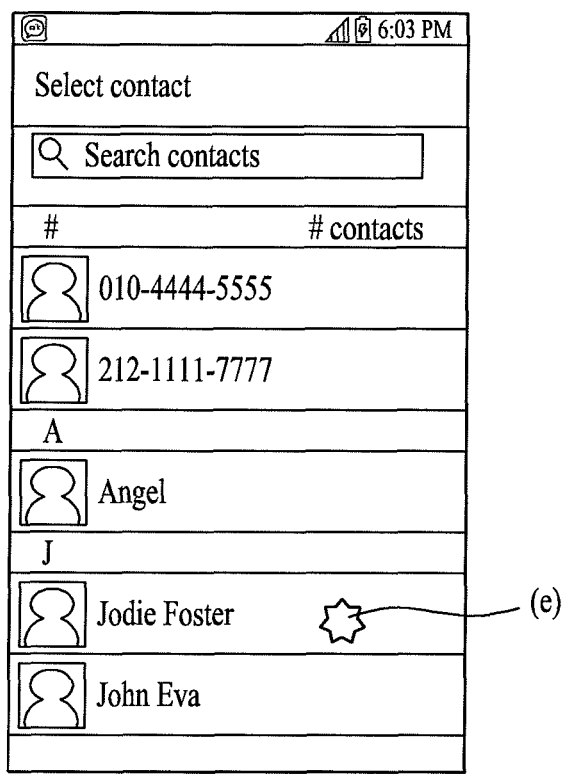

Referring to FIG. 28, if a prescribed touch input is applied to a music file a user intends to share in a music list shown in FIG. 28A, the controller 180 may control a control menu shown in FIG. 28B to be displayed. If an item 'Share' is selected from the control menu shown in FIG. 28B, the controller 180 may be able to display a share list on which a scheme of sharing a selected music file with an external terminal are enumerated (FIG. 28C). In the example shown in FIG. 28C, since it is a well-known scheme of sharing data using one of an instant messenger, a text message, an email, a short-range communication and the like, details of the well-known schemes shall be omitted. In the example shown in FIG. 28C, an item 'Poking Call' may be understood as an item for transmitting music data in case of a request for a call connection to the counterpart terminal. If Poking Call is selected from the example shown in FIG. 28C, the controller 180 displays a phonebook list and may guide a selection made by a counterpart who attempts a call connection. If a counterpart to be called is selected from the example shown in FIG. 28D, the controller 180 makes a request for a call connection to the selected counterpart terminal using the first communication network and simultaneously controls the music file selected in FIG. 28A to be transmitted to the counterpart terminal.

While the call connection is requested to the counterpart terminal, the controller 180 may be able to control the music file, which was selected in FIG. 28A, to be outputted. In particular, in the course of requesting the call connection to the counterpart terminal, the controller 180 may control the music file selected in FIG. 28A to be provided as a call connection sound.

Moreover, the controller 180 may be able to control the music file selected in FIG. 28A to be played in the counterpart terminal on which the call connection request screen is displayed. In particular, while the music file is transmitted to the counterpart terminal, the controller 180 may be able to control the same data to be outputted from each of the mobile terminal 100 and the counterpart terminal. Yet, if the counterpart terminal is set not to a ring tine mode but to a vibration or silence mode, the selected music file may not be outputted from the counterpart terminal.

Figure 28E:
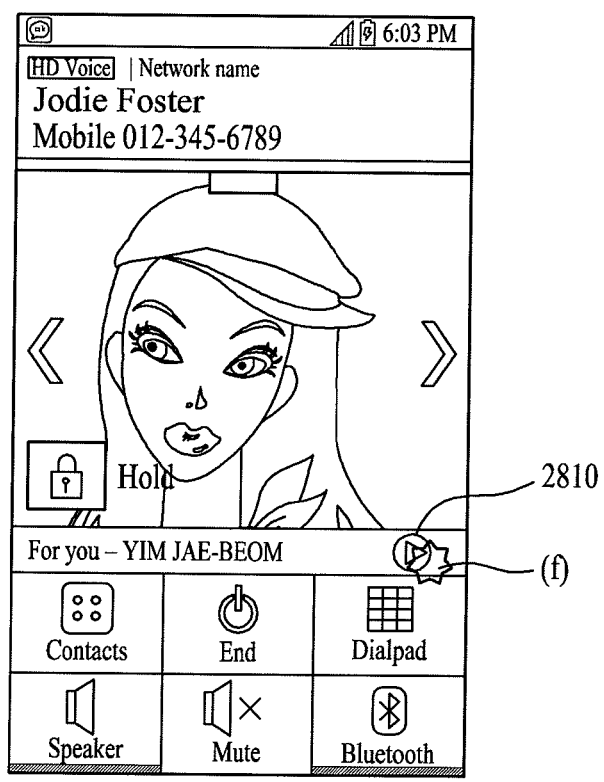
Figure 28F:
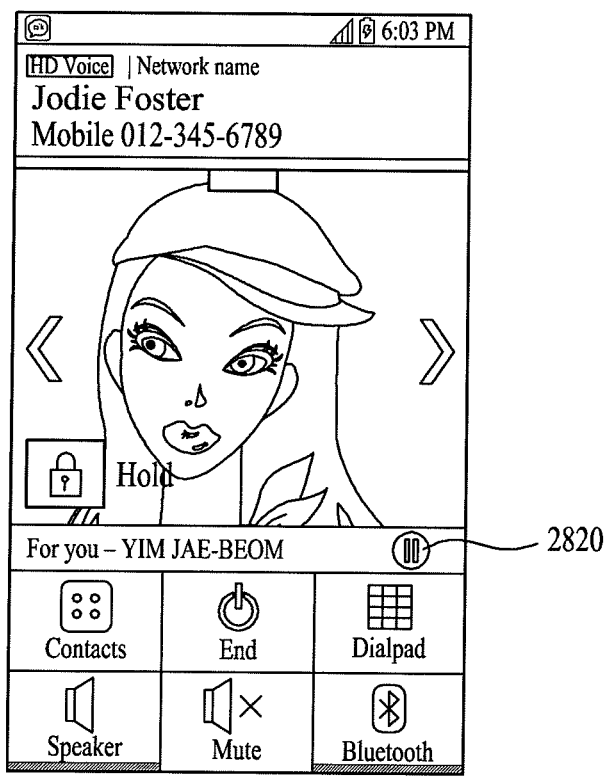

In case that the counterpart terminal accepts the call connection request, the controller 180 stops playing the music file provided as the call connection sound and may control a play button 2810, which is provided to control a play of the music file, to be displayed (FIG. 28E). Thereafter, if a play command for playing a music file to share is inputted (e.g., the play button 2810 is selected), the controller 180 may be able to control the music file to be played by starting with the stopped point of the music file (FIG. 28F) (in doing so, the play button provided in FIG. 28E may be changed into a pause button 2820). Moreover, the controller 180 may control the selected music file to be played in the counterpart terminal as well.

In particular, while the music file set to be shared with the counterpart is being outputted via the mobile terminal 100, the controller 180 may be able to control the same music file, which is to be shared, to be outputted from the counterpart terminal. Hence, each of the counterpart and the user may have the same user experience and may set a matched share initiated point in case of a call connection.

Although FIG. 28 shows one example that the music file can be transmitted when a call is connected to the counterpart terminal, contents transmittable to the counterpart terminal may be non-limited by music contents. For instance, the mobile terminal 100 may be able to provide the counterpart terminal with such a content as an image file, a video file, a memo pad for recording a handwriting input and the like.

When the mobile terminal 100 provides an image file to the counterpart terminal, operations of the mobile terminal 100 are described in detail with reference to FIG. 29 as follows. For clarity of the following description, an output screen of the counterpart terminal may be simultaneously shown in FIG. 29 if necessary. In case that the output screen of the counterpart terminal is shown, as mentioned in the foregoing descriptions with reference to the accompanying drawings, an identification number '2' shall be attached to the corresponding output screen.

FIG. 29 is a diagram for one example of an output of a mobile terminal 100 to describe that a call connection is requested to a counterpart terminal in a manner of attaching image data to share with the counterpart terminal.

Figure 29A:
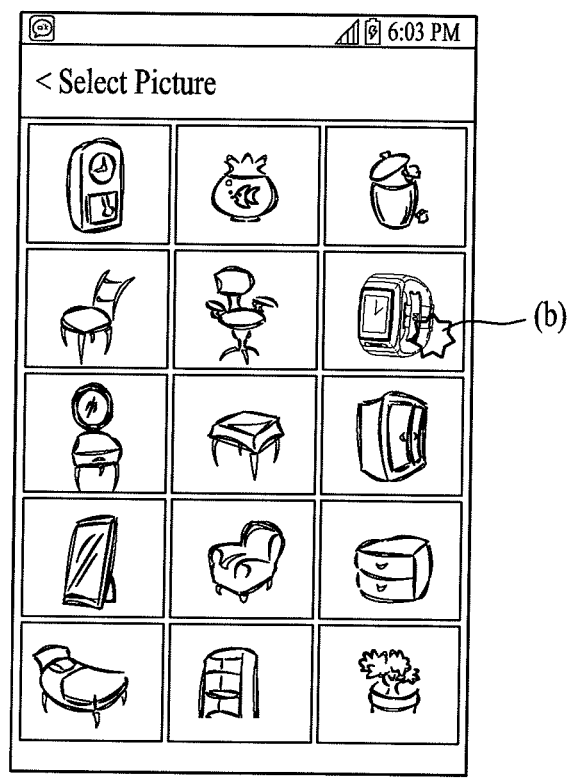
FIGS. 29A-29G are diagrams for one example of an output of a mobile terminal 100 to describe that a call connection is requested to a counterpart terminal in a manner of attaching image data to share with the counterpart terminal.
Figure 29B:
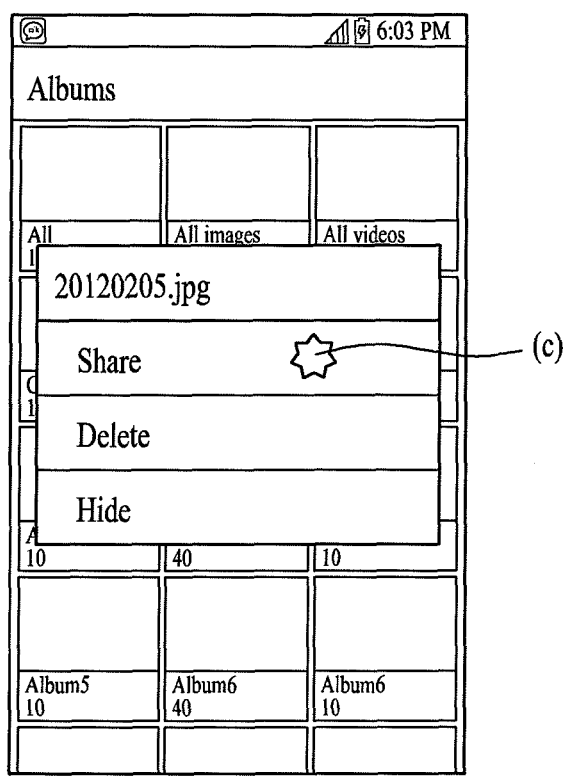
Figure 29C:
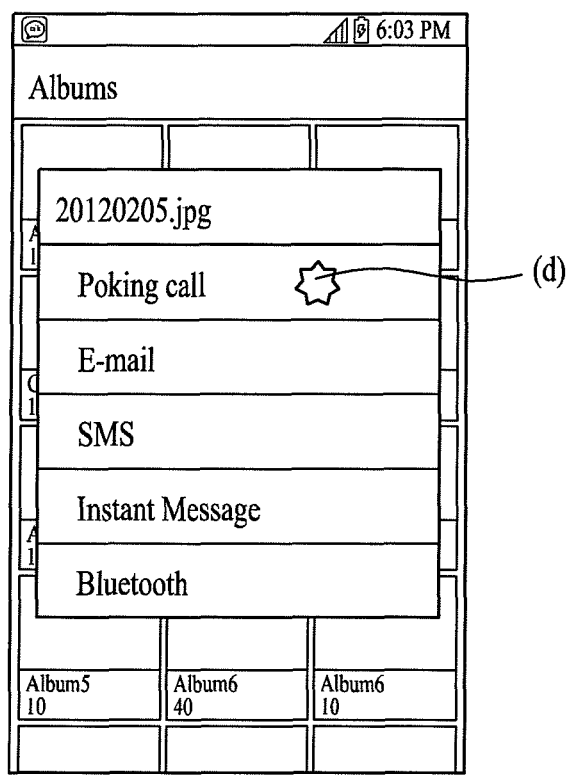

Referring to FIG. 29, if a user applies a prescribed touch input to a music file to share in an image file list shown in FIG. 29A, the controller 180 may control a control menu shown in FIG. 29B to be displayed. The control menu share list and phonebook list shown in FIGS. 29B to 29D are identical those shown in FIGS. 28B to 28D and their details shall be omitted from the following description.

Figure 29D:
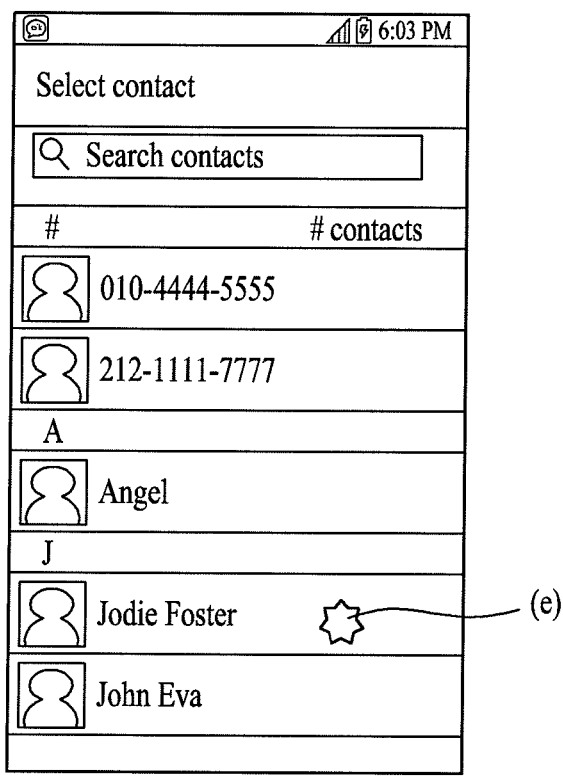

If a counterpart to be called is selected in the example shown in FIG. 29D, the controller 180 makes a request for a call connection to the selected counterpart terminal using a first communication network and may be able to control the image field selected in FIG. 29A to be transmitted to the counterpart terminal as well.

Figure 29E:
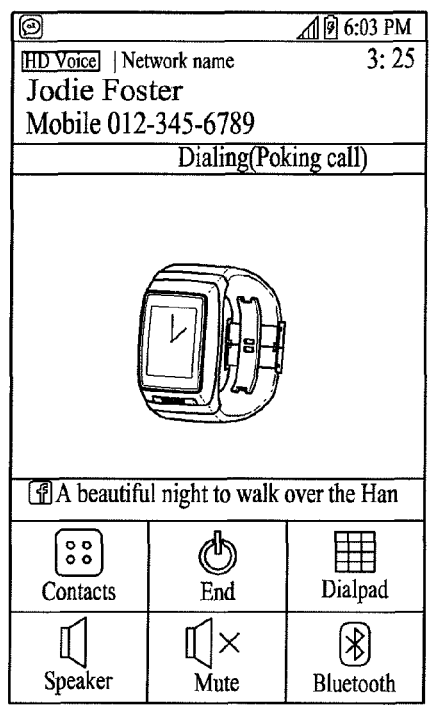
Figure 29E:
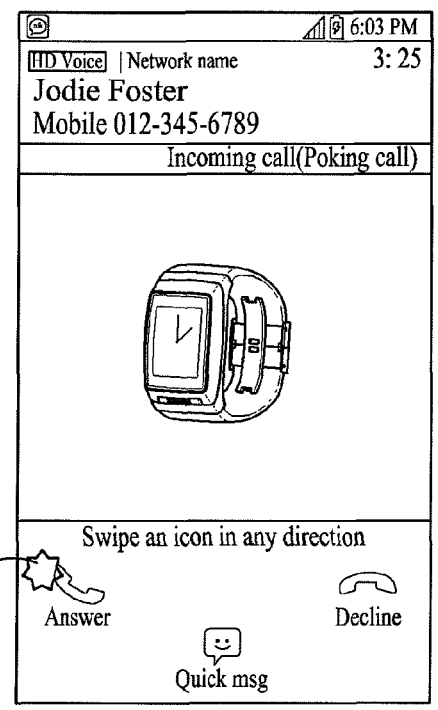

While the call connection is requested to the counterpart terminal, the controller 180 may control the image file selected in FIG. 29A to be outputted to the touchscreen (FIG. 29E 1). Simultaneously, the controller 180 may control the image file selected in FIG. 29A to be outputted to a call connection request screen of the counterpart terminal as well (FIG. 29E 2).

Figure 29F:
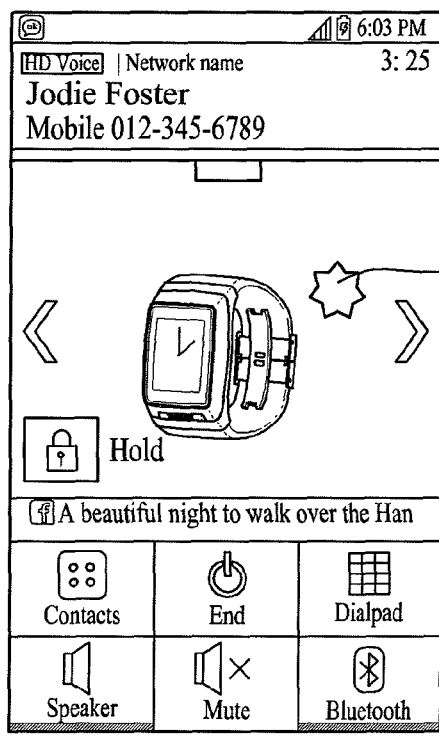
Figure 29F:
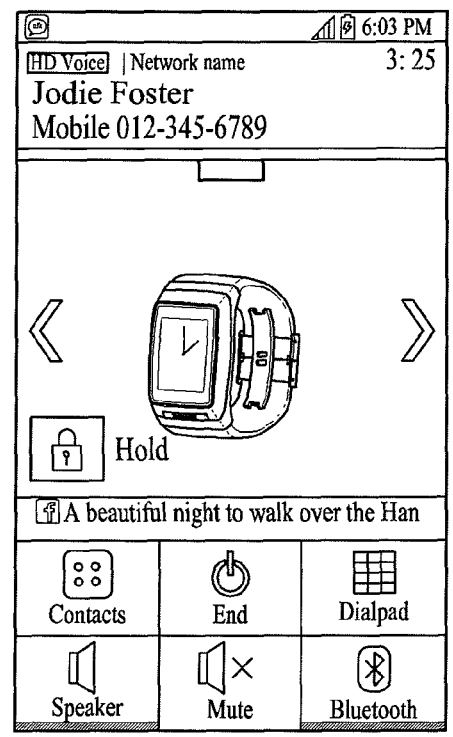
Figure 29G:
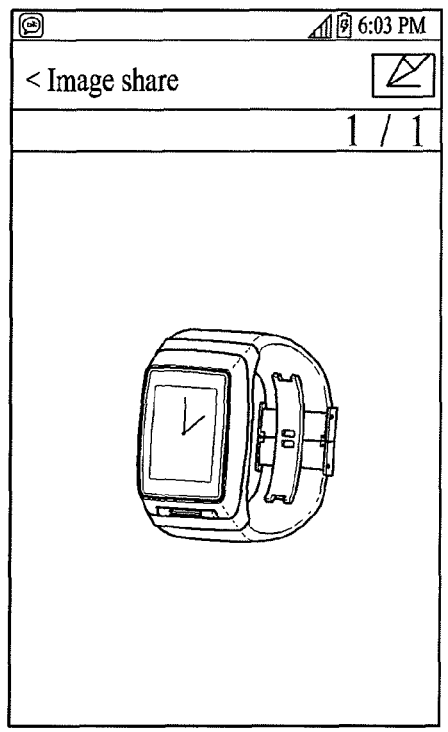
Figure 29G:
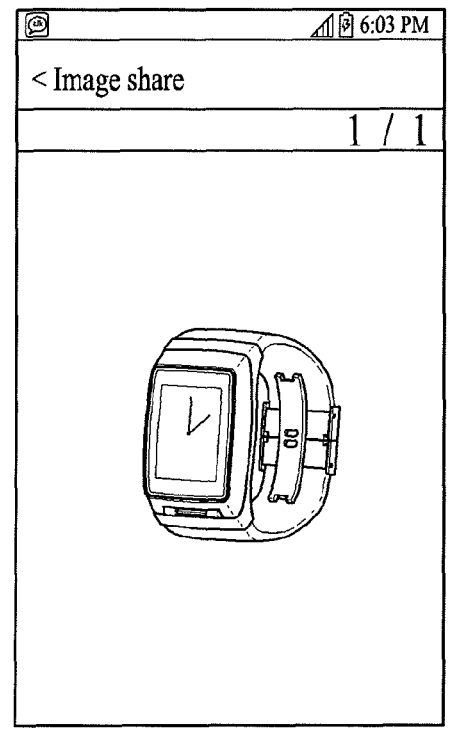

After the call connection between the mobile terminal 100 and the counterpart terminal has been initiated, the controller 180 may control the image file selected in FIG. 29A to be outputted to the call connection screen of each of the mobile terminal 100 and the counterpart terminal as well (FIG. 29F1, FIG. 29F 2). In doing so, if a user command for the image file displayed on the mobile terminal 100 and/or the image file displayed on the counterpart terminal is inputted (e.g., a touch input is inputted to the mobile terminal 100 in FIG. 29F), the controller 180 may be able to control the first data sharing screen and the second data sharing screen to be displayed on the mobile terminal 100 and the counterpart terminal, respectively (FIG. 29G 1, FIG. 29G 2). In particular, if the user command is inputted to the image file displayed on the mobile terminal 100 and/or the counterpart terminal, the controller 180 regards the inputted user command as a share request acceptance and may control each of the mobile terminal 100 and the counterpart terminal to display the data sharing screen.

When the mobile terminal 100 and the counterpart terminal are configured to share images with each other, detailed operations are already described with reference to FIG. 12 and their details shall be omitted from the following description.

In case that a data type to share via a poking call is a video file, operations of the mobile terminal 100 are described in detail as follows. For clarity of the following description, an output screen of the counterpart terminal may be simultaneously shown in FIG. 30 if necessary. In case that the output screen of the counterpart terminal is shown, as mentioned in the foregoing descriptions with reference to the accompanying drawings, an identification number '2' shall be attached to the corresponding output screen.

FIG. 30 is a diagram for one example of an output of a mobile terminal 100 to describe that a call connection is requested to a counterpart terminal in a manner of attaching video data to share with the counterpart terminal.

Figure 30A:
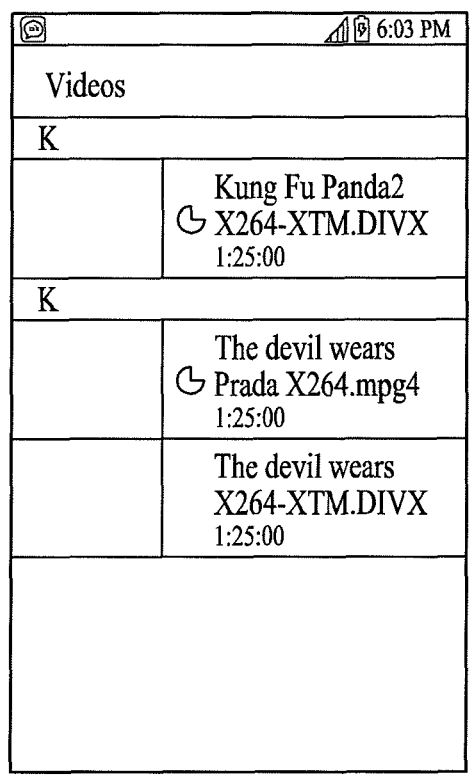
FIGS. 30A-30H are diagrams for one example of an output of a mobile terminal 100 to describe that a call connection is requested to a counterpart terminal in a manner of attaching video data to share with the counterpart terminal.
Figure 30B:
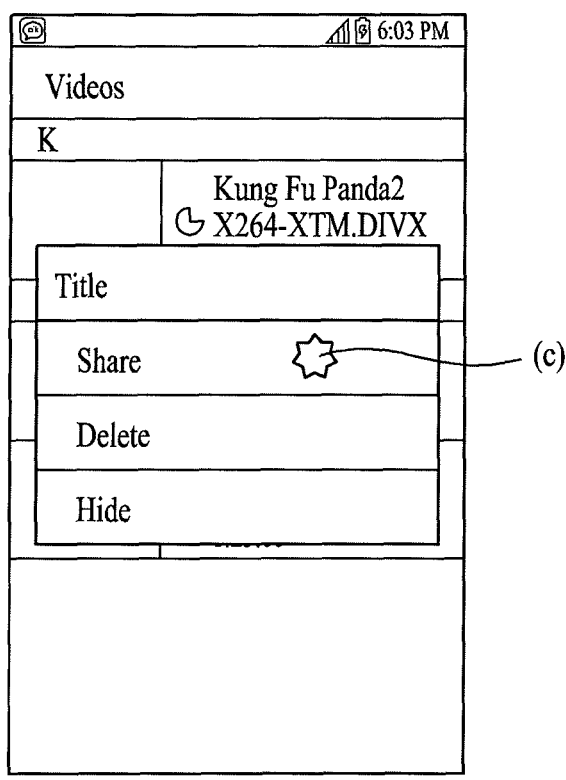
Figure 30C:
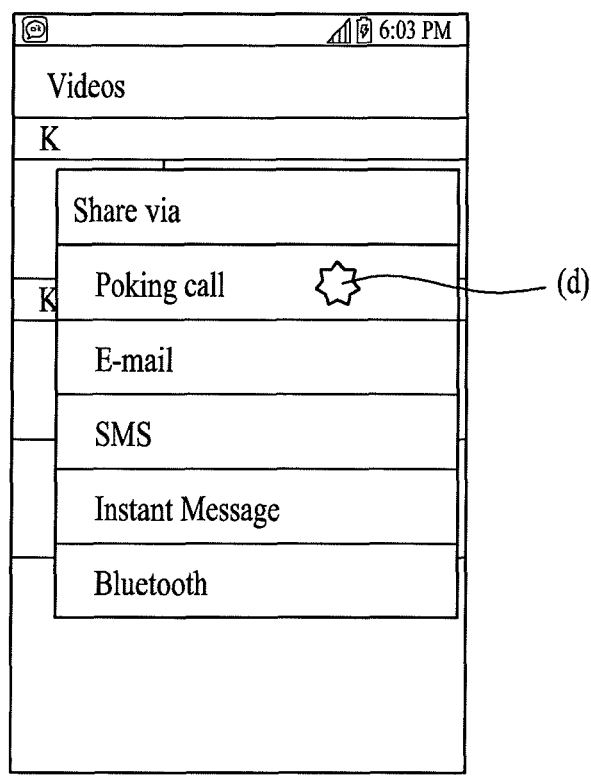

Referring to FIG. 30, if a user applies a prescribed touch input to a video file to share in a video file list shown in FIG. 30A, the controller 180 may control a control menu shown in FIG. 30B to be displayed. The control menu and share list shown in FIG. 30B and FIG. 30C are identical those shown in FIG. 28B and FIG. 28C and their details shall be omitted from the following description.

Figure 30D:
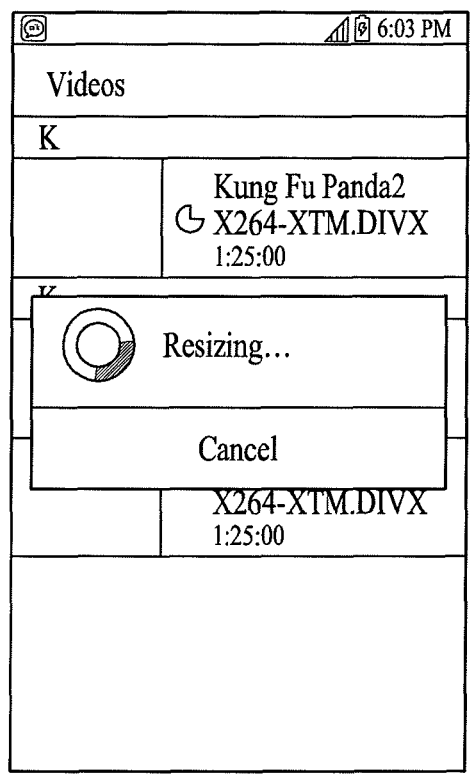

If a video share using a poking call is selected (FIG. 30C), the controller 180 may be able to resize a video file prior to transmitting the video file to the counterpart terminal (FIG. 30D). In this case, the video file is resized in a manner of reducing a size of the video file in order to effectively provide a counterpart with the video file.

Figure 30E:
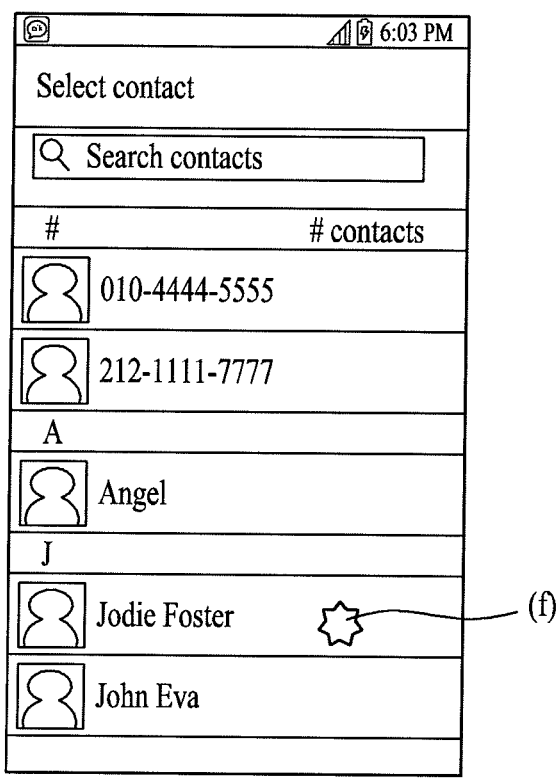

If the video file resizing is completed, the controller 180 displays a phonebook list to guide a selection of a counterpart to which a call will be connected. Referring to FIG. 30E, if a counterpart to be called is selected, the controller 180 makes a request for a call connection to the selected counterpart terminal using a first communication network and may also control the resized video file to be transmitted to the counterpart terminal.

Figure 30F:
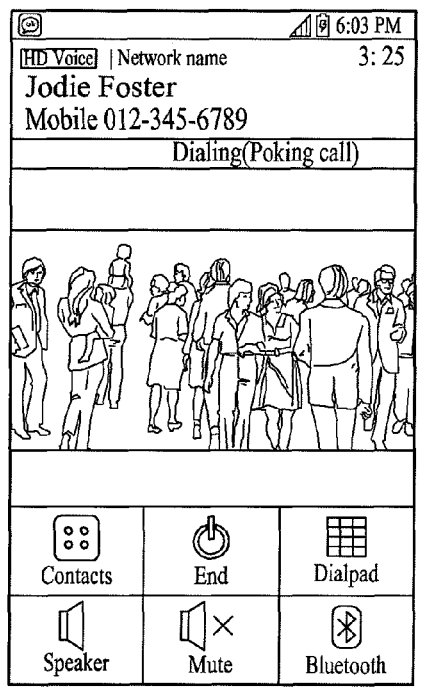
Figure 30F:
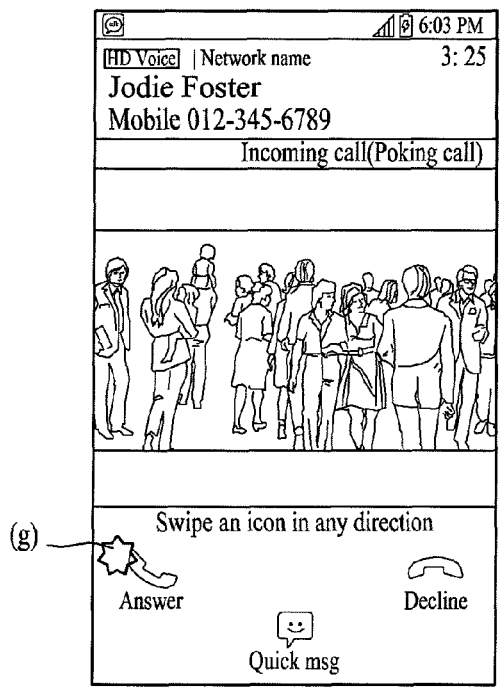

While the call connection is requested to the counterpart terminal, the controller 180 may control a play screen of the resized video file to be outputted to the touchscreen (FIG. 30F 1). Simultaneously, the controller 180 may control the play screen of the resized video file to be outputted from the call connection request screen of the counterpart terminal (FIG. 30F 2). Yet, while the call connection is requested, it is not mandatory for the play screen of the resized video file to be outputted. According to another embodiment of the present invention, while the call connection is requested, the controller 180 may control a thumbnail of the resized screen to be displayed on each of the mobile terminal 100 and the counterpart terminal.

Referring now to FIG. 30F, if the counterpart terminal is set to a ring tone mode, the controller 180 may control the counterpart terminal to output audio data of the video file while outputting the play screen of the resized video file. Yet, if the counterpart terminal is set not to the ring tone mode but to a vibration or silence mode, the audio data of the video file may not be outputted from the counterpart terminal.

Figure 30G:
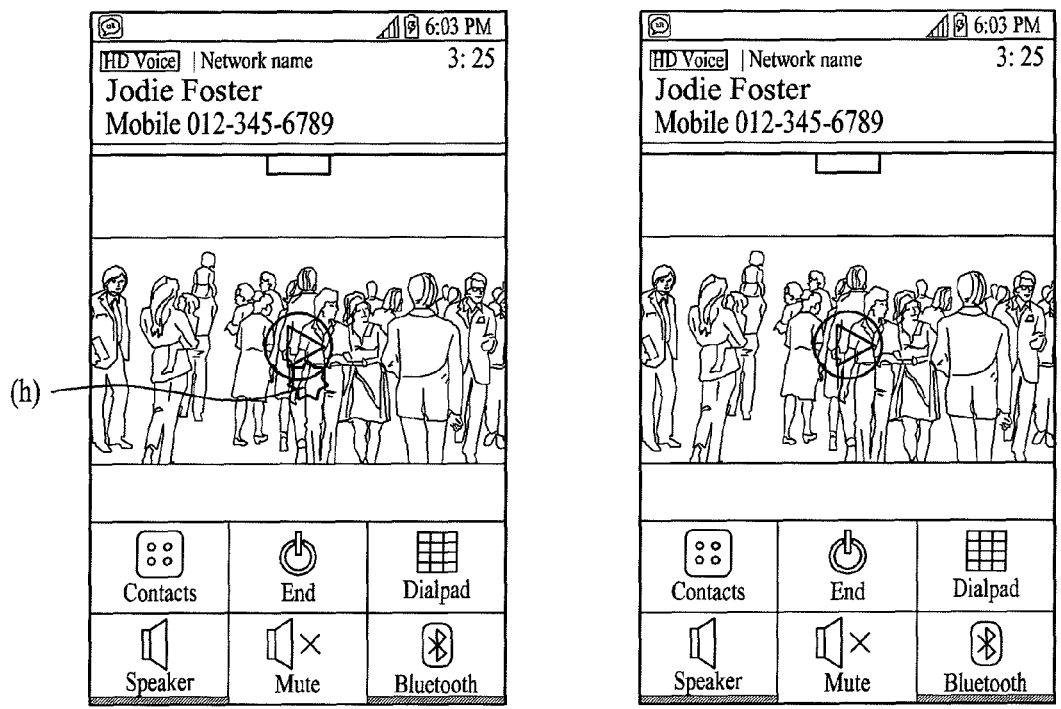

Once the call connection between the mobile terminal 100 and the counterpart terminal is initiated, the controller 180 stops playing the video file in each of the mobile terminal 100 and the counterpart terminal and may control a still image and a video play button to be displayed on each of the mobile terminal 100 and the counterpart terminal (FIG. 30G 1, FIG. 30G 2).

Figure 30H:
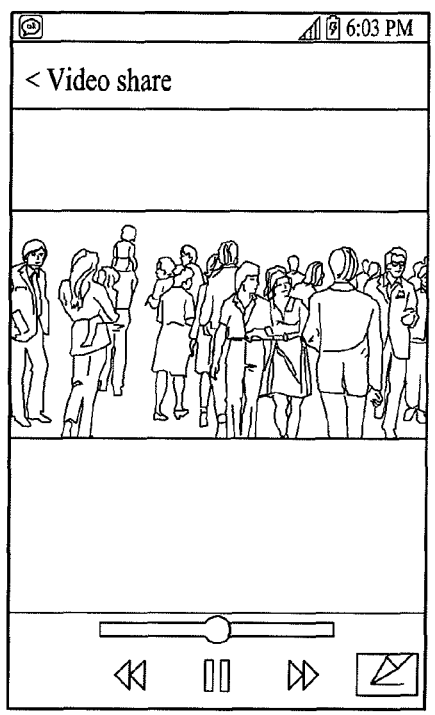
Figure 30H:

In doing so, if a user command is inputted to the play button or still image displayed on the mobile terminal 100 and/or the counterpart terminal (e.g., a touch input is inputted to the play button displayed on the mobile terminal 100), the controller 180 may be able to control the first data sharing screen and the second data sharing screen to be displayed on the mobile terminal 100 and the counterpart terminal, respectively (FIG. 30H 1, FIG. 30H 2). In particular, if the user command is inputted to the play button or still image displayed on the mobile terminal 100 and/or the counterpart terminal, the controller 180 regards the inputted user command as a share request acceptance and may control each of the mobile terminal 100 and the counterpart terminal to display the data sharing screen.

When the mobile terminal 100 and the counterpart terminal are configured to share images with each other, detailed operations of each of the mobile terminal 100 and the counterpart terminal are already described with reference to FIG. 14 and their details shall be omitted from the following description.

According to the descriptions with reference to FIGS. 28 to 30, unlike the former example shown in FIG. 4, the mobile terminal 100 according to the present invention may be able to make a request for a data sharing with a counterpart terminal not after a voice call has been connected but before a voice call is connected. Moreover, the mobile terminal 100 may be able to notify data to share in a manner of controlling the data, which is intended to be shared with a counterpart, to be outputted via each of the mobile terminal 100 and the counterpart terminal in the course of a call connection.

In the examples shown in FIGS. 28 to 30, if data to share with a counterpart is selected from a data list, it may be inconvenient to select data, which is to be shared, from the data list each time a request for a data sharing with a counterpart is made. Hence, the mobile terminal 100 according to one embodiment of the present invention may be able to preset a data which is to be shared with a counterpart terminal. Thereafter, if a call connection is requested to the counterpart terminal via a first communication network, the controller 180 may control the preset data to be provided to the counterpart terminal.

Figure 31:
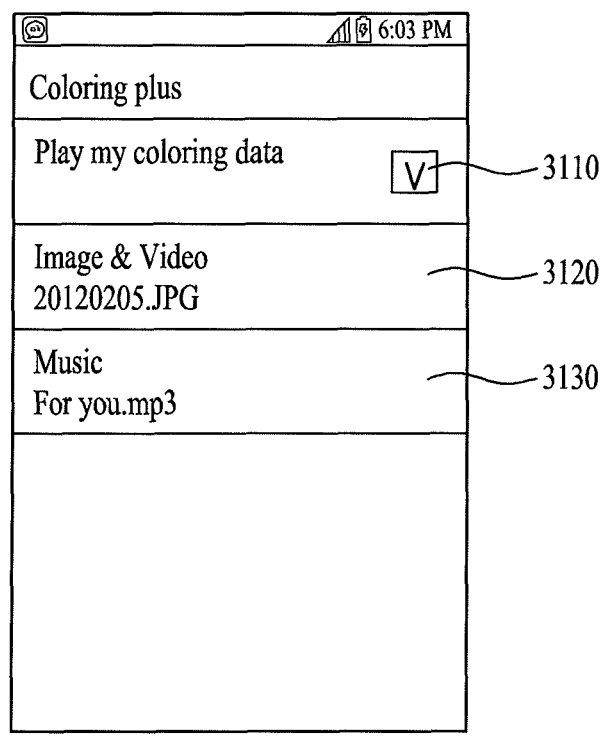
FIG. 31 is a diagram for one example of screen configurations provided to a mobile terminal 100 in order to preset data to share with a counterpart.

FIG. 31 is a diagram for one example of screen configurations provided to a mobile terminal 100 in order to preset data to share with a counterpart.

Referring to FIG. 31, an item 'Image & Video' 3120 is provided to select an image or video file to share with a counterpart and an item 'Music' 3130 is provided to select a music file to share with a counterpart. In case that an item 'Play my coloring data' 3110 is set to an active state, the controller 180 transmits a preset image, video file or music file to a counterpart terminal in case of a call connection to the counterpart terminal and may then control the counterpart terminal to output the corresponding received data.

While the mobile terminal 100 according to the present invention and the counterpart terminal are performing a voice call via a first communication network, the controller 180 may be able to set the touchscreen to a hold state (or a screen locked state) based on a user command. Once the touchscreen is set to the hold state (or the screen locked state), it may be able to set an operation of the mobile terminal 100 not to be adjusted by a touch input to the touchscreen until the hold state (or the screen locked state) is cancelled.

In doing so, if the mobile terminal 100 is set to the hold state, the controller 180 may control a preset image file, a preset video file or a preset music file to be played in response to a user command. Moreover, the controller 180 transmits the preset image file, the preset video file, or the preset music file to the counterpart terminal and may then control the counterpart terminal to play the same content. In case that the mobile terminal 100 is set to the hold state, an operation of the mobile terminal 100 is described in detail with reference to FIG. 32 and FIG. 33 as follows.

Figure 32:
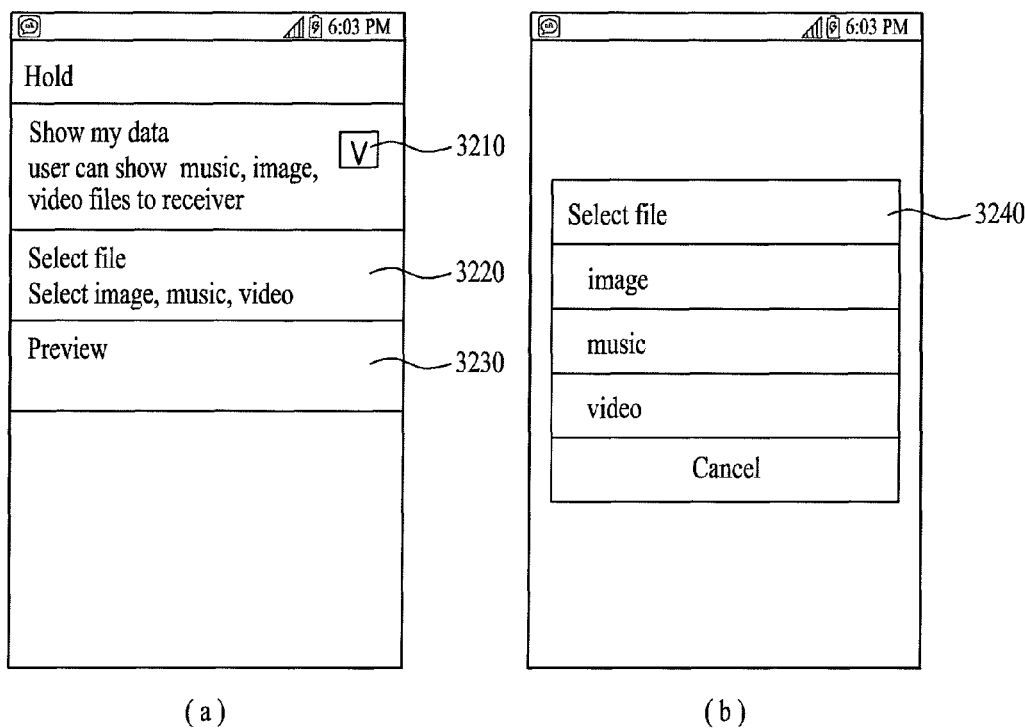
FIG. 32 is a diagram for one example of a setting menu for previously selecting a content to output in case that a mobile terminal 100 is set to a hold state.

FIG. 32 is a diagram for one example of a setting menu for previously selecting a content to output in case that a mobile terminal 100 is set to a hold state.

Referring to FIG. 32 (*a*), the controller 180 may control data, which is to be outputted to each of the mobile terminal 100 and the counterpart terminal while the mobile terminal 100 is set to a hold state, to be outputted. In the example shown in FIG. 32 (*a*), an item 'show my data' 3210 may be provided to determine whether to provide a preset content to a counterpart terminal. While the item 'show may data' 3210 is unchecked, if the mobile terminal 100 enters the hold state, the controller 180 may control the preset content to be outputted from the mobile terminal only without providing the preset content to the counterpart terminal. On the other hand, while the item 'show may data' 3210 is checked, if the mobile terminal 100 enters the hold state, the controller 180 may control the preset data to be outputted from the counterpart terminal by outputting the preset data to the touchscreen.

In the example shown in FIG. 32 (*a*), an item 'select file' 3220 is provided to select a content to output when the mobile terminal 100 enters the hold state. If the item 'select file' 3220 is selected in the example shown in FIG. 32 (*a*), the controller 180 may be able to provide a menu 3240 for selecting a content to output in case of entering the hold state (FIG. 32 (*b*)).

An item 'Preview' shown in FIG. 32 (*a*) may be provided to input a command for previewing a screen, from which a preset data is outputted, when the mobile terminal 100 enters the hold state.

Thereafter, while the mobile terminal 100 and the counterpart terminal are performing the voice call via the first communication network, if the mobile terminal 100 enters the hold state, the controller 180 may be able to determine whether to transmit the preset data to the counterpart terminal depending on whether the item 'show my data' 3210 shown in FIG. 32 (*a*) is checked. While the item 'show may data' 3210 in the example shown in FIG. 32 (*a*) is checked, if the hold state is entered, the controller 180 may control the preset content to be transmitted to the counterpart terminal, of which details shall be described with reference to FIG. 33. For clarity of the following description, an output screen of the counterpart terminal is simultaneously shown in FIG. 33. In case that the output screen of the counterpart terminal is shown, as mentioned in the foregoing descriptions with reference to the accompanying drawings, an identification number '2' shall be attached to the corresponding output screen.

FIG. 33 is a diagram for one example of a case that a mobile terminal 100 enters a hold state in the course of an ongoing voice call between the mobile terminal 100 and a counterpart terminal. For clarity of the following description, the preset data in the example shown in FIG. 32 includes an image file.

Figure 33A:
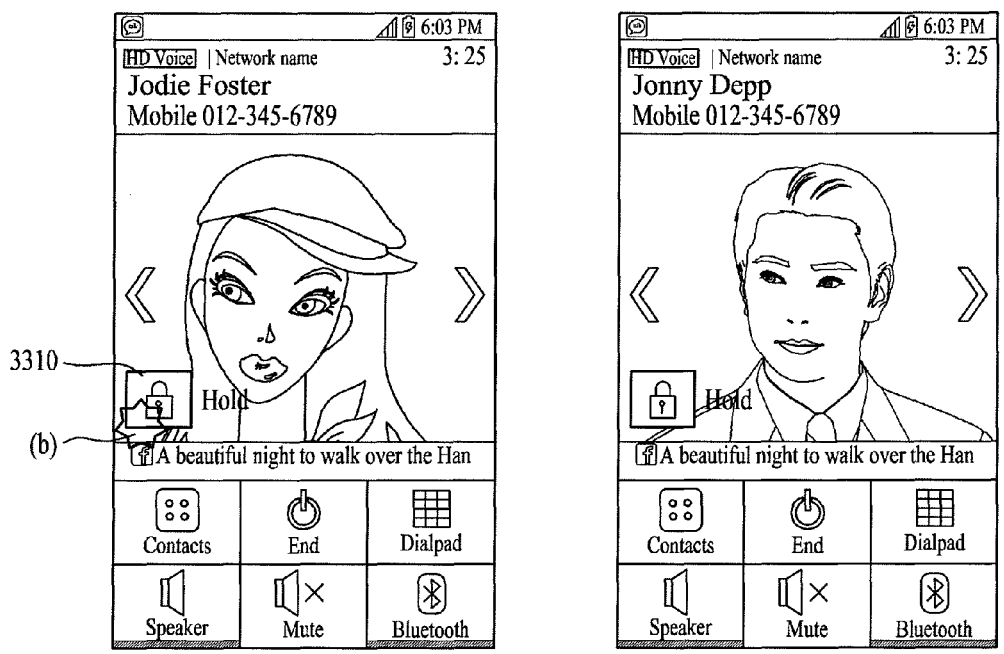
FIGS. 33A-33C are diagrams for one example of a case that a mobile terminal 100 enters a hold state in the course of an ongoing voice call between the mobile terminal 100 and a counterpart terminal.
Figure 33B:
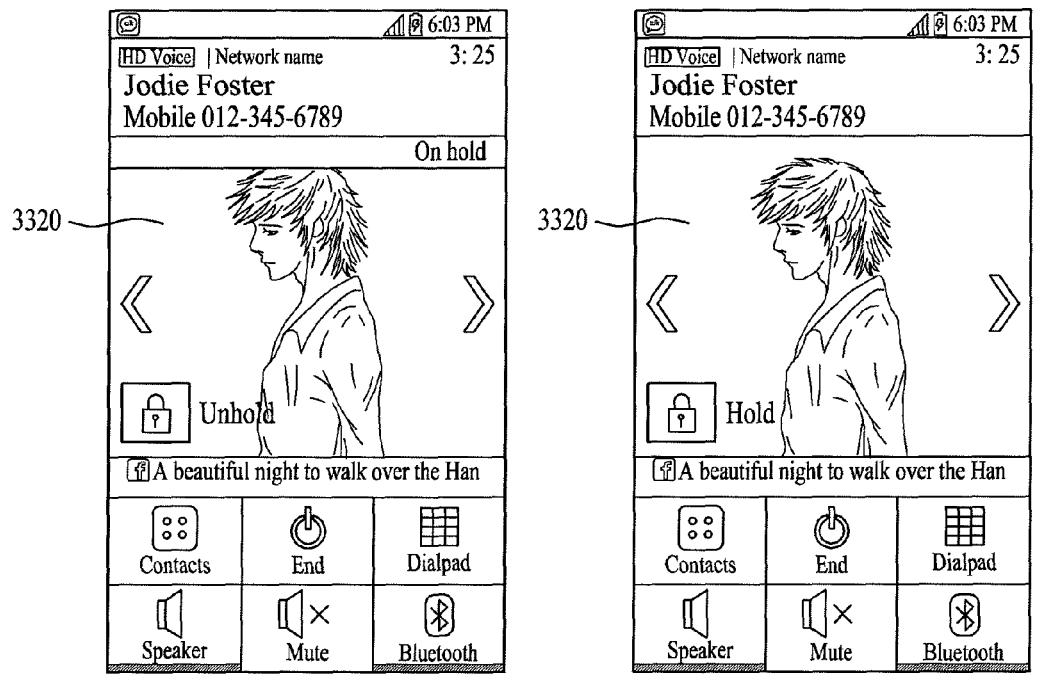

Referring to FIG. 33, while a call connection is screen is being displayed on the touchscreen, if a user inputs a hold command (e.g., a hold button 3310 shown in FIG. 33A 1 is touched), the controller 180 may be able to control a first content 3320, which is included in the preset data, to be displayed on a sender display region of the call connection screen in response to the user's hold command (FIG. 33B 1).

In order control the preset conte3nt to be displayed on the counterpart terminal, if the mobile terminal 100 enters the hold state, the controller 180 may be able to control the preset content to be transmitted to the counterpart terminal. Having received the preset content from the mobile terminal 100, the counterpart terminal outputs the first content 3320 included in the preset content and then controls the same content of the mobile terminal 100 to be outputted (FIG. 33B 2).

Figure 33C:
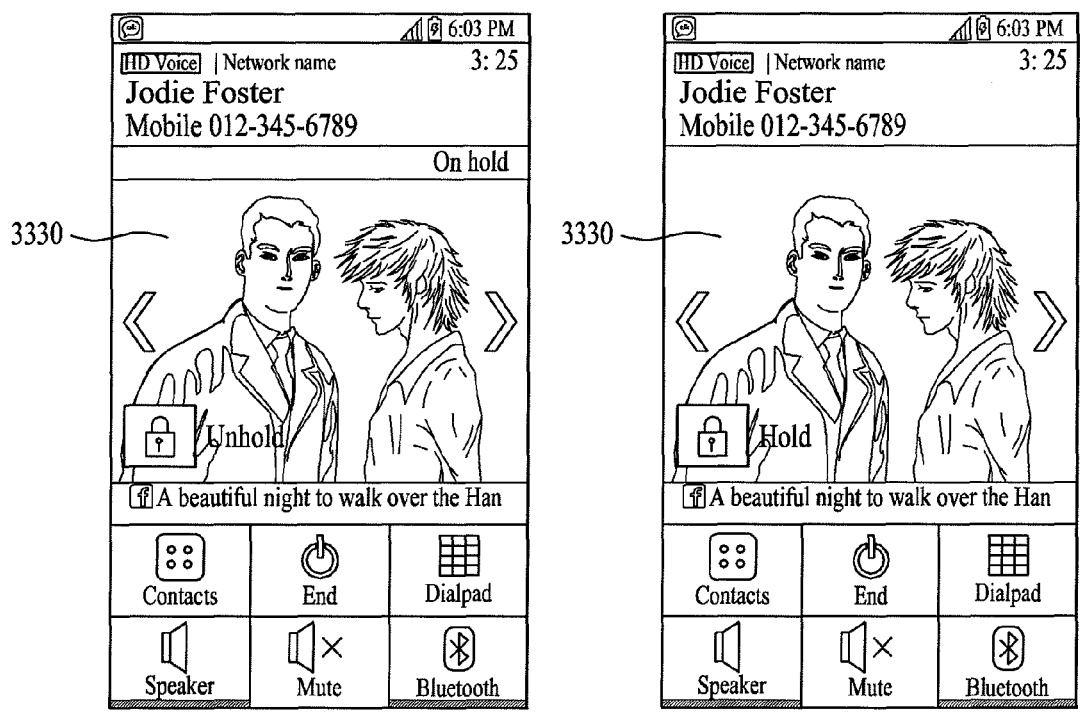

In case that there are a plurality of preset contents (e.g., a plurality of images, etc.), the controller 180 may control a next content to be automatically displayed if a preset time expires. For instance, in the example shown in FIG. 33B 1 and FIG. 33B 2, if a preset time expires in the course of outputting the first content 3320, the controller 180 may control a second content 3330 to be outputted via the touchscreen and the counterpart terminal (FIG. 33C 1, FIG. 33C 2).

For clarity, FIG. 33 shows one example that the preset data includes the image file. Yet, as mentioned in the foregoing description, the present data may include a music file, a video file or the like as well as the image file. In case that the preset data includes the image file and the music file, the controller 180 may be able to control both of the music file and the image file to be simultaneously outputted.

While the mobile terminal 100 and the counterpart terminal perform the voice call, the mobile terminal 100 according to the present invention may be able to provide a flashcon linked to audio data to the counterpart terminal. Alternatively, the mobile terminal according to the present invention receives a flashcon from the counterpart terminal and may be then able to play the received flashcon.

Figure 34:
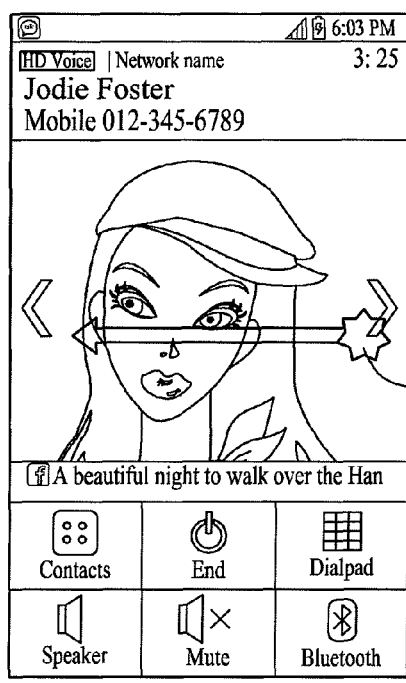
FIG. 34 is a diagram for one example of an output of a touchscreen to provide a flashcon.
Figure 34:
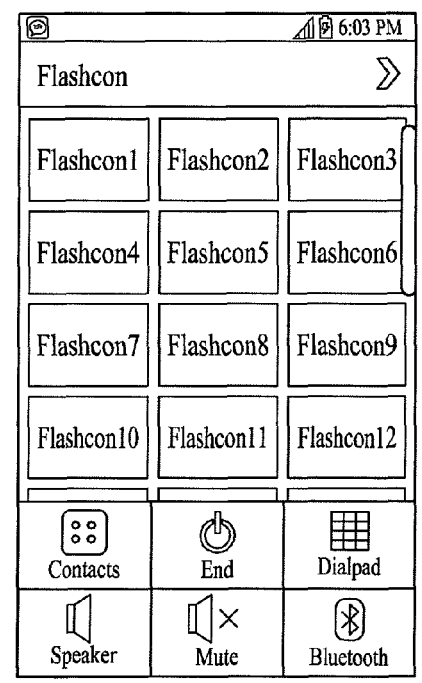

FIG. 34 is a diagram for one example of an output of a touchscreen to provide a flashcon.

Referring to FIG. 34, while a call connection screen is being displayed, if a prescribed user command is inputted (FIG. 34 (*a*)) (e.g., a flicking input 3401 is inputted to the touchscreen using a pointer in FIG. 34 (*a*)), the controller 180 may be able to control a selection menu, which is provided to select a flashcon, to be displayed (FIG. 34 (*b*)). If a user selects the flashcon shown in FIG. 34 (*b*), the controller 180 may be able to control the selected flashcon and audio data, which is linked to the selected flashcon, to be transmitted to a counterpart.

On the other hand, if the mobile terminal 100 receives a flashcon and audio data linked to the flashcon from the counterpart terminal, the controller 180 may be able to play at least one of the flashcon and the audio data received from the counterpart terminal.

Generally, when a voice call is performed instead of a video call, a user performs a phone call without viewing an input of a touchscreen. Even if a flashcon received from a user terminal is played, it may be unclear whether a user will check the played flashcon. Hence, in case of receiving a flashcon from the counterpart terminal in the course of a voice call, the controller 180 may be able to control the audio data linked to the flashcon to be outputted via the audio output module 152 only.

On the other hand, in case that the mobile terminal 100 and the counterpart terminal perform a video call, since a user may perform a phone call by viewing the touchscreen, the controller 180 may be able to control the audio data linked to the flashcon to be outputted while controlling the flashcon to be played on the touchscreen.

Figure 35:
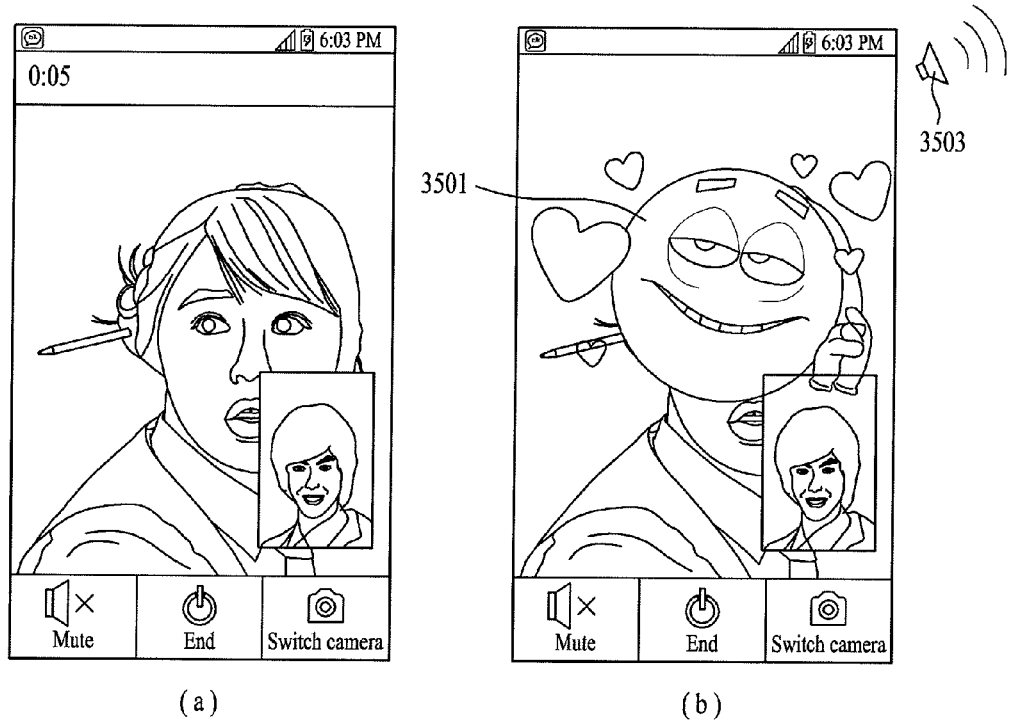
FIG. 35 is a diagram for one example of an output of a touchscreen to provide a flashcon by outputting audio data linked to the flashcon.

For instance, in case that the mobile terminal 100 receives a flashcon from a counterpart terminal in the course of performing a video call with the counterpart terminal (FIG. 35 (*a*)), the controller 180 180 may control audio data linked to the flashcon to be outputted via the audio output module 3503 while playing the flashcon 3501 (FIG. 35 (*b*)).

Meanwhile, a voice call using a first communication network may be able to transmit both audio packet and data packet on a single communication channel. In case of receiving a voice call request from a counterpart terminal using a first communication network, the mobile terminal 100 according to the present invention may be able to reject a call connection request while transmitting the audio data to the counterpart terminal. This is described in detail with reference to FIG. 36 as follows.

Figure 36:
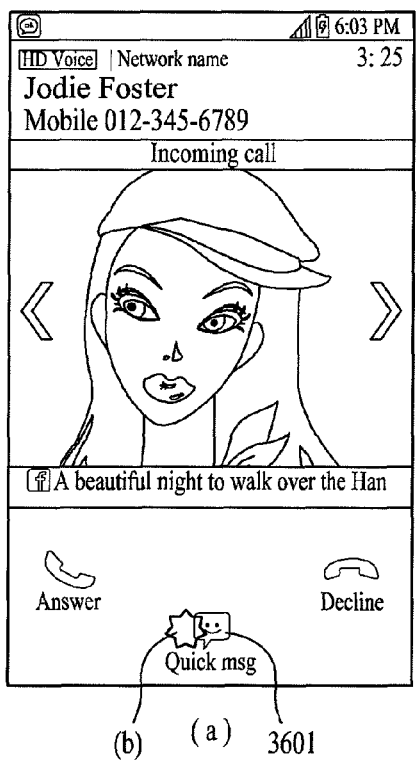
FIG. 36 is a diagram for one example of rejecting a call connection request while transmitting audio data if a call connection is requested to a mobile terminal 100.
Figure 36:
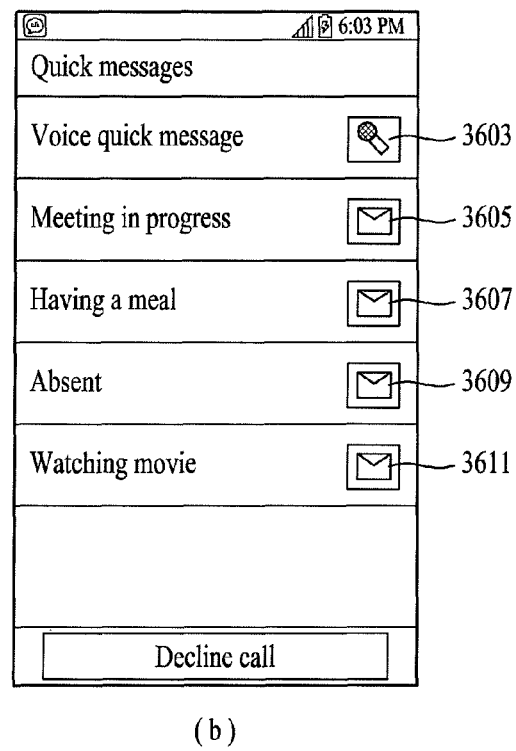

FIG. 36 is a diagram for one example of rejecting a call connection request while transmitting audio data if a call connection is requested to a mobile terminal 100.

FIG. 36 (*a*) is a diagram for one example of a general call connection screen of a mobile terminal 100. An answer button shown in FIG. 36 (*a*) may be provided to accept a call connection to a counterpart. And, a decline button shown in FIG. 36 (*a*) may be provided to decline a call connection to a counterpart. Moreover, a quick message button 'Quick msg' 3601 may be provided to decline a call connection while sending a preset message to a counterpart terminal. For instance, if the quick message button is selected in FIG. 36 (*a*), the controller 180 may be able to control a list screen shown in FIG. 36 (*b*) to be outputted. If one of text message items 3605, 3607, 3609 and 3611 is selected from the list screen shown in FIG. 36 (*b*), the controller 180 may be able to decline a call connection request while sending a text message containing preset sentence(s).

If a voice quick message item 2603 is selected from the list screen shown in FIG. 36 (*b*), the controller 180 may be able to decline a call connection request while transmitting preset audio data to a counterpart. In particular, the controller 180 may be able to decline a voice call request while directly delivering a voice message to an address of the counterpart terminal in data packet form instead of a text message form.

Having received the audio data from the mobile terminal 100, the counterpart terminal outputs the audio data and recognizes that the user is unable to answer the call.

Figure 37:
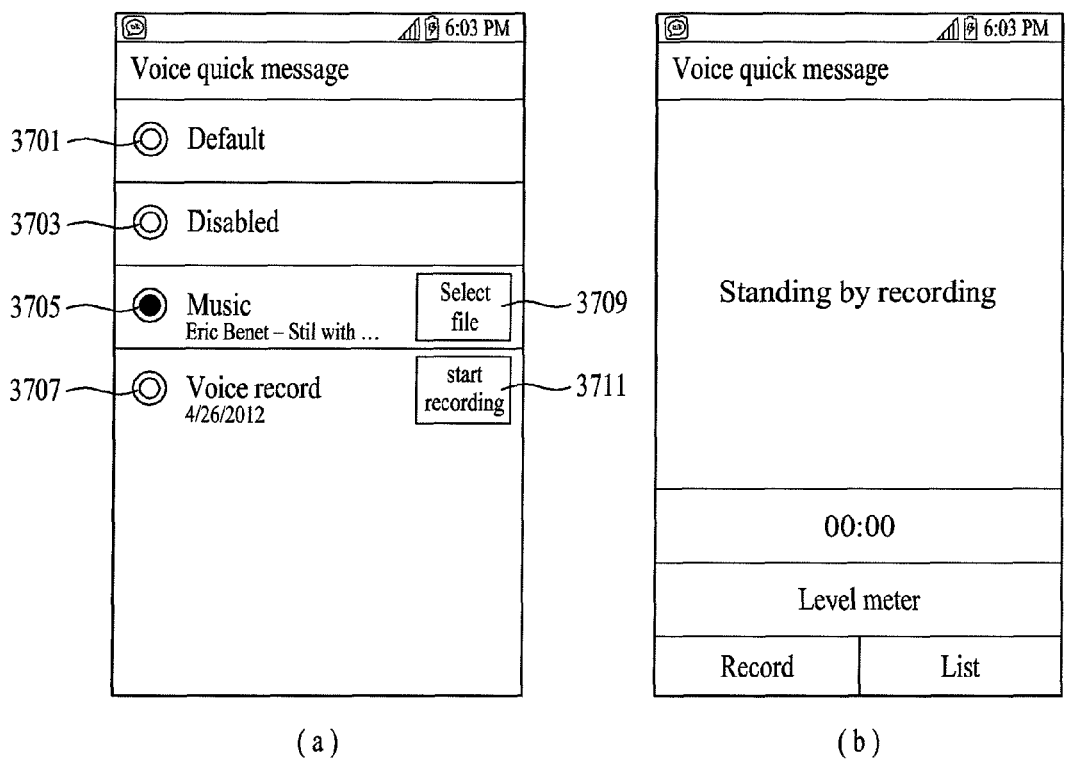
FIG. 37 is a diagram for one example of a setting screen provided to a user for a linkage between a voice quick message and audio data.

The audio data linked to the voice quick message may include a music file or a user's voice recorded file. For instance, FIG. 37 is a diagram for one example of a setting screen provided to a user for a linkage between a voice quick message and audio data. Referring to FIG. 37 (*a*), in the voice quick message is selected in FIG. 36 (*b*), an item 'Default' 3701 may mean that audio data set as default will be transmitted to a counterpart terminal. An item 'Disable' 3703 shown in FIG. 37 (*a*) may mean that the voice quick message will be excluded from the list shown in FIG. 36 (*b*). In this case, the user is unable to select the voice quick message from the list shown in FIG. 36 (*b*) but may be able to select the text message item only from the list shown in FIG. 36 (*b*).

An item 'Music' 3705 shown in FIG. 37 (*a*) may mean that a music file saved in the mobile terminal 100 will be linked to a voice quick message. Hence, a user may be able to set a music file to link to a voice quick message through a file select button 3709. If the music item 3705 is selected, a preset music file will be provided to the counterpart terminal in case of selecting the voice quick message.

An item 'Voice record' 3707 shown in FIG. 37 (*a*) may be provided to link a user's voice recorded file to a voice quick message. If a user selects a recording start button 3711, the controller 180 activates a microphone and may then control a recorded file, which will be linked to a voice quick message, to be created.

According to the description with reference to FIG. 4, while the voice call is performed between the mobile terminal 100 and the counterpart terminal via the first communication network, the data sharing can be performed between the mobile terminal 100 and the counterpart terminal. Yet, embodiments of the present invention may be non-limited by the voice call. According to another embodiment of the present invention, in case that the mobile terminal 100 and the counterpart terminal perform a video call via a first communication network, a data sharing can be performed between the mobile terminal 100 and the counterpart terminal. In doing so, the case of performing the video call via the first communication network may include a case that the mobile terminal 100 makes a video call request to the counterpart terminal or a case that a video call between the mobile terminal 100 and the counterpart terminal is switched to a video call in-between. This is described in detail with reference to FIG. 38 as follows.

Figure 38:
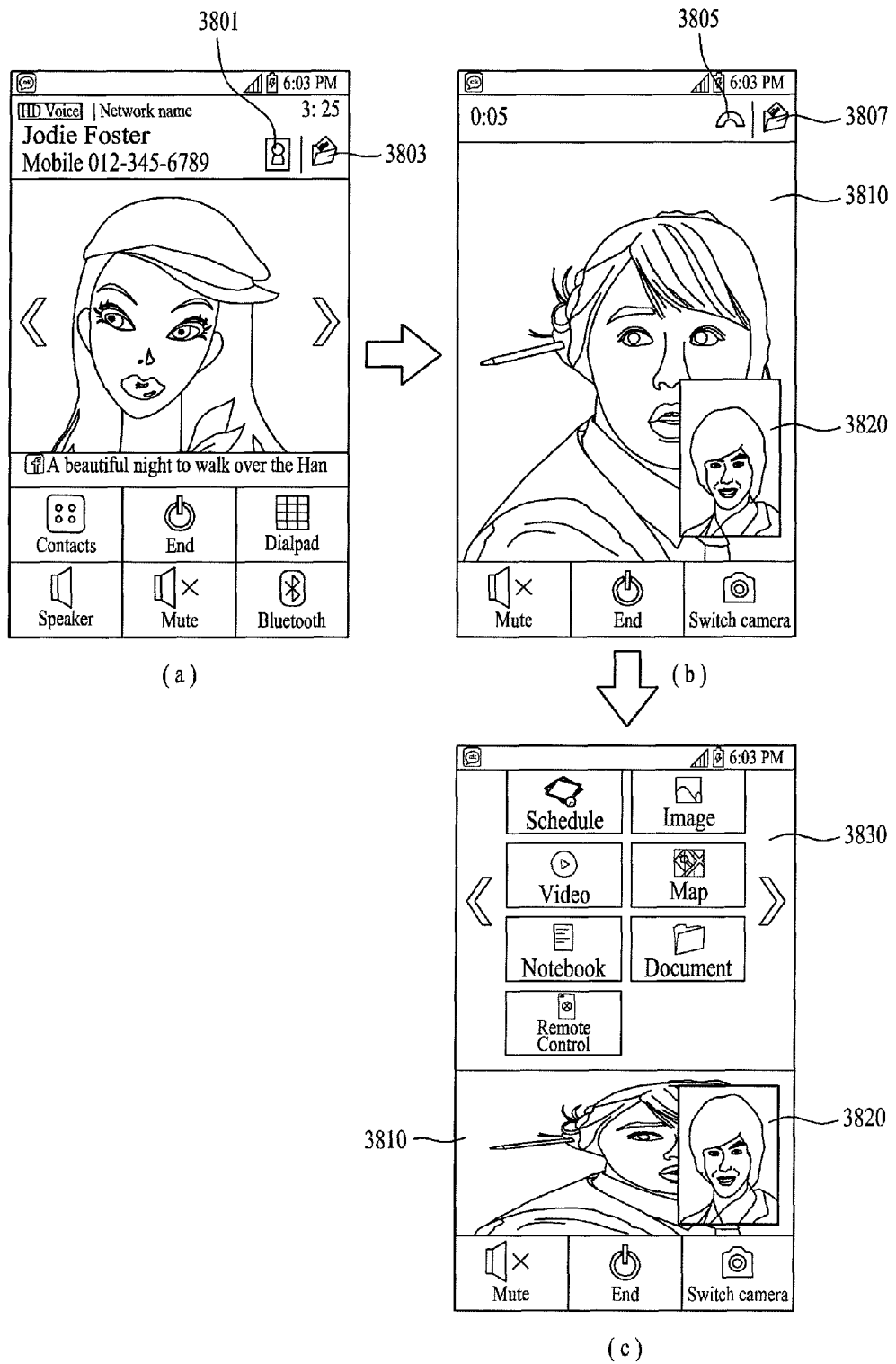
FIG. 38 is a diagram for one example of displaying a data type menu in a video call environment.

FIG. 38 is a diagram for one example of displaying a data type menu in a video call environment.

Referring to FIG. 38, while the mobile terminal 100 and the counterpart terminal perform a voice call using a first communication network, a video call switch button 3801 and a file transmit button 3803 may be displayed on a call connection screen provided to the touchscreen. When VoLTE network is used as the first communication network for example, in case of 3 G communication network as a second communication network, since a voice call and a video call use a voice channel and a data channel, respectively, a switching between the voice call and the video call is impossible in the course of an ongoing voice call. On the contrary, in case of VoLTE network as one example of the first communication network, since both a voice call and a video call use a data channel, a switching between the voice call and the video call is freely available. Hence, if a user selects the video call switch button 3801, the controller 180 switches the voice call to the video call and may then control a preview screen 3820 of a user terminal and a counterpart terminal preview screen 3810 received from the counterpart terminal to be displayed. In order to obtain the preview screen 3820 of the user terminal, the controller 180 may control a front or rear camera to be activated.

Moreover, it is a matter of course that a voice call mode can be entered in the course of an ongoing video call. In the example shown in FIG. 38 (*b*), if a voice call switch button 3805 is selected, the controller 180 ends the video call into the voice call and may control the camera of the mobile terminal 100 to be deactivated.

If the first user command described in the step S402 is inputted in the course of the ongoing video call, the controller 180 may control a data type menu 3830 to be displayed on the touchscreen. The controller 180 may control both the user terminal preview screen 3820 and the counterpart preview screen 3810 to be simultaneously displayed together with the data type menu 3830.

The file transmit button 3803/3807 shown in FIG. 38 (*a*)/FIG. 38 (*b*) is provided to exchange files between the mobile terminal 100 and the counterpart terminal. The user may be able to transmit a file saved in the mobile terminal 100 to the counterpart in the course of an ongoing call by selecting the file transmit button 3803/3807. Unlike the first user command in the step S402, the file transmit button 3803/3807 does not trigger each of the mobile terminal 100 and the counterpart terminal to perform the switching between the first data sharing screen and the second data sharing screen.

Referring to FIG. 38, even if the mobile terminal 100 performs the video call to the counterpart terminal using the first communication network, the controller 180 may be able to make a request for a data sharing with the counterpart terminal. In particular, the embodiment shown in FIG. 4 may be exactly applicable to the case that the mobile terminal 100 performs the video call.

According to the above embodiment, the mobile terminal 100 is a sender side terminal of the voice call. Yet, the mobile terminal 100 is not always set to the sender side terminal of the voice call. In case that the mobile terminal 100 is a receiver side terminal of a voice call, the above-mentioned operations in the counterpart terminal may be exactly applicable to the mobile terminal 100.

According to the aforementioned embodiment, after a data type to share has been determined via the data type menu shown in FIG. 6, FIG. 7 or FIG. 38, the data sharing can be performed between the mobile terminal 100 and the counterpart terminal. Yet, a selection screen of a data type menu may not be necessarily displayed like the example shown in FIG. 6 or FIG. 7. For instance, if a first user command is applied to the mobile terminal 100, the controller 180 may be able to control a preset data type to be shared with a counterpart terminal without displaying the data type menu.

Accordingly, embodiments of the present invention provide various effects and/or features.

First of all, the present invention further facilitates the data sharing between a mobile terminal and an external terminal.

Secondly, the present invention provides a mobile terminal that facilitates data to be shared with a call counterpart terminal.

Thirdly, the present invention provides a mobile terminal enables data to be seamlessly shared with a counterpart terminal even if a third party terminal is involved in a call to the counterpart terminal.

According to at least one of embodiments of the present invention, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet).

The above-mentioned mobile terminal 100 may be configured in a manner of combining the respective embodiments of the present invention entirely or in part to enable various modifications instead of restricting the applicable scope of the aforementioned configurations and methods of the embodiments.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen;
a sensing unit configured to sense an action of a user;
a communication unit configured to communicate with a counterpart terminal; and
a controller, in response to a first user command inputted via at least one of the touchscreen and the sensing unit in the course of performing a voice call to the counterpart terminal, configured to control the touchscreen to display a first data sharing screen and to control a specific type of data selected from the first data sharing screen to be shared with the counterpart terminal during the voice call, wherein, if a handwriting data is selected as the specific type of data to be shared with the counterpart terminal during the voice call, the controller is configured to control a first handwriting data inputted at the mobile terminal to be shared by transmitting the first handwriting data to the counterpart terminal, to control a second handwriting data inputted at the counter terminal to be shared by receiving the second handwriting data from the counterpart terminal, and to control the first handwriting data and the second handwriting data to be displayed on a specific page of the first data sharing screen, and wherein, if a second user command to change the specific page currently displayed on the touch screen is received, the controller is configured to control the first handwriting data and the second handwriting data displayed on the specific page of the first data sharing screen to disappear by changing the specific page into a new page of the first data sharing screen.

2. The mobile terminal of claim 1, wherein the controller is configured to control the first data sharing screen to be displayed in response to the first user command during the voice call when the voice call is performed via a specific communication network.

3. The mobile terminal of claim 1, wherein the first data sharing screen includes a data type menu for selecting a type of data to be shared with the counterpart terminal.

4. The mobile terminal of claim 3, wherein the controller is configured to control the data type menu to disappear automatically from the touchscreen after a preset time expires after the inputting of the first user command.

5. The mobile terminal of claim 1, wherein, when the first data sharing screen is displayed on the touchscreen, the controller is configured to control a second data sharing screen corresponding to the first data sharing screen to be displayed on the counterpart terminal and is configured to control data within the first data sharing screen to be displayed on the second data sharing screen by being transmitted to the counterpart terminal.

6. The mobile terminal of claim 1, wherein, if a third handwriting data is being inputted at the counterpart terminal when the second user command is received, the controller is configured to prevent changing the specific page of the first sharing screen to the new page of the first sharing screen.

7. The mobile terminal of claim 6, wherein, if the third handwriting data is being inputted at the counterpart terminal when the second user command is received, the controller is configured to control the mobile terminal to output a first alarm indicating that the third handwriting data is being inputted at the counterpart terminal.

8. The mobile terminal of claim 6, wherein the controller is configured to control a second alarm to be outputted from the counterpart terminal indicating that the second user command is inputted in the course of inputting the third handwriting data.

9. The mobile terminal of claim 1, further comprising an interface unit configured to connect an earphone or a headset thereto,
wherein, while the earphone or headset is not connected to the interface unit, the controller is configured to control a speakerphone mode to be automatically entered when the first data sharing screen is displayed.

10. The mobile terminal of claim 1, further comprising an audio output unit for an audio output, wherein the sensing unit senses a proximity distance of a user from the audio output unit and, when the proximity distance becomes equal to or greater than a preset distance, the controller is configured to control the sensed proximity distance to be recognized as the first user command.

11. The mobile terminal of claim 1, wherein the controller is configured to grant a first control authority of controlling the first data sharing screen to the counterpart terminal.

12. The mobile terminal of claim 11, wherein, when a new communication with a third party terminal is initiated in the course of a communication with the counterpart terminal, the controller is configured to automatically grant to the counterpart terminal a second control authority, which is greater than the first control authority.

13. The mobile terminal of claim 12, wherein the controller is configured to control an alarm indicating that the second control authority has been granted to the counterpart terminal to be outputted.

14. The mobile terminal of claim 12, wherein the controller is configured to control the first data sharing screen, which is manipulated by the counterpart terminal having the second control authority, to keep being displayed in the course of the communication with third party terminal.

15. The mobile terminal of claim 12, wherein, when the communication with the third party terminal is ended in the course of the communication with the counterpart terminal, the controller is configured to automatically end the second control authority granted to the counterpart terminal and to provide the first control authority to the counterpart terminal.

16. The mobile terminal of claim 15, wherein the controller is configured to control an alarm indicating that the grant of the second control authority has been ended in the counterpart terminal to be outputted.

17. A method of controlling a mobile terminal, comprising the steps of:
communicating between the mobile terminal and a counterpart terminal;
in response to a first user command inputted via at least one of a touchscreen and a sensing unit of the mobile terminal in the course of performing a voice call to the counterpart terminal via the first communication network, controlling a first data to be displayed on the touchscreen; and
sharing a specific type of data selected from the first data sharing screen with the counterpart terminal during the voice call,
wherein, if a handwriting data is selected as the specific type of data to be shared with the counterpart terminal during the voice call, the method further comprises:
controlling a first handwriting data inputted at the mobile terminal to be shared by transmitting the first handwriting data to the counterpart terminal;
controlling a second handwriting data inputted at the counter terminal to be shared by receiving the second handwriting data from the counterpart terminal; and
controlling the first handwriting data and the second handwriting data to be displayed on a specific page of the first data sharing screen, and
wherein, if a second user command to change the specific page currently displayed on the touch screen is received, the method further comprises:
controlling the first handwriting data and the second handwriting data displayed on the specific page of the first data sharing screen to disappear by changing the specific page into a new page of the first data sharing screen.

18. A mobile terminal comprising:
a touchscreen;
a memory unit configured to store data;
a communication unit configured to communicate with a counterpart terminal; and
a controller being configured to control a voice call function for a voice call to the counterpart terminal and a first data sharing function for a data sharing with the counterpart terminal to be performed during the voice call, and the controller being configured to determine whether to end the first data sharing function at the ending of the voice call function depending on whether the ending of the voice call function is requested by the mobile terminal or the counterpart terminal,
wherein, when the ending of the voice call function is requested by the mobile terminal, the controller is configured to control the first data sharing function to end automatically or in response to a selection made by a user of the mobile terminal, and
wherein, when the ending of the voice call function is requested by the counterpart terminal, the controller is configured to control the first data sharing function to remain active.

19. The mobile terminal of claim 18, wherein, when the first data sharing function is performed, the controller is configured to control a second data sharing function corresponding to the first data sharing function to be activated.

20. The mobile terminal of claim 19, wherein the controller is configured to control a first data sharing screen corresponding to the first data sharing function to be displayed on the touchscreen and wherein the controller is configured to control a second data sharing screen corresponding to the second data sharing function to be displayed on the counterpart terminal.

21. The mobile terminal of claim 19, wherein, when a first handwriting data is inputted to the first data sharing screen, the controller is configured to control the first handwriting data to be displayed on the second data sharing screen by being transmitted to the counterpart terminal, and
wherein, when the controller receives a second handwriting data inputted to the second data sharing screen of the counterpart terminal by being transmitted to the mobile terminal, the controller is configured to control the first handwriting data and the second handwriting data to be displayed on the first data sharing screen.

22. The mobile terminal of claim 21, wherein, when the end of the voice call function is requested by the counterpart terminal, the controller is configured to control whether to automatically end the first data sharing function based on whether both of the first handwriting data and the second handwriting data are saved.

23. The mobile terminal of claim 22, wherein, when both of the first handwriting data and the second handwriting data are saved, the controller is configured to control the first data sharing function to be automatically ended, and
wherein, when at least one of the first handwriting data and the second handwriting data is not saved, the controller is configured to control the first data sharing function to be ended in accordance with the selection made by the user of the mobile terminal.

24. The mobile terminal of claim 21, wherein, when the end of the voice call function is requested by the counterpart terminal, the controller is configured to control the first data sharing function to remain active.

25. The mobile terminal of claim 21, wherein, when the voice call function is ended or the first data sharing function remains active, the controller is configured to control the first handwriting data and the second handwriting data to be saved in a call history.

26. The mobile terminal of claim 25, wherein, after a third handwriting data is further inputted to the first data sharing screen after ending the voice call function, the controller is configured to control the first to third handwriting data to be saved in a photo album when the first data sharing function is ended.

27. The mobile terminal of claim 21, wherein, when the first data sharing function is ended, the controller is configured to control the first handwriting data and the second handwriting data to be saved,
  wherein, when the first data sharing function is reactivated within a prescribed time after the end of the first data sharing function, the controller is configured to control at least one of the first handwriting data and the second handwriting data to be displayed on the first data sharing screen, and
  wherein, when the first data sharing function is reactivated after expiration of the prescribed time from the end of the first data sharing function, the controller is configured to control the first handwriting data and the second handwriting data to not be displayed on the first data sharing screen.

28. The mobile terminal of claim 21, wherein the voice call and the data sharing are performed via a first communication network.

29. The mobile terminal of claim 28, wherein, when the communication unit makes a handover into a second communication network corresponding to a voice call dedicated network from the first communication network, the controller is configured to determine whether to end the first data sharing function automatically based on whether both of the first handwriting data and the second handwriting data are saved.

30. A method of controlling a mobile terminal, comprising the steps of:
  communicating between the mobile terminal and a counterpart terminal;
  activating a voice call function for a voice call to the counterpart terminal and a first data sharing function for a data sharing with the counterpart terminal during the voice call; and
  determining whether to end the first data sharing function at the ending of the voice call function depending on whether the ending of the voice call function is requested by the mobile terminal or the counterpart terminal,
  wherein, when the ending of the voice call function is requested by the mobile terminal, the method further comprises controlling the first data sharing function to end automatically or in response to a selection made by a user of the mobile terminal, and
  wherein, when the ending of the voice call function is requested by the counterpart terminal, the method further comprises controlling the first data sharing function to remain active.

* * * * *